United States Patent
Coates et al.

[11] Patent Number: 5,871,665
[45] Date of Patent: Feb. 16, 1999

[54] ELECTROOPTICAL LIQUID CRYSTAL SYSTEM

[75] Inventors: David Coates, Wimborne; Owain Llyr Parri, Poole; Simon Greenfield, Poole; Martin David Tillin, Poole; Mark John Goulding, Poole; Patrick Nolan, Poole, all of Great Britain

[73] Assignee: Merck Patent Gesellschaft mit Beschrankter Haftung, Darmstadt, Germany

[21] Appl. No.: 81,280

[22] PCT Filed: Apr. 23, 1993

[86] PCT No.: PCT/EP93/00989

§ 371 Date: Jun. 25, 1993

§ 102(e) Date: Jun. 25, 1993

[87] PCT Pub. No.: WO93/22397

PCT Pub. Date: Nov. 11, 1993

[30] Foreign Application Priority Data

Apr. 27, 1992 [EP] European Pat. Off. ............. 92107137

[51] Int. Cl.$^6$ .................... C09K 19/52; C09K 19/34; G02F 1/133
[52] U.S. Cl. ................ 252/299.01; 252/299.61; 252/299.62; 252/299.63; 252/299.66; 349/183; 428/1
[58] Field of Search ............ 252/299.01, 299.6, 252/299.66, 299.61, 299.62, 299.63, 299.64, 299.65, 299.67; 349/183; 428/1

[56] References Cited

U.S. PATENT DOCUMENTS

| | | | |
|---|---|---|---|
| 4,890,902 | 1/1990 | Doane et al. | 349/94 |
| 4,971,719 | 11/1990 | Vaz et al. | 252/299.5 |
| 4,994,204 | 2/1991 | Doane et al. | 252/299.01 |
| 5,011,624 | 4/1991 | Yamagishi et al. | 252/299.5 |
| 5,015,057 | 5/1991 | Rumbaugh et al. | 349/1 |
| 5,188,760 | 2/1993 | Hikmet et al. | 252/299.01 |
| 5,204,763 | 4/1993 | Hikmet | 349/88 |
| 5,210,630 | 5/1993 | Heynderickx et al. | 349/183 |
| 5,211,876 | 5/1993 | Vaz et al. | 252/299.01 |
| 5,225,104 | 7/1993 | Van Steen Kiste et al. | 252/299.01 |
| 5,240,636 | 8/1993 | Doane et al. | 252/299.01 |
| 5,323,251 | 6/1994 | Coates et al. | 349/89 |
| 5,332,520 | 7/1994 | Bach et al. | 252/299.01 |
| 5,344,587 | 9/1994 | Coates et al. | 252/299.66 |
| 5,354,498 | 10/1994 | Akashi et al. | 252/299.01 |
| 5,356,557 | 10/1994 | Jubb et al. | 252/299.01 |

FOREIGN PATENT DOCUMENTS

| | | |
|---|---|---|
| 0313053 | 4/1989 | European Pat. Off. . |
| A-0484972 | 5/1992 | European Pat. Off. . |
| A-0488116 | 6/1992 | European Pat. Off. . |
| A-0506176 | 9/1992 | European Pat. Off. . |
| A-4104183 | 7/1992 | Germany . |
| WO-A- 9105029 | 4/1991 | WIPO . |
| 9109092 | 6/1991 | WIPO . |

OTHER PUBLICATIONS

Hikmet et al., "Dielectric relaxation of liquid crystal molecules in anisotropic confinemenets", *Liquid Crystals*, vol. 10, No. 6 (1991), pp. 835–847.

*Primary Examiner*—Shean C. Wu
*Attorney, Agent, or Firm*—Millen, White, Zelano & Branigan, P.C.

[57] ABSTRACT

An electrooptical system is disclosed in which a PDLC film is positioned between 2 electrode layers. The PDLC film contains a liquid crystal mixture forming microdroplets in an optically isotropic, transparent polymer matrix. The liquid crystal mixture comprises one or more compounds of formula I

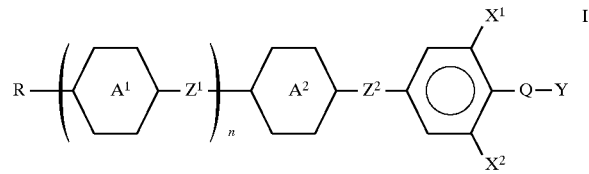

wherein R, $A^1$, $A^2$, $Z^1$, $Z^2$, $X^1$, $X^2$, Q, Y and n as herein defined, and one or more reactive liquid crystalline compounds. The PDLC film exhibits improved switching times, especially at low temperatures.

41 Claims, 3 Drawing Sheets

ELECTROOPTICAL LIQUID CRYSTAL SYSTEM

SUMMARY OF THE INVENTION

This application is a 371 of PCT/EP 93/00989, filed on Apr. 23, 1993.

The invention relates to an electrooptical liquid crystal system which between 2 electrode layers contains a PDLC film comprising a liquid crystal mixture forming microdroplets in an optically isotropic, transparent polymer matrix, in which one of the refractive indices of the liquid crystal mixture is matched to the refractive index of the polymer matrix, which exhibits an electrically switchable transparency which is essentially independent of the polarization of the incident light, the precursor of the PDLC film of which comprises one or more monomers, oligomers and/or prepolymers and a photoinitiator, and is cured photographically, and the liquid crystal mixture of which comprises one or more compounds of the formula I

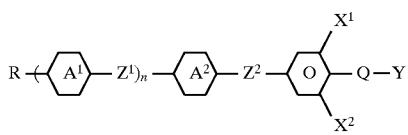

in which $Z^1$ and $Z^2$ independently of one another, are a single bond, —$CH_2CH_2$—, —COO—, —OCO— or —C≡C—,

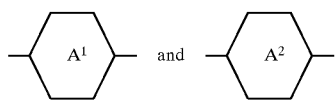

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene and one of

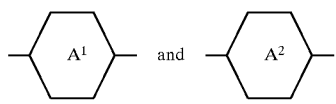

may also be pyrimidine-2,5-diyl, pyridine-2,5-diyl or trans-1,3-dioxane-2,5-diyl, $X^1$ and $X^2$ independently from one another, are H or F, Q is $CF_2$, $OCF_2$, $C_2F_4$, $OC_2F_4$ or a single bond, Y is H, F, Cl or CN, n is 0, 1 or 2, and R is alkyl having up to 23 C atoms, in which one or two non-adjacent $CH_2$ groups can also be replaced by —O— and/or —CH=CH—.

The preparation of PDLC (=polymer dispersed liquid crystal) films is described, for example, in U.S. Pat. No. 4,688,900, Mol. Cryst. Liq. Cryst. Nonlin. Optic, 157, 1988, 427–441, WO 89/06264 and EP 0,272,585. In the so-called PIPS technology (=polymerization-induced phase separation) the liquid crystal mixture is first homogeneously mixed with monomers and/or oligomers of the matrix-forming material; phase-separation is then induced by polymerization. Differentiation must further be made between TIPS (temperature-induced phase separation) and SIPS (solvent-induced phase separation) Mol. Cryst. Liq. Cryst. Inc. Nonlin. Opt. 157 (1988) 427) both being also methods to produce PDLC films.

The process of preparation must be controlled very carefully in order to obtain systems with good electrooptical properties. F. G. Yamgishi et al., SPIE Vol. 1080, Liquid Crystal Chemistry, Physics and Applications, 1989, p.24 differentiate between a "Swiss cheese" and a "polymer ball" morphology. In the latter one, the polymer matrix consists of small polymer particles or "balls" being connected or merging into each other while in the Swiss cheese system, the polymer matrix is continuous and exhibits well defined, more or less spherical voids containing the liquid crystal. The Swiss cheese morphology is preferred because it exhibits a reversible electrooptical characteristic line while the polymer ball system shows a distinct hysteresis generally leading to a drastical deterioration of the electrooptical characteristic line when comparing the virgin and the second run.

According to Yamagishi et al., loc. cit., the Swiss cheese morphology is promoted in case the polymerization reaction runs via a step mechanism, and in WO 89/06264 it is pointed out that the step mechanism is favored in case the precursor of the polymer matrix consists of multifunctional acrylates and multifunctional mercaptanes.

In PDLC films, one of the refractive indices of the liquid crystal mixture, customarily the ordinary refractive index $n_o$, is selected in such a way that it more or less coincides with the refractive index $n_p$ of the polymeric matrix. If no voltage is applied to the electrodes, the liquid crystal molecules in the droplets exhibit a distorted alignment, and incident light is scattered at the phase boundary between the polymeric and liquid crystal phases.

On applying a voltage, the liquid crystal molecules are aligned parallel to the field and perpendicular to the E vector of the transmitted light. Normally incident light (viewing angle θ=0°) now sees an optically isotropic medium and appears transparent.

No polarizers are required for operating PDLC systems, as a result of which these systems have high transmission. PDLC systems provided with active matrix addressing have been proposed on the basis of these favorable transmission properties in particular for projection applications, but in addition also for displays having high information content and for further applications.

The liquid crystal mixtures used for producing PDLC systems have to meet a wide range of demands. One of the refractive indices of the liquid crystal mixture is selected such that it matches with the refractive index of the polymer matrix. The term matching of refractive indices used here covers not only the case $n_o$ (resp. another refractive index of the liquid crystal mixture)≈$n_p$, but also the condition $n_o$ (resp. another refractive index of the liquid crystal mixture) <$n_p$ which is sometimes chosen to reduce off-axis haze and enlarge the view angle as is described, for example, in EP 0,409,442.

The liquid crystal mixture preferably has a positive dielectrical anistropy but the use of dielectrically negative liquid crystal mixtures (see, for example, WO 91/01511) or two-frequency liquid crystal mixtures (see, for example, N. A. Vaz et al., J. Appl. Phys. 65, 1989, 5043) is also discussed.

Furthermore, the liquid crystal mixture should have a high clearing point, a broad nematic range, no smectic phases down to low temperatures and a high stability and should be distinguished by an optical anisotropy Δn and a flow viscosity η which can be optimized with respect to the particular application, and by a high electrical anisotropy.

A series of matrix materials and polymerization processes have hitherto been proposed for producing PDLC systems. The PIPS, SIPS, and TIPS technologies are described in some detail in Mol. Cryst. Liq. Cryst. Inc. Nonlin. Optics, 157, 1988, 427. The PDLC systems described in Mol. Cryst. Liq. Cryst. Inc. Nonlin. Optics, 157, 1988, 427 are based on an epoxy film, while in EP 0,272,585 acrylate systems are given. The PDLC system of WO 89/06264 is based on multifunctional acrylates and multifunctional thiles, and Y. Hirai et al., SPIE Vol. 1257, Liquid Crystal Displays and Applications, 1990, p.2 describe PDLC systems the precursor of the polymer matrix of which being based on monomers and oligomers. Further suitable matrix materials are described, for example, in U.S. Pat. No. 3,935,337, WO 91/13126 and in further references.

Electrooptical systems containing PDLC films can be addressed passively or actively. Active driving schemes employing an active matrix having nonlinear addressing elements like, for example, TFT transistors integrated with the image point, are especially useful for displays with high information content.

When the PDLC system is addressed by means of an active matrix, a further far reaching criterion is added to the requirements listed so far which must be fulfilled by the cured polymer and the liquid crystal mixture being embedded in microdroplets. This is related to the fact that each image point represents a capacitive load with respect to the particular active nonlinear element, which is charged at the rhythm of the addressing cycle. In this cycle, it is of paramount importance that the voltage applied to an addressed image point drops only slightly until the image point is again charged in the next addressing cycle. A quantitative measure of the drop in voltage applied to an image point is the so-called holding ratio (HR) which is defined as the ratio of the drop in voltage across an image point in the nonaddressed state and the voltage applied; a process for determining the HR is given, for example, in Rieger, B. et al., Conference Proceeding der Freiburger Arbeitstagung Flüssigkristalle (Freiburg Symposium on Liquid Crystals), Freiburg 1989, Electrooptical systems having a low or relatively low HR show insufficient contrast.

A further serious problem is often that the liquid crystal mixture has insufficient miscibility with the monomers, oligomers and/or prepolymers of the polymer used for forming the matrix, which limits in particular the use of PIPS technology in microdroplet matrix systems.

A further disadvantage is in particular that the liquid crystal mixture or individual components of the liquid crystal mixture are in many cases distinguished by an excessively high and/or significantly temperature dependent solubility in the cured, matrix-forming polymer. If, for example, the solubility or the temperature-dependence of the solubility of one or several components differs quite significantly from that of the remaining components, it may happen that the physical properties of the mixture and in particular also of the refractive indices $n_e$ and $n_o$ are substantially affected, which disturbs the adjustment of $n_o$ and $n_e$ or another refractive index of the liquid crystal mixture to $n_M$, thus resulting in a deterioration of the optical properties of the system.

The "bleeding" described in EP 0,357,234, according to which at least some of the liquid crystal droplets have the tendency, when the matrix film is subjected to mechanical stress, to dissolve with diffusion of the liquid crystal to the film surface or into the matrix, is favorable by a high solubility of the liquid crystal mixture is the cured polymer.

Very important electrooptical parameters of electrooptical systems mentioned above are the switching voltages and switching times. The threshold voltage $V_{th}$ is usually defined as the voltage $V_{10,0,20}$ at which a transmission of 10% is observed at a temperature of 20° C. and under a viewing angle ⊖ of 0° while the saturation voltage is the lowest voltage for which the maximum transmission is observed at 20° C. and a viewing angle of 0°. The switching on time $t_{on}$ is usually reported as the time necessary for the transmission to rise from 0% to 90% of the maximum transmission when the saturation voltage is applied while $t_{off}$ is the time necessary for the transmission to drop from 100% to 10% when the voltage is switched off.

In U.S. Pat. No. 4,674,255 it is shown that a correlation exists between the mean size of the microdroplets on the one hand and the switching voltages and switching times of the system on the other hand. Generally, relatively small microdroplets cause relatively high switching voltages, but relatively short switching times and vice versa.

Experimental methods for influencing the average droplet size are described, for example, in U.S. Pat. No. 4,673,255 and in J. L. West, Mol. Cryst. Liq. Cryst. Inc. Nonlin. Optic., 157, 1988, 427. In U.S. Pat. No. 4,673,255, average drop diameters between 0.1 μm and 8 μm are given, while, for example, a matrix which is based on a glass monolith has pores having a diameter between 15 and 2000 Å. For the mesh width of the network of PN systems, a preferred range between 0.5 and 2 μm is given in EP 0,313,053.

The switching voltage, however, must not be chosen too high because of several reasons (power consumption, safety of operation, compatibility with conventional modules of microelectronic).

On the other hand, high switching times are generally not tolerable which is evident in case of display applications, but which is also true for many other applications. Low switching time are also often required at lower temperature because the systems according to the preamble are also discussed for out-door applications.

It is true that considerable efforts have already been undertaken hitherto in order to optimize PDLC systems with respect to the liquid crystal mixture used and the polymer system. On the other hand, however, it is still an open problem how to realize PDLC films which are characterized both by low switching times especially at low temperatures and at the same time by advantageous values of the switching voltages. No method is known so far by which switching voltages and switching times can be adjusted with respect to the intended application more or less independently from each other.

Furthermore, only few investigations of PDLC systems having active matrix addressing can be found in the literature, and no concepts have so far been proposed for providing electrooptical systems having a high HR and a low temperature dependence of HR advantageous values of the switching voltages, and low switching times, especially at low temperatures.

Consequently, there is a high demand for PDLC systems which fulfill to a large extent the requirements described and which exhibit advantageous values of the switching voltages, and, in particular, low switching times especially at low temperature. Furthermore, there is a high demand for actively addressed PDLC systems which exhibit a high HR and a low temperature dependence of HR in addition to low switching times.

The object of the invention was to provide PDLC systems of this type and precursors of these PDLC systems containing monomers, oligomers and/or prepolymers of the polymer used and a liquid crystal mixture. Other aims of the present invention are immediately evident to the person skilled in the art from the following detailed description.

It has been found that PDLC systems which are characterized by low switching times can be obtained if one or more reactive liquid crystalline compounds are added to its liquid crystal mixture.

The invention thus relates to an electrooptical liquid crystal system
which between 2 electrode layers contains a PDLC film comprising a liquid crystal mixture forming microdroplets in an optically isotropic, transparent polymer matrix,
in which one of the refractive indices of the liquid crystal mixture is matched to the refractive index of the polymer matrix,
which exhibits an electrically switchable transparency which is essentially independent of the polarization of the incident light,
the precursor of the PDLC film of which comprises one or more monomers, oligomers and/or prepolymers and a photoinitiator, and is cured photoradically, and
the liquid crystal mixture of which comprises one or more compounds of the formula I

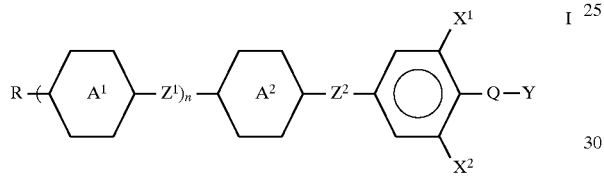

in which
$Z^1$ and $Z^2$ independently of one another, are a single bond, —$CH_2CH_2$—, —COO—, —OCO— or —C≡C—,

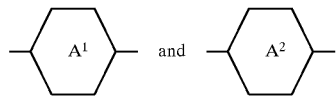

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difloro-1,4-phenylene and one of

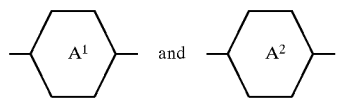

may also be pyrimidine-2,5-diyl, pyridine-2,5-diyl or trans-1,3-dioxane-2,5-diyl,
$X^1$ and $X^2$ independently from one another, are H or F,
Q is $CF_2$, $OCF_2$, $C_2F_4$ or a single bond,
Y is H, F, Cl or CN,
n is 0, 1 or 2, and
R is alkyl having up to 13 C atoms, in which one or two non-adjacent $CH_2$ groups can also be replaced by —O— and/or —CH=CH—,
characterized in that the liquid crystal mixture additionally contains one or more reactive liquid crystalline compounds in order to obtain improved switching times especially at low temperatures. Part of the reactive liquid crystalline compounds which can be used in the electrooptical systems according to the present invention are new, and such new reactive liquid crystalline compounds are also claimed.

Specifically, the present invention also relates to reactive liquid crystalline compounds of formula III

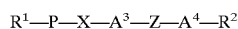

where
$R^1$ is $CH_2$=CW—COO—, $CH_2$=CH—,

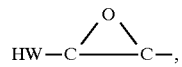

HWN—, HS—$CH_2$—$(CH_2)_m$— COO— with W being H, Cl or alkyl with 1–5 C atoms and m being 1–7,
P is alkylene with up to 12 C atoms, it being also possible for one or more $CH_2$ groups to be replaced by O,
X is —O—, —S—, —COO—, —OCO— or a single bond,
$R^2$ is alkyl radical with up to 15 C atoms which is unsubstituted, mono-or polysubsituted by halogen, it being also possible for one or more $CH_2$ groups in these radicals to be replaced, in each case independently of one another, by —O—, —S—, —CO—, —OCO—, —CO—O— or —O—CO—O— in such a manner that oxygen atoms are not lined directly to one another, —CN, —F, —Cl, or alternatively $R^2$ has one of the meanings given for $R^1$—P—X,
$A^3$ is a 1,4-phenylene or a naphthalene-2,6-diyl radical which is unsubstituted or substituted with 1 to 4 halogen atoms,
$A^4$ is

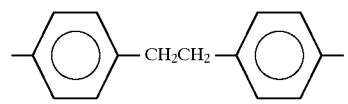

it being possible for radicals (a) and (b) to be substituted by CN or halogen and one of the 1,4-phenylene groups in (a) and (b) can also be replaced by a 1,4-phenylene radical in which one or two CH groups are replaced by N, and
Z is —CO—O—, —O—CO—, —$CH_2CH_2$— or a single bond.

The construction of the electrooptical system according to the present invention corresponds to the customary mode of construction for systems of this type. The term customary mode of construction is in this case broadly interpreted and includes all adaptations and modifications.

Thus, for example, the matrix formed by the transparent medium in which the liquid crystal mixture is microdispersed or microencapsulated, it arranged between conducting electrodes like a sandwich.

The electrodes are applied, inter alia, to substrate sheets of, for example, glass, plastic or the like; if desired, however, the matrix can also be provided directly with electrodes so that the use of substrates can be avoided. One of the electrodes forms an active matrix while the other one acts as counter electrode.

The precursor of the PDLC film comprising the precursor of the matrix, the liquid crystal mixture and one or more reactive liquid crystalline compounds can be capillary filled between two substrates which are provided with electrode layers, and the precursor of the PDLC film is subsequently cured, for example, by irradiation with UV light. Another technique comprises coating of the precursor of the PDLC film on a substrate with subsequent curing. The film may be peeled off and arranged between 2 substrates provided with electrode layers. It is also possible that the substrate onto which the precursor of the PDLC film is applied exhibits an electrode layer so that the electrooptical system can be obtained by applying a second electrode layer and, optionally, a second substrate onto the coated and cured film.

The electrooptical system according to the invention can be operated reflectively or transmissively so that at least one electrode and, if present, the associated substrate are transparent. Both systems customarily contain no polarizers, as a result of which a distinctly higher light transmission results. Furthermore, no orientation layers are necessary, which is a considerable technological simplification in the production of these systems compared with conventional liquid crystal systems such as, for example, TN or STN cells.

Processes for the production of PDLC films are described, for example, in U.S. Pat. Nos. 4,688,900, 4,673,255, 4,671,618, WO 85/0426, U.S. Pat. No. 4,435,047 EP 0,272,595, Mol. Cryst. Liq. Cryst, Inc. Nonlin. Opt. 157 (1988) 427, Liquid Crystals, 3 (1988) 1543, EP 0,165,063, EP 0,345,029, EP 0,357,234 and EP 0,205,261. The formation of the PDLC film is generally achieved by 3 basic methods: in the PIPS technique (=PIPS, polymerization induced phase separation) the liquid crystal mixture, and optionally further additives, are dissolved in the precursor of the matrix material, and subsequently polymerization is started. TIPS (=thermally induced phase separation) means that the liquid crystal mixture is dissolved in the melt of the polymer followed by cooling while SIPS (=solvent induced phase separation) starts with dissolving the polymer and the liquid crystal mixture in a solvent with subsequent evaporation of the solvent. The invention is, however, not restricted to these specific techniques but covers also electrooptical systems obtained by modified methods or other methods. The use of the PIPS technology is usually preferred.

The thickness d of the electrooptical system is customarily chosen to be small in order to achieve a threshold voltage $V_{th}$ which is as low as possible. Thus, for example, layer thicknesses of 0.8 and 1.6 mm are reported in U.S. Pat. No. 4,435,047, while values for the layer thickness between 10 and 300 µm are given in U.S. Pat. No. 4,688,900 and between 5 and 30 µm in EP 0,313,053. The electrooptical systems according to the invention only have layer thicknesses d greater than a few mm in exceptional cases; layer thicknesses below 200 µm and especially below 100 µm are preferred. In particular, the layer thickness is between 2 and 100 µm, especially between 3 and 50 µm and very particularly between 3 and 25 µm.

An essential difference between the electrooptical liquid crystal system according to the present invention and those customary higher to, however, consists in that the liquid crystal mixture contains one or more reactive liquid crystalline compounds.

The term relative liquid crystalline compounds denotes rod-like compounds of formula II

   II wherein at least one of the terminal groups R' and R" is a reactive group exhibiting one reaction site such as a hydroxyl group HOW'$_2$'C—, a thiol group HSW'$_2$C—, an amino group HW'N—, a carboxyl group, an epoxide group

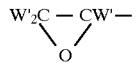

or an ioscyanate group O=C—N—, or a polymerizable reactive group exhibiting two or more reactive sites such as a vinyl type group W'$_2$C=CW'—, a (meth)acrylate type group

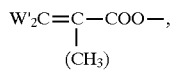

a styrene type group

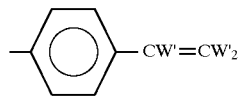

with W' being independently from each other H or an alkyl group with 1–5 C atoms, the other terminal group is also, independently from the first terminal group, a reactive group with one or more reactive sites or an alkyl radical with up to 15 C atoms which is unsubstituted or mono- or polysubstituted by halogen, it being also possible for one or more CH$_2$ groups in these radicals to be replaced, in each case independently of one another, by —O—, —S—, —CO—, —OCO—, —CO—O— or —O—CO—O— in such a manner that O atoms are not lined directly to one another.

G' is a rod-like diyl group of the formula

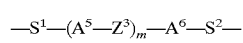

with $S^1$ and $S^2$ being independently from each other alkylene groups with 0–20 C atoms which can be linear or branched, it also being possible for one or more CH$_2$ groups to be replaced, in each case independently from each other, by —O—, —CO—, —S— or —NW'— with the proviso that O atoms are not linked directly to one another, $A^5$ and $A^6$ denote, independently from each other, a) a cyclohexylene group, wherein one or two non-adjacent CH$_2$ groups may be replaced by O or S atoms, b) an unsubstituted 1,4-phenylene group wherein one to three CH groups may be replaced by —N— or a 1,4-phenylene group which is mono- or polysubstituted by F, Cl and/or CH$_3$, c) a bicyclo(2,2,2)octylene group, a naphthalene-2,6-diyl group, a decahydronaphthaline-2,6-diyl group or 1,2,3,4-tetrahydronaphthaline group, $Z^3$ is independently from each other —CO—O—, —O—CO—, —CH$_2$CH$_2$—, —CH$_2$O—, —OCH$_2$—, —C≡C— or a single bond, and m denotes 1,2,3, or 4.

Above and below, the term reactive liquid crystalline compounds refers to reactive rod-lie molecules like, for example, those of formula III or other rod-lie reactive compounds which may be enantiotropic, monotropic or isotropic, preferably, however, enantiotropic or monotropic.

In a preferred embodiment of the electrooptical systems according to the present invention, at least one of R' and R" preferably is or contains an ene-group

When polymerizing the precursor of the PDLC film by impact of thermal energy or irradiation, usually in presence of an ionic or radical polymerization initiator, the reactive liquid crystalline compounds being contained in the liquid crystalline phase when phase separation starts, are reacted with each other thus obviously forming some internal structure in the liquid crystalline microdroplets. This structure may be considered as some kind of network which divides the liquid crystalline microdroplet in some smaller subcompartments which may be in contact with each other or be separated from each other. The term "some kind of network" is to be understood in a wide sense and comprises a wide range of geometries of the internal structure. The surrounding polymer matrix and the internal structure may be connected or not.

In another embodiment of the electrooptical systems according to the present invention, at least one of R' and R" is a reactive group exhibiting one reactive site, and in particular a hydroxyl group, a thiol group, a carboxyl group, an amino group or an ioscyanate group. Reactive liquid crystalline compounds of this type can be attached to the surrounding polymeric matrix in a coupling reaction or they can also react with each other, especially in case of suitably chosen co-reactive compounds of formula II. The coupling reaction may occur during the polymerization of the surrounding matrix or afterwards as a polymer-analogous reaction. In case of reactive liquid crystalline compounds of formula II exhibiting only one reactive group of the one reaction site type, it is assumed that the reactive group is coupled to the inner surface of the polymeric matrix with the rest of the molecule being arranged in the liquid crystalline microdroplet, inducting there same kind of internal structure.

The addition of one or more reactive liquid crystalline compounds of formula II exhibiting two reactive groups R' and R" to the liquid crystalline mixture is generally preferred. Also preferred is the addition of a reactive liquid crystalline component, containing at least two different reactive liquid crystalline compounds according to formula II at least one of which contains 2 reactive groups R' and R". Reactive liquid crystalline components containing at least one reactive liquid crystalline compound with one reactive group R' (monofunctional reactive liquid crystalline compound) and at least one reactive liquid crystalline compound with two reactive compounds (difunctional reactive liquid crystalline compound) often are especially preferred while reactive liquid crystalline components consisting of one or more monofunctional reactive liquid crystalline compounds usually are less advantageous.

Especially preferred difunctional reactive liquid crystalline compounds are di-ene type compounds such ad divinyls, diacrylates or dimethacrylates, furthermore diols, dithiols and diisocyanates, but also compounds with different reactive groups such as ene-ols, ene-thiols, vinylacrylates etc.

The groups $S^1$ and $S^2$ acting as spacer groups between the reactive groups R' and R" and the mesogenic core —($A^5$—$Z^3$)$_m$—$A^6$— are independently from each other an alkylene group with 0–20 C atoms which can be linear or branched, it also being possible for one or more $CH_2$ groups to be replaced, in each case independently from each other by —O—, —CO—, —S— or —NW'— with the proviso that oxygen atoms are not lined directly to one another.

The length and the structure of the groups $S^1$ and $S^2$ determine whether the mesogenic group exhibits a more or less pronounced degree of flexibility. The following list of suitable groups $S^1$ and $S^2$ is intended to be illustrative and not limiting:

ethylene, propylene, butylene, pentylene, hexylene, heptylene, octylene, decylene, undecylene, dodecylene, octadecylene, ethyleneoxyehtylene, methyleneoxybutylene, ethylenethioethylene, ethylene-N-methyliminoethylene, (1-oxy)methylene-oxyloxy, (2-oxy)ethylenoyloxy, (3-oxy)propyleneloxy, (4-oxy)butyleneoyloxy, (5-oxy)pentyleneoyloxy, (6-oxy)hexyleneoyloxy, (7-oxy)heptyleneoyloxy, (8-oxy)octyleneoyloxy, (1-oxy)methyleneoxycarbonyl (2-oxy)ethyleneoxycarbonyl, (3-oxy)propyleneoxycarbonyl, (4-oxy)butyleneoxycarbonyl, (5-oxy)pentyleneoxycarbonyl, (6-oxy)hexyleneoxycarbonyl, (7-oxy)heptyleneoxycarbonyl and (8-oxy)octyleneoxycarbonyl.

The mesogenic core —($A^5$—$Z^3$)$_m$—$A^6$— of the reactive liquid crystalline compounds can exhibit 2, 3, 4 or 5 rings:

$$—A^5—Z^3—A^6— \tag{1}$$

$$—A^5—Z^3—A^5—Z^3—Z^6— \tag{2}$$

$$—A^5—Z^3—A^5—Z^3—A^5—Z^3—A^6— \tag{3}$$

$$—A^5—Z^3—A^5—Z^3—A^5—Z^3—A^5—Z^3—A^6— \tag{4}$$

Especially preferred for use in the electrooptical systems according to the present invention are reactive liquid crystalline compounds exhibiting 2-, 3- or 4-ring mesogenic groups according to formula (1)–(3) and in particular 2- or 3-ring mesogenic groups according to formula (1) or (2).

In the following, for sake of simplicity, Cyc is a 1,4-cyclohexylene group, Phe is a 1,4-phenylene group which can be unsubstituted or mono-, di- or trifluorinated, Dio is a 1,3-dioxane-2,5-diyl group, Pyd is a pyridine-2,5-diyl group, Pyr is a pyrimidine -2,5-diyl group, Pip is a piperidine-1,4-tiyl group, Bio is a 1,4-bicyclo(2,2,2) octylene group, Nap is a naphthalene-2,6-diyl group and Thn is a 1,2,3,4-tetrahydronaphthalene-2,6-diyl group; the abbreviations Dio, Pyd, Pyr and Pip comprise all possible positional isomers.

Especially preferred is the following smaller group of mesogenic cores according to formula (2):

$$—Phe—Z^3—Phe— \tag{2a}$$

$$—Cyc—Z^3—Cyc— \tag{2c}$$

$$—Phe—Z^3—Cyc— \tag{2c}$$

$$—Pyr—Z^3—Phe— \tag{2d}$$

$$—Pyd—Z^3—Phe— \tag{2e}$$

$$—Dio—Z^{-Cyc-} \tag{2f}$$

In the structures according to formulae (2)a–(2)f $Z^3$ preferably is —COO—, —OCO—, —$CH_2CH_2$— or a single bond. Electrooptical system according to the present invention containing one or more reactive liquid crystalline compounds containing a two-ring mesogenic structure according to formulae (2)a–(2)c generally exhibit especially advantageous properties.

Especially preferred is also the use of reactive liquid crystalline compounds according to formula II which contain a mesogenic group with 3 rings according to formulae (3)a–(3)f:

$$—Phe—Z^3—Phe—Z^3—Phe— \tag{3a}$$

—Cyc—Z³—Phe—Z³—Phe—  (3)b

—Cyc—Z³—Cyc—Z³—Phe—  (3)c

—Cyc—Z³—Cyc—Z³—Cyc—  (3)d

—Pyr—Z³—Phe—Z³—Phe—  (3)e

—Pyd—Z³—Phe—Z³—Phe—  (3)f

Electrooptical systems containing both at least one 2-ring reactive liquid crystalline compound with a mesogenic group according to formula 2(a)–2(f) and at least one 3-ring reactive liquid crystalline compound with a mesogenic group according to formulae 3(a)–3(f) are preferred.

In the mesogenic structures of formulae (3)a–(3)f Z³ preferably is independently from each other a single bond, —COO—, —OCO— or —CH₂CH₂—. Especially preferred are the following combinations with —representing a single bond:

| first linking group | second linking group |
| --- | --- |
| — | — |
| — | CH₂CH₂ |
| CH₂CH₂ | CH₂CH₂ |
| OCO | COO |

Electrooptical systems containing one or more reactive liquid crystalline compounds according to formula II which contain a mesogenic group with 4 rings according to formulae (4)a–(4)f exhibit advantageous properties:

—Cyc—Z³—Phe—Z³—Phe—Z³—Phe—  (4)a

—Cyc—Z³—Cyc—Z³—Phe—Z³—Phe—  (4)b

—Cyc—Z³—Cyc—Z³—Cyc—Z³—Phe—  (4)c

—Cyc—Z³—Phe—Z³—Phe—Z³—Cyc—  (4)d

—Phe—Z³—Phe—Z³—Phe—Z³—Phe—  (4)e

—Cyc—Z³—Cyc—Z³—Cyc—Z³—Cyc—  (4)f

In the structure according to formula (4)a–(4)f at least one of Z³ preferably is a single bond. The other two linking groups preferably denote independently from each other a single bond, —COO—, —OCO— or —CH₂CH₂—.

Reactive liquid crystalline compounds have hitherto been known. EP 0,261,712, for example, describes liquid crystalline diacrylates of the formula

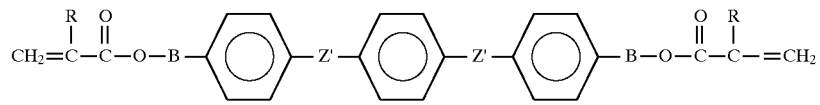

where R is a hydrogen atom or a methyl group, Z' is independently from each other —COO— or —OCO— (≡—OOC), and B is a flexible spacer, chosen from the group consisting of —(CH₂)$_x$—, —(CH₂)$_x$—O—, —(Si (CH₃)₂—O)$_x$— wherein x=1–5 or —(CH₂—CH₂—O)$_y$—O wherein y=1–8, for use in orientation layers of LCDs.

Hikmet describes in Mol. Cryst. Liq. Cryst., 198, 357–70 anisotropic gels which were obtained by curing a mixture of a low-molecular weight liquid crystal and liquid crystalline diacrylates.

The use of reactive liquid crystalline compounds in PDLC systems, however, is not reported in literature and it was completely surprising that PDLC systems the liquid crystalline mixture of which additionally contains one or more reactive liquid crystalline compounds, exhibits short switching times even at low temperature and simultaneously advantageous values of the switching voltages.

In the following table 1, the electrooptical properties of systems according to the invention are compared with the properties of a conventional PDLC system (comparative examples 1) resp. with the properties of PDLC systems containing non liquid-crystalline reactive monomers. NOA 65 (prepared by Norland Products) is used as the precursor of the matrix, and E7 from Merck Ltd., GB, which consists of 51.0% of 4-pentyl-4'-cycanobiphenyl 25.0% of 4-heptyl-4'-cycanobiphenyl 16.0% of 4-octoxy-4'-cycanobiphenyl 8.0% of 4-pentyl-4"-cycanoterphenyl is used as liquid crystalline mixture. The additives used in the respective experiments, and their amount with respect to the mass of the precursor of the PDLC film are given in table 1. The systems in each case are prepared by mixing and optionally heating the constituents of the precursor of the PDLC film to form a clear solution which subsequently is capillary filled together with spacers between 2 glass substrates which are provided with electrode layers. The system is then irradiated with light of suitable wavelength in order to cure the precursor; NOA 65 the composition of which is given in Molecular Crystals Liquid Crystals, 196 (1991), 89–102, contains benzopheone as a photoinitiator. The response time τ given in table 1 which is the sum of switching on and switching off times, is measured at a drive voltage of $1.5 \times V_{sat}$ with $V_{sat}$ being the lowest voltage for which maximum transmission is observed.

It is evident from table 1 that the addition of non-liquid crystalline reactive compounds to the precursor of the PDLC film does not affect the electrooptical properties of the cured PDLC film very much (comparative experiments no. 2 and no. 3). Both the saturation voltage and the switching times are comparable to the values obtained for a conventional system without any reactive additives (comparative experiment no. 1). The reason most presumably is that the non-liquid crystalline reactive additives are incorporated into the polymer matrix and do not give rise to an internal structure of the liquid crystalline microdroplets.

Contrary to this, experiments no. 1–4 show that a drastical reduction of switching times is obtained in case a reactive liquid crystalline compound is added to the precursor of the PDLC film. Especially pronounced is the reduction of switching time at the lower temperature of 0° C. While the conventional PDLC system of comparative experiment no. 1 exhibits a switching time τ (0° C.)=283 ms, the switching times of the systems according to the invention as prepared in experiments no. 2–4 exhibit switching times at 0° C. between 10 and 47 ms.

TABLE 1

Composition of the precursor of the PDLC film

| Experiments | Percentage of NOA 65 | Percentage of E 7 | Reactive additive |
|---|---|---|---|
| Comparative experiment No. 1 | 40% | 60% | — |
| Comparative experiment No. 2 | 40% | 58% | bisphenol A diacrylate |
| Comparative experiment No. 3 | 40% | 58% | 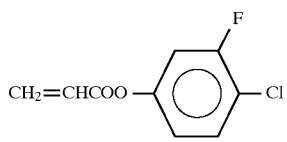 |
| Experiment No. 1 | 40% | 58% | 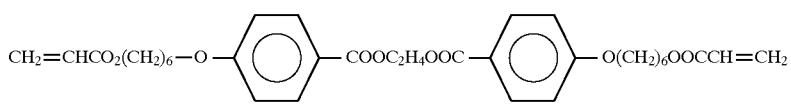 |
| Experiment No. 2 | 40% | 58% |  |
| Experiment No. 3 | 40% | 59.5% |  |
| Experiment No. 4 | 40% | 59.9% |  |

| Experiments | Percentage reactive | $\tau$ (20° C.)/ms | $\tau$ (0° C.)/ms | $V_{sat}/V$ |
|---|---|---|---|---|
| Comparative experiment No. 1 | — | 33 | 283 | 19 |
| Comparative experiment No. 2 | 2% | 48 | 193 | 24 |
| Comparative experiment No. 3 | 2% | 41 | 326 | 17 |
| Experiment No. 1 | 2% | 10 | 30 | 70 |
| Experiment No. 2 | 2% | 3 | 10 | 80 |
| Experiment No. 3 | 0.5% | 16 | 28 | 43 |
| Experiment No. 4 | 0.1% | 31 | 47 | 28 |

When comparing experiments no. 2–4 it can be concluded that the addition of a diacrylate component has contrary effects with respect to switching times and switching voltages. If the concentration of the diacrylate compound

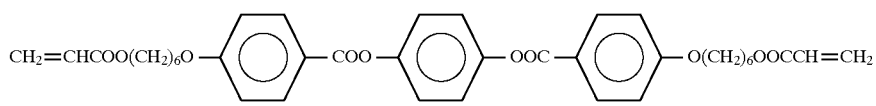

is chosen to be 2% with respect to the mass of the precursor of th PDLC film, the switching times both at 20° C. and 0° C. are very low while the saturation voltage is relatively high and distinctly higher than the saturation voltage of the conventional system according to comparative experiment no. 1.

Reducing the concentration of the diacrylate compound as low as 0.1% gives a saturation voltage of 28 V which is comparable to the saturation voltage of the conventional system according to comparative experiment no. 1, but a distinctly lower switching time especially at 0° C. The conditions of preparation are the same in all experiments listed in table 1 (mixing temperature of the precursor of the PDLC matrix, cooling rate, etc.) so that the distribution of microdroplet diameters can be assumed to be more or less the same.

Table 2 summarizes the electrooptical properties of systems each of them containing only one monofunctional reactive liquid crystalline compound. It can be taken from table 2 that the addition of monofunctional reactive liquid crystalline compounds alone is often less advantageous. Both in experiment no. 5 and no. 6 the switching times at least of 0° C. are inferior to the switching times of the conventional PDLC system according to comparative experiment No. 1. Especially disadvantageous is often the addition of monofunctional reactive liquid crystalline compounds wherein the non-reactive terminal group is a nitrile group. The use of monofunctional reactive liquid crystalline compounds with a less polar or unpolar non-reactive terminal group such as F, Cl, $CF_3$, $OCF_3$, $OCHF_2$, alkyl or alkoxy, however, and/or the use of reactive liquid crystalline components containing at least one difunctional and at least one monofunctional liquid crystalline compound, is often preferred.

compounds, must not be chosen too high and preferably is not more than 5% and especially less than 2.5% with respect to the mass of the precursor of the PDLC film. Particularly preferred are electrooptical systems according to the present invention the reactive liquid crystalline component of which amounts to not more than 1%.

For example, the mass ratio of reactive liquid crystalline compounds can amount to 0.01–5 wt. % with respect to the mass of the liquid crystalline mixture.

The reactive liquid crystalline compounds can be chosen from the great pool of known and new reactive liquid crystalline compounds embraced by formula II. The reactive liquid crystalline compounds preferably exhibit a high or very high solubility in the liquid crystal mixture.

The reactive liquid crystalline component preferably contains not more than 10 and in particular not more than 5 reactive crystalline compounds. Difunctional reactive liquid crystalline compounds are generally preferred and in case of these compounds, the reactive liquid crystalline component

TABLE 2

| | Composition of the precursor of the PDLC film | | | Electrooptical properties | | | |
|---|---|---|---|---|---|---|---|
| Experiments | Percentage of NOA 65 | Percentage of E 7 | Reactive additive | Percentage reactive | τ (20° C.)/ms | τ (0° C.)/ms | $V_{sat}$/V |
| Experiment No. 5 | 40% | 58% | $CH_2$=$CHCOO(CH_2)_7$—COO—⟨O⟩—⟨O⟩—$OC_8H_{17}$ (with F substituent) | 2% | 31 | >500 | 50 |
| Experiment No. 6 | 40% | 58% | $CH_2$=$CHCOO(CH_2)_7$—COO—⟨O⟩—⟨O⟩—CN | 2% | 500 | — | 13 |

Based on the experiments summarized in table 1 and 2 as well as on further extensive experimental studies, the present inventors have developed the following ideas in order to explain the effects observed when adding reactive liquid crystalline compounds to the precursor of the PDLC film:

The reactive liquid crystalline compounds which are completely soluble i.e., soluble at any concentration ratio of liquid crystal mixture and reactive additive) or at least highly soluble in the liquid crystal mixture, are polymerized and form a network or some other kind of structure within the droplets. The switching times are the lower the more close-meshed the substructure is. The reactive liquid crystalline compound binds into the interface of polymeric matrix and liquid crystal microdroplet which results in increased anchoring and hence restoring forces on the components of the liquid crystal mixture. This leads to an increase of the switching voltages which is the more pronounced the higher the concentration of the reactive liquid crystalline compounds is. The concentration of the reactive liquid crystalline component as therefore to be adjusted properly in order to realize a drastical reduction of switching times in connection with no or only a tolerable increase in switching voltages.

The explanation outlines is to be understood as hypothesis which does not restrict the present invention.

In extensive experiments it was found out that the concentration of the reactive liquid crystalline component which consists of one or more reactive liquid crystalline preferably contains 1–6, especially 1–3 and in particular not more than 2 reactive liquid crystalline compounds. Further preferred are reactive liquid crystalline components comprising at least one difunctional and one monofunctional reactive liquid crystalline compound. Further preferred are reactive liquid crystalline components comprising at least one monofunctional reactive liquid crystalline compound with the second terminal group being F, Cl, $CF_3$, $OCF_3$, $OCHF_2$ or non-polar group such as alkyl or alkoxy.

The present inventors further observed that electrooptical systems according to the present invention are characterized by advantageous electrooptical properties and that they exhibits, in particular, no or only very little memory effect.

DETAILED DESCRIPTION

Figure 1:
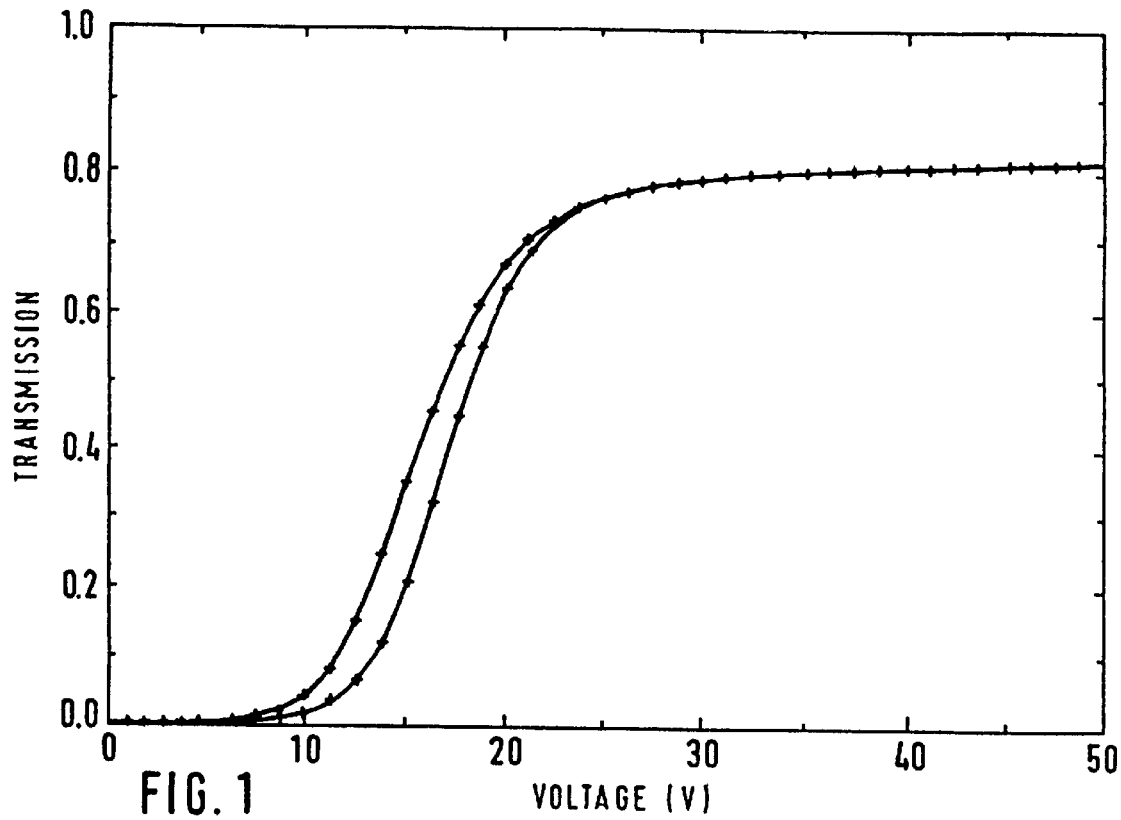
FIGS. 1–3 each illustrate electrooptical characteristic lines of conventional electrooptical systems.
Figure 2:
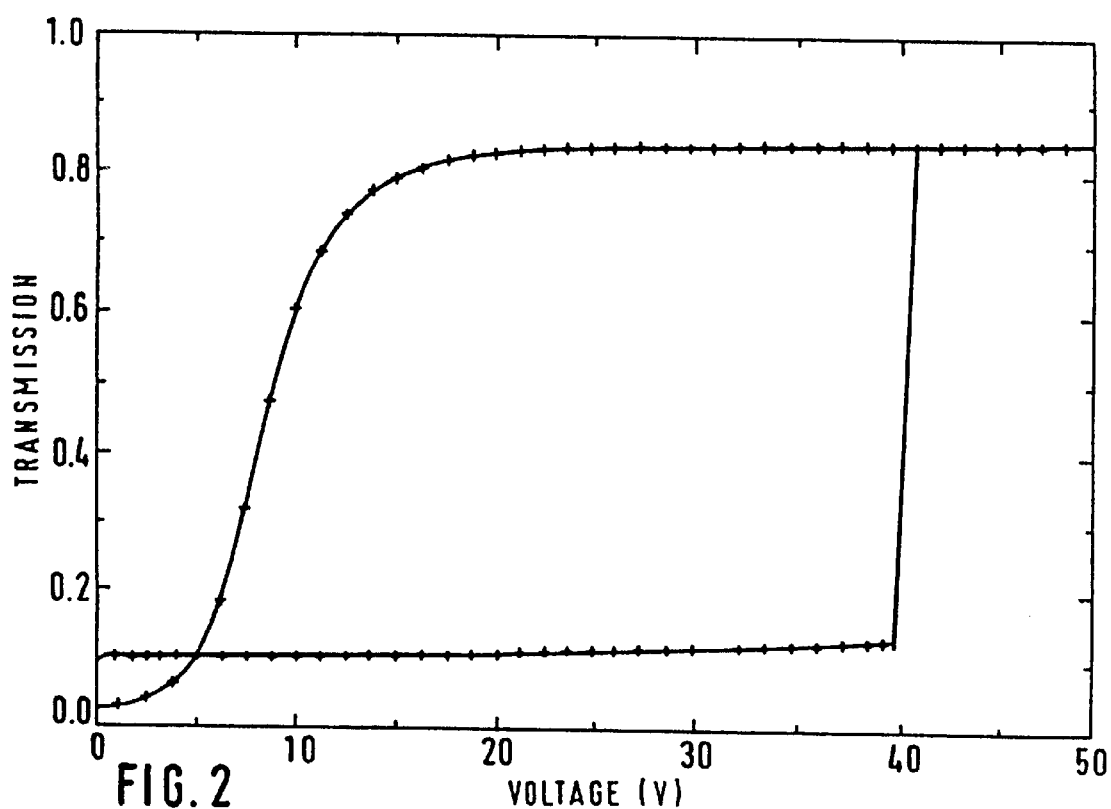
Figure 3:
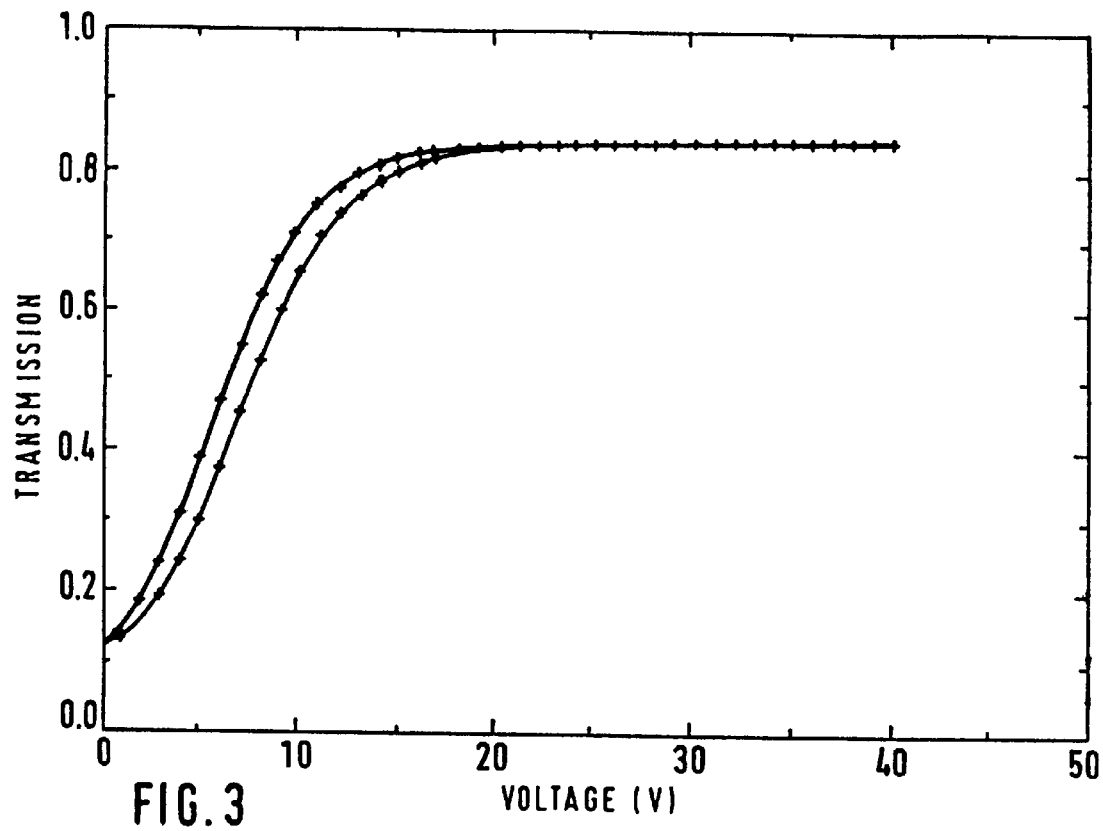

This memory effect which is often observed with conventional electrooptical systems the liquid crystal mixture of which contains no reactive liquid crystalline compounds, can be seen in FIG. 1–3 giving electrooptical characteristical lines for a conventional system the precursor of which has the following composition:

| | Liquid crystal mixture | 60% of BL036 |
|---|---|---|
| | Precursor of the matrix | 3.96% of TMPTMP |
| | | 18.0% of EHA |
| | | 4.8% of HDDA |
| | | 12.24% of E 270 |
| | | 1.0% of D 1173 (photo-initiator) |

BL36 is a liquid crystal mixture available through ML, Poole, BG; TMPTMP is trimethylolpropanetri(3-mercaptopropionate), EHA is 2-ethyl-hexanolacrylate; HDDA is hexanedioldiacrylate, E 270 is a commercially available oligomer (Ebecryl 270, aliphatic urethane diacrylate, molecular weight≈1,200) and D 1173 is Darocur 1173 available through E. Merck, Darmstadt.

FIG. 1 shows the electrooptical characteristic line for this system at 20° C. (d=20 μm); it exhibits an excellent electrooptical behavior and no memory effect: when switched on and off, the system has the same off-state transmission (or better opacity) as in the initial unswitched state.

The situation changes for higher temperatures. This can be seen from FIG. 2 which shows an electrooptical curve and the off-state transmission for the same system at 70° C. When switched off, the transmission is not as low as in the initial, unswitched state. This effect which is observed for most conventional systems especially at higher temperature is termed as memory effect.

FIG. 3 shows electrooptical curves for this system at 70° C. which were recorded after the off-switching in FIG. 2. When re-switched, the transmission starts at the high level of FIG. 2 and stops at this level during subsequent operations.

The system can be fully recovered only when it is being cooled to lower temperatures of, for example, 20° C. but the effect appears again when returning to higher temperatures of operation.

This effect is especially disadvantageous if the electrooptical system is to be operated over a wide range of temperatures, like, for example, in the case of out-door displays, transportable computers, etc.

Figure 4:
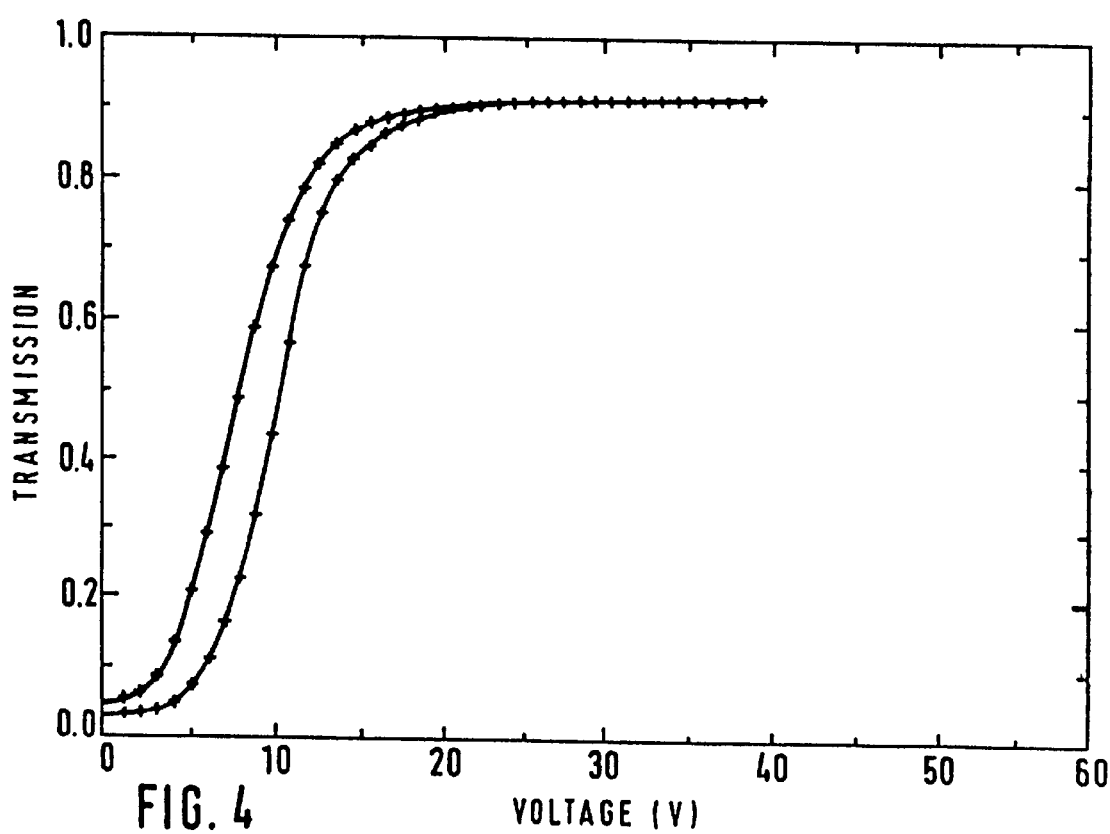
FIGS. 4–6 illustrate electrooptical characteristic lines of electrooptical systems acccording to the invention.

The present inventors now found that the electrooptical systems according to the present invention are characterized by a drastically reduced memory effect as can be seen from FIG. 4 showing an electrooptical characteristic line for a system according to the present invention the precursor of which contains 59.8% of BL36, 0.2% of

Figure 5:
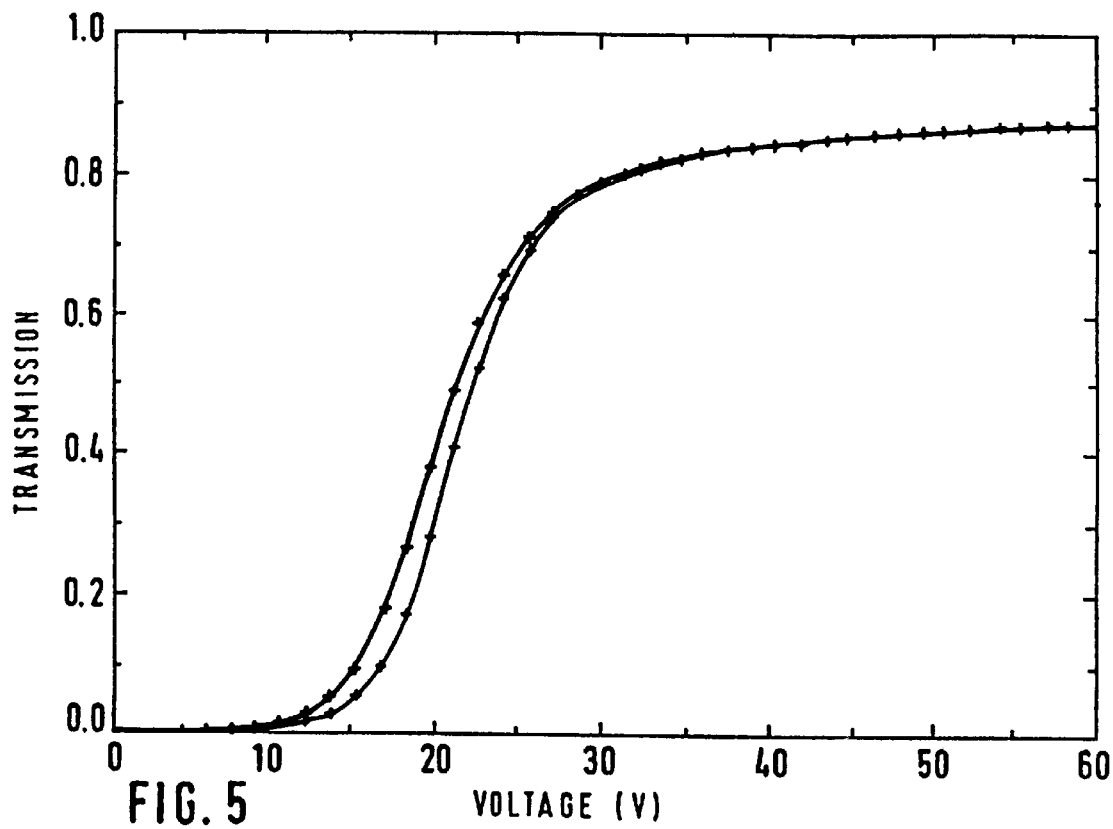

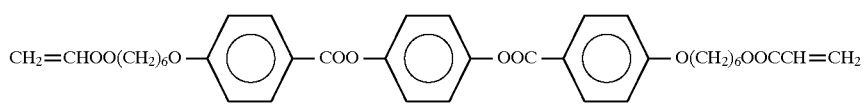

and the same precursor of the matrix used for the conventional systems of FIG. 1–3; d=20 μm. FIG. 5 shows the electrooptical characteristic line for this system according to the present invention at 20° C., which is excellent and only shows a slight increase with respect to $V_{sat}$ when compared to the system of FIG. 1. The properties of the systems of FIG. 1 and FIG. 5 are compared in the following table with $T_{on}$ resp. $T_{off}$ being on-state resp. off-state transmission.

| | $V_{sat}$ | $T_{on}$ | $T_{off}$ |
|---|---|---|---|
| System of FIG. 1 | 23.6 | 0.185 | 0.004 |
| System of FIG. 5 | 30.1 | 0.874 | 0.005 |

Figure 6:
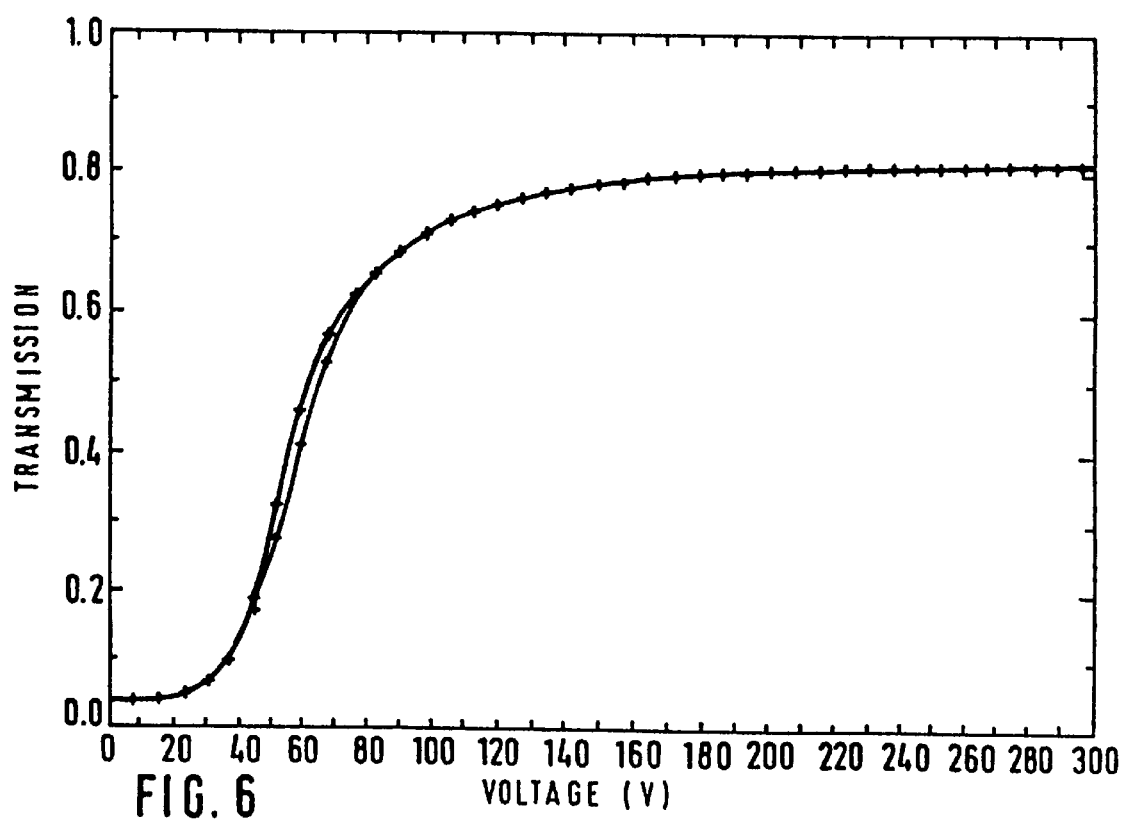

The memory effect can be completely suppressed if the concentration of the reactive liquid crystalline component is chosen to be higher, as can be seen from FIG. 6. This FIG. shows an electrooptical curve at 70° C. for a system according to the present invention which contains 58% of BL36, 2% of the reactive liquid crystalline compound used in FIG. 4 and the same precursor of the matrix as in the system of FIG. 4.

No memory effect is observed but the saturation voltage is at the same time considerably increased in comparison to the saturation voltage of the system of FIG. 1 as was noted already above. Electrooptical systems according to the present invention, the reactive liquid crystalline component of which amounts are not more than 1% quite generally represent a very low memory effect on the one hand and a small and at any rate tolerable increase of the saturation voltage on the other hand.

Summarizing it can be stated that the electrooptical systems according to the present invention are characterized by advantageous electrooptical properties and, in particular, by low switching times, especially at low temperatures, and a considerably reduced memory effect.

The liquid crystalline mixture used in the electrooptical systems according to the invention contains at lest 2 non-reactive liquid crystalline compounds which, for the sake of simplicity, are also simply termed as liquid crystalline compounds. The liquid crystalline mixture preferably comprises at least one compound of formula I

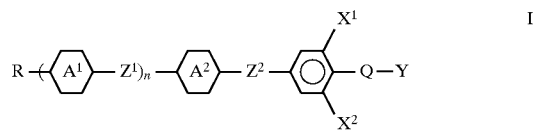

in which $Z^1$ and $Z^2$ independently on one another, are a single bond, —CH$_2$CH$_2$—, —COO—, —OCO— or —C≡C—,

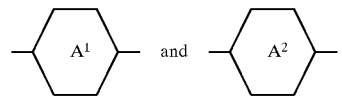

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene and one of

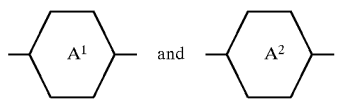

may also by pyrimidine-2,5-diyl, pyridine-2,5-diyl or trans-1,3-dioxane-2,5-diyl, $X^1$ and $X^2$ independently from one another, are H or F, Q is $CF_2$, $OCF_2$, $C_2F_4$ or a single bond, Y is H, F, Cl or CN, n is 0, 1 or 2, and R is alkyl having up to 13 C atoms, in which one or two non-adjacent $CH_2$ groups can also be replaced by —O— and/or —CH=CH—.

In the following, for the sake of simplicity, Phe is 1,4-phenylene, Phe.2F is 2-fluoro-1,4-phenylene, Phe.3F is 3-fluoro-1,4-phenylene, Cyc is trans-1,4-cyclohexylene, Pyr is pyrimidine-2,5-diyl and Pyd is pyridine-2,5-diyl, the two abbreviations Pyr and Pyd comprising in each case the two possible positional isomers. Furthermore, Phe.(F) is intended to designate a 1,4-phenylene group which may be unsubstituted or monosubstituted by fluorine in the 2 or 3 position. Phe.2F3F and Phe.3F5F are a 1,4-phenylene group which is difluorinated in the 2 and 3, and 3 and 5 position respectively. Liquid crystal compounds according to formula I, wherein Y is H, F or Cl will be termed in the following as SFM compounds (superfluorinated materials) according to formula I.

Electrooptical systems whose liquid crystal mixture contains one or more binuclear compounds of the formula I2 are preferred:

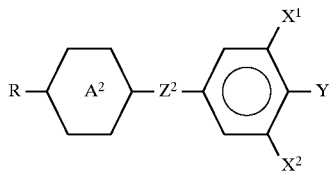

In the compounds of the formula I2, R is preferably alkyl or alkoxy having 1–10, but in particular 1–8, C atoms, the straight-chain radicals being preferred. Furthermore, n-alkoxyalkyl compounds and in particular n-alkoxymethyl and n-alkoxyethyl compounds are preferred.

$Z^2$ is preferably —$CH_2CH_2$—, —COO— or a single bond, in particular a single bond or —$CH_2CH_2$— and very particularly a single bond. Y is —F, —Cl, —CN, —$OCHF_2$, —$OCF_3$ or —$CF_3$, preferably —F, —Cl or —CN; in case of actively addressed PDLC systems according to the present invention Y is preferably —F, —Cl or —$OCF_3$.

Compounds of the formula I2 in which at least one of $X^1$ and $X^2$ is different from H are particularly preferred.

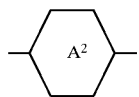

is preferably Cyc, Phe.(F), Phe.3F5F, Phe.2F3F, Pyr, Pyd or Dio and in particular Cyc, Phe.(F), Phe.3F5F, Phe.2F3F, Pyr or Pyd.

Furthermore, electrooptical system whose liquid crystal mixture contains one or more trinuclear compounds of the formula I3 are preferred:

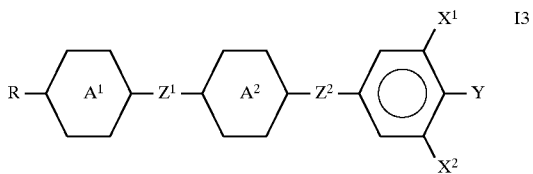

In the compound of the formula I3, R is preferably n-alkyl or n-alkoxy having 1–10 C atoms, furthermore also n-alkoxymethyl or n-alkoxyethyl having 1–8 C atoms and n-alkenyl having up to 7 C atoms.

Very particular preference is given to compounds of the formula I3 in which R is methyl, ethyl, propyl, butyl, pentyl, hexyl, heptyl, octyl, nonyl, decyl, methoxy, ethoxy, propoxy, butyoxy, pentoxy, hexoxy, heptoxy, octoxy, methoxymethyl, ethoxymethyl, propoxymethyl, butoxymethyl, methoxyethyl, ethoxyethyl or propoxyethyl. $Z^1$ and $Z^2$ in the compounds of the formulae I3 are, independently of one another, preferably —$CH_2CH_2$—, —COO— or a single bond and in particular —$CH_2CH_2$— or a single bond. Particular preference is given to those compounds of the formula I3 in which at least one of $Z^1$ or $Z^2$ is a single bond. Y is —F, —Cl, —CN, —$OCHF_2$, —$OCF_3$ or —$CF_3$ and preferably —F, —Cl, —CN, —$OCHF_2$ or —$OCF_3$; in case of actively addressed PDLC systems according to the present invention Y is in particular —F, —Cl, —$OCHF_2$ and —$OCF_2$.

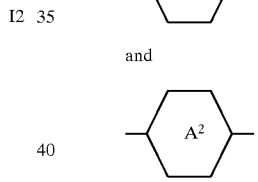

are, independently of one another, Cyc, Phe.(F), Phe.2F3F, Phe.3F5F, Pyr, Pyd and Dio and in particular Cyc, Phe.(F), Phe.2F3F, Phe.3F5F, Pyr and Pyd.

Furthermore, electrooptical systems whose liquid crystal mixture contains one or more tetranuclear compounds of the formula I4 are preferred:

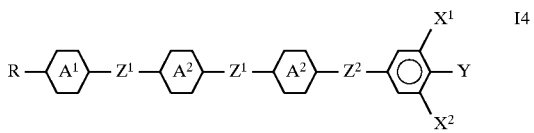

In the compounds of the formulae I4, R is preferably n-alkyl or n-alkoxy having 1–10 C atoms, furthermore also n-alkoxymethyl or n-alkoxyethyl having 1–8 C atoms.

Very particular preference is given to compounds of the formulae I4 in which R is methyl, ethyl, propyl, butyl, pentyl, hexyl, heptyl, octyl, nonyl, decyl, methoxy, ethoxy, propoxy, butoxy, pentoxy, hexoxy, heptoxy or octoxy.

In the compounds of the formula I4, preferably not more than 2 and in particular only one of the bridges $Z^1$ and $Z^2$ are different from a single bond.

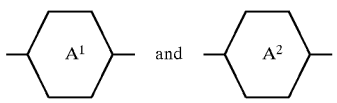

are preferably, independently of one another, Cyc, Phe.2F, Phe.3F, Phe, Pyr or Pyd. Compounds of the formula I4 in which at least one of

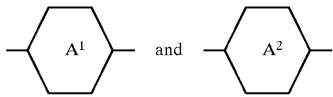

is Phe.2F, or Phe.3F are preferred. The weight proportion of the compounds of the formulae I4 in the liquid crystal mixture of the electrooptical systems according to the invention is preferably not too high and is in particular less than 20%, the use of laterally fluorinated compounds of the formula I4 being in many cases preferred.

The proportion of the compounds of the formula I in the liquid crystal mixtures used according to the invention is preferably not too small and is in particular more than 15% and very particularly more than 20%. Liquid crystal mixtures containing more than 40% and in particular not less than 50% of compounds of the formula I are particularly preferred.

The liquid crystal mixtures used according to the invention can contain further components which are preferably selected from nematic or nematogenic (monotropic or isotropic) substances, in particular substances from the group comprising azoxybenzones, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoate, cyclohexylphenyl cyclohexanecarboxylate, or cyclohexylphenyl cyclohexylcyclohexanecarboxylate, phenylcyclohexanes, cyclohexylbiphenyls, phenylcyclohexycyclohexanes, cyclohexylcyclohexanes, cyclohexylcyclohexenes, cyclohexylcyclohexylcyclohexenes, 1,4-bis(cyclohexyl) benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electrooptical systems according to the invention preferably also contain one or more dielectrically neutral compounds of the formulae 1–5:

In the formulae 1 and 2 L and E, which may be identical or different, are each, independently of one another, a bivalent radical from the group comprising —Phe—, —Cyc—, —Phe—Phe—, —Phe—Cyc—, —Cyc—Cyc—, —Pyr—, —Dio—, —G*—Phe— and —G*—Cyc— and mirror images thereof, Phe being unsubstituted or fluorine-substituted 1,4-phenylene, Cyc being trans-1,4-cyclohexylene or 1,4-cyclohexenylene, Pyr being pyrimidine-2,5-diyl or pyridine-2,5-diyl, Dio being 1,3-dioxane-2,5-diyl and G* being 2-(trans-1,4-cyclohexyl) ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe—Cyc. The liquid crystals according to the invention preferably contain one or more components selected from compounds of the formulae 1 and 2, in which L and E are selected from the group comprising Cyc, Phe and Pyr and simultaneously one or more components are selected from the compounds of the formulae 1 and 2, in which one of the radicals L and E is selected from the group comprising Cyc, Phe and Pyr and the other radical is selected from the group comprising —Phe—Phe—, —Phe—Cyc—, —Cyc—Cyc—, —G*—Phe— and —G*—Cyc—, and, if desired, one or more components are selected from the compounds of the formulae 1 and 2, in which the radicals L and E are selected from the group comprising —Phe—Cyc—, —Cyc—Cyc—, —G*—Phe— and —G*—Cyc—.

R* and R** in the compounds of the formulae 1 and 2 are each, independently of one another, preferably alkyl, alkenyl, alkoxy, alkenyloxy or alkanoyloxy having up to 8 carbon atoms. In most of the compounds, R* and R** are different from one another, one of these radicals being in particular alkyl, alkoxy or alkenyl.

Especially preferred is the following smaller group of dielectrically neutral compounds of formulae 3 and 4

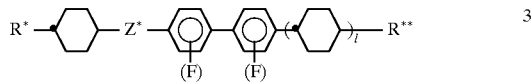

wherein
the meaning of R* and R** is the same as given for formulae 1 and 2,
Z* is independently from each other a single bond or —CH$_2$CH$_2$—,
l and m are independently from each other 0 or 1, and

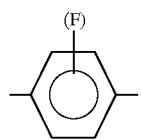

denotes 1,4-phenylene, 2-fluoro-1,4-phenylene or 3-fluoro-1,4-phenylene.

The weight proportion of the compounds of the formulae 1–4 in the liquid crystals used according to the invention is preferably 0–50% and in particular 0–40%.

The liquid crystal mixtures used in the electrooptical systems according to the invention preferably contain 1–98%, in particular 5–05%, of compounds of the formula 1. The liquid crystals preferably contain 1–20, but in particular 1–15, and very particularly 1–12, compounds of the formula I.

One skilled in the art can select additives for the liquid crystal mixtures described from the large pool of nematic or nematogenic substances in such a manner that the birefringence Δn and/or the ordinary refractive index $n_o$ and/or other refractive indices and/or the viscosity and/or the dielectric anisotropy and/or further parameters of the liquid crystal are optimized with respect to the particular application.

The liquid crystal mixture can contain further additives such as, for example, chiral compounds and other customary additives. The concentration of such additives is preferably not more than 7.5% and, in particular, lower than 5%.

Formula II embraces both known and new reactive liquid crystalline compounds, and the present invention also relates to the new reactive liquid crystalline compounds of formula II.

Specifically, the reactive liquid crystalline compounds known so far are often characterized by high or very high melting points and values of the birefringence which are not high enough for many applications.

The present invention found in extensive investigations that the compounds according to formula III

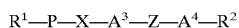

wherein
$R^1$ is $CH_2=CW-COO-$, $CH_2=CH-$,

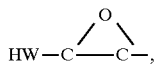

$HWN-$, $HS-CH_2-(CH_2)_m-COO-$ with W being H, Cl or alkyl with 1–5 C atoms and m being 1–7, P is alkylene with up to 12 C atoms, it being also possible for one or more $CH_2$ groups to be replaced by O, X is $-O-$, $-S-$, $-COO-$, $-OCO-$ or a single bond, $R^2$ is alkyl radical with up to 15 C atoms which is unsubstituted, mono-or polysubstituted by halogen, it being also possible for one or more $CH_2$ groups in these radicals to be replaced, in each case independently of one another, by $-O-$, $-S-$, $-CO-$, $-OCO-$, $-CO-O-$ or $-O-CO-O-$ in such a manner that oxygen atoms are not linked directly to one another, $-CN$, $-F$, $-Cl$ or alternatively $R^2$ has one of the meanings given for $R^1-P-X$, $A^3$ is a 1,4-phenylene or a naphthalene-2,6-diyl radical which both can be unsubstituted or substituted with 1 to 4 halogen atoms, or trans-1,4-cyclohexylene $A^4$ is

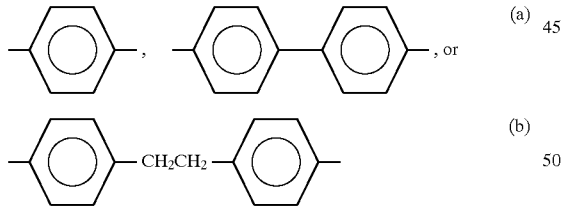

it being possible for the 1,4-phenylene groups in radicals (a) and (b) to be substituted by CN or halogen and one of the 1,4-phenylene groups in (a) and (b) can also be replaced by a 1,4-phenylene radical in which one or two CH groups are replaced by N, and Z is $-CO-O-$, $-O-CO-$, $-CH_2CH_2-$ or a single bond, exhibit favorable properties and, in particular, advantageous values of birefringence and melting point.

Electrooptical systems according to the present invention the reactive liquid crystalline component of which contains at least one compound according to formula III, exhibit especially advantageous properties.

Formula III covers reactive liquid crystalline compounds with 3 rings of formulae III1–III20

| | |
|---|---|
| $R^1-P-X-Phe'-Z-Phe''-Phe''-R^2$ | III1 |
| $R^1-P-X-Phe'-Z-Pyd-Phe''-R^2$ | III2 |
| $R^1-P-X-Phe'-Z-Pyr-Phe''-R^2$ | III3 |
| $R^1-P-X-Phe'-Z-Phe''-Pyd-R^2$ | III4 |
| $R^1-P-X-Phe'-Z-Phe''-Pyr-R^2$ | III5 |
| $R^1-P-X-Phe'-Z-Phe''-CH_2CH_2-Phe''-R^2$ | III6 |
| $R^1-P-X-Phe'-Z-Pyd-CH_2CH_2-Phe''-R^2$ | III7 |
| $R^1-P-X-Phe'-Z-Pyr-CH_2CH_2-Phe''-R^2$ | III8 |
| $R^1-P-X-Phe'-Z-Phe''-CH_2CH_2-Pyd-R^2$ | III9 |
| $R^1-P-X-Phe'-Z-Phe''-CH_2CH_2-Pyr-R^2$ | III10 |
| $R^1-P-X-Nap'-Z-Phe''-Phe''-R^2$ | III11 |
| $R^1-P-X-Nap'-Z-Pyd-Phe''-R^2$ | III12 |
| $R^1-P-X-Nap'-Z-Pyr-Phe''-R^2$ | III13 |
| $R^1-P-X-Nap'-Z-Phe''-Pyd-R^2$ | III14 |
| $R^1-P-X-Nap'-Z-Phe''-Pyr-R^2$ | III15 |
| $R^1-P-X-Nap'-Z-Phe''-CH_2CH_2-Phe''-R^2$ | III16 |
| $R^1-P-X-Nap'-Z-Pyd-CH_2CH_2-Phe''-R^2$ | III17 |
| $R^1-P-X-Nap'-Z-Pyr-CH_2CH_2-Phe''-R^2$ | III18 |
| $R^1-P-X-Nap'-Z-Phe''-CH_2CH_2-Pyd-R^2$ | III19 |
| $R^1-P-X-Nap'-Z-Phe''-CH_2CH_2-Pyr-R^2$ | III20 |

In the compounds of formulae III1–III10, Phe' denotes a 1,4-phenylene group

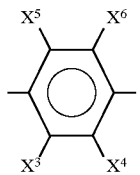

wherein $X^3-X^6$ denotes independently from each other H or halogen;

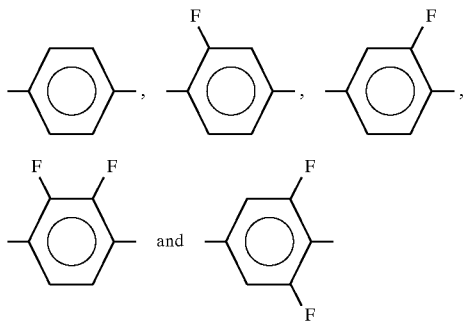

are preferred.

In the compounds of formulae III1–III20, Phe" is a 1,4-phenylene group, which is unsubstituted or mono- or polysubstituted by CN or halogen, and in formulae III15–III20, Nap' is a naphthalene 2,6-diyl group

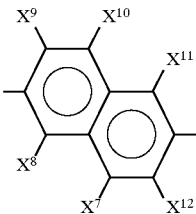

which is unsubstituted or wherein up to 4 of $X^7$–$X^{12}$ are independently from each other halogen while the other denote H.

The compounds of formulae III1–III20 are preferred. Especially preferred are the compounds of formulae III1–III3, III6–III10, III13–III15, and III18–III20, and, in particular the compounds of formulae III1, III8, III15 and III20.

In the compounds of formulae III1–III20 $R^1$ is $CH_2$=CW—COO—, $CH_2$=CH—,

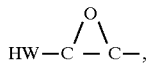

HWN—, HS—$CH_2$—$(CH_2)_m$—COO— with W being H, Cl or alkyl with 1–5 C atoms and m being 1–7.

Preferably, $R^1$ is a vinyl group, an acrylate group, an amino group or a mercapto group, and especially prefered are the following meanings of $R^1$:

| | |
|---|---|
| $CH_2$=CH—COO— | $R^1$-1 |
| $CH_2$=C—COO—<br>\|<br>$CH_3$ | $R^1$-2 |
| $CH_2$=C—COO—<br>\|<br>Cl | $R^1$-3 |
| $CH_2$=CH— | $R^1$-4 |
| $H_2$N— | $R^1$-5 |
| H(alkyl)N— | $R^1$-6 |
| HS—$CH_2$—$(CH_2)_m$—COO— | $R^1$-7 | with alkyl denoting $C_1$–$C_3$-alkyl and m being 1–5.

In the compounds of formulae III1–III20, the spacer-type group P is alkylene with up to 24 C atoms, it is also being possible for one or more non adjacent $CH_2$ groups to be replaced by O.

In case P is alkylene, P may be straight-chain or branched. P especially preferred is ethylene, propylene, butylene, 1-methyl-propylene, 2-methyl-propylene, pentylene, 1-methyl-butylene, 2-methyl-butylene, hexylene, 2-ethyl-butylene, 1,3-dimethyl-butylene, hephylene, 1-methylhexylene, 2-methylhexylene, 3-methylhexylene, 4-methylhexylene, 5-methylhexylene, 6-methylhexylene, octylene, 3-ethyl-hexylene, nonylene, 1-methyloctylene, 2-methyloctylene, 7-methyloctylene, decylene, undecylene, dodecylene, 2-methylundecylene, 2,7,5-trimethyl-nonylene or 3-propyl-nonylene.

In case P is mono- or polyoxaalkylene, P may be straight-chain or branched. In particular, P is 1-oxa-ethylene, 1-oxapropylene, 2-oxapropylene, 1-oxa-butylene, 2-oxabutylene, 1,3-dioxabutylene, 1-oxa-pentylene, 2-oxa-pentylene, 3-oxa-pentylene, 2-oxa-3-methyl-butylene, 1-oxahexylene, 2-oxa-hexylene, 3-oxa-hexylene, 1,3-dioxa-hexylene, 1,4-dioxa-hexylene, 1,5-dioxa-hexylene, 1-oxa-heptylene, 2-oxa-heptylene, 1,3-dioxa-heptylene, 1,4-dioxa-heptylene, 1,5-dioxa-heptylene, 1,6-dioza-heptylene, 1,3,5-trioxa-heptylene, 1-oxa-octylene, 2-oxa-octylene, 3-oxa-octylene, 4-oxa-octylene, 1,3-dioxaoctylene, 1,4-dioxa-nonylene, 1,4-dioxa-decylene, 1,4-dioxa-undecylene and 1,3,5-trioxa-dodecylene.

X is —O—, —S—, —COO—, —OCO— or a single bond and in particular —O—, —COO—, —OCC— or a single bond. In case X is —O—, —S— or —OCO—, the adjacent $CH_2$-group of P is not replaced by —O—.

Z is —COO—, —OCO—, —$CH_2CH_2$— or a single bond. In the compounds of formulae III1–III7 and III15–III19, Z preferably is —COO—, —OCO—, —$CH_2CH_2$— or a single bond and, in particular, —COO—, —OCO— or a single bond. In the compounds of formulae III8–III14 and III20, Z preferably is —$CH_2CH_2$— or a single bond.

$R^2$ can be an alkyl radical with up to 15 C atoms which is unsubstituted, mono- or polysubstituted by halogen, it also being possible for one or more $CH_2$ groups in these radicals to be replaced, in each case independently from one another, by —O—, —S—, —CO—, —OCO—, —COO— or —O—COO— in such a manner that oxygen atoms are not linked directly to one another.

If $R^2$ is an alkyl radical or alkoxy radical, it may be straight-chain or branched. Preferably, it is straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy or octoxy, and furthermore methyl, nonyl, decyl, undecyl, tridecyl, tetradecyl, pentadecyl, methoxy, nonoxy, decoxy, undecoxy, dodecoxy, tridecoxy or tetradecoxy.

If $R^2$ is oxaalkyl, it is preferably straight-chain 2-oxapropyl (=methoxymethyl), 2-oxabutyl (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7-or 8-oxanonyl, 2-, 3-, 4-, 5-, 6-, 7-, 8-, or 9-oxadecyl.

Preferred branched radicals $R^2$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methyloctoxy, 6-methyloctanyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxypentyl, 2-methyl-3-oxahexyl.

$R^2$ can also be a polar terminal group and in particular —CN, —Cl or —F; $R^2$ can also be —(L)-$C_dH_eF_{2d+1-e}$ wherein L is a single bond —O— or —S—, d is 1 or 2 and e is 0, 1, 2, 3, 4 or 5.

$R^2$ can also have one of the meanings given for $R^1$—P—X— above. In case $R^2$ is an—optionally substituted—alkyl radical, $R^1$ preferable is a vinyl or acrylate group while in case $R^2$ is $R^1$—P—X, all meanings give above for $R^1$ are preferred.

Especially preferred is the following smaller groups of reactive liquid crystalline compounds according to formula III1:

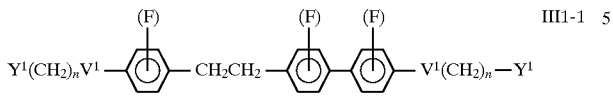

wherein
- $Y^1$ is independently from each other $CH_2=CW^1COO—$, $CH_2=CH—$ or $HS—CH_2—(CH_2)_m COO—$,
- $V^1$ is independently from each other $—O—$, $—COO—$, $—OOC—$, $—S—$ or a single bond,
- $W^1$ is independently from each other H, Cl or $CH_3$,
- n is independently from each other 2–12,
- m is independently from each other 1–7, and

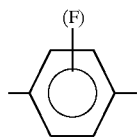

is independently from each other 1,4-phenylene, 2-fluoro-1,4-phenylene, 3-fluoro-1,4-phenylene, 2,6-difluoro-1,4-phenylene or 2,3,6-trifluoro-1,4-phenylene.

The compounds according to formula III-1 may be laterally unsubstituted (all groups

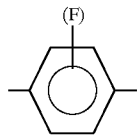

denote 1,4-phenylene) or 1, 2 or 3 1,4-phenylene groups may be substituted independently from each other by 1, 2 or 3 F atoms. Laterally fluorinated compounds are preferred.

Especially preferred are compounds according to formula III1-1 wherein $Y^1$ is $CH_2=CHCOO$, $V^1$ is O and

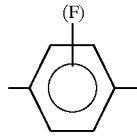

is independently from each other 1,4-phenylene or 2-fluoro- or 3-fluoro-1,4-phenylene. The compounds of this smaller subclass of compounds according to formula III1-1 are characterized by advantageous values of birefringence and by low melting points.

Especially preferred is also the following smaller group of compounds according to formula III8:

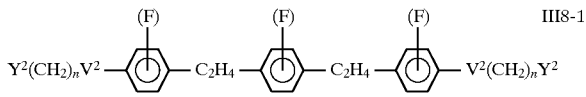

wherein
- $Y^2$ in independently from each other $CH_2=CHCOO—$, $CH_2=C(CH_3)—COO—$ or $CH_2—CH—$,
- $V^2$ is independently from each other $—O—$ or a single bond,
- n is independently from each other 2–12, and

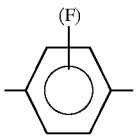

has the meaning indicated for III1-1.

The compounds according to this formula may be laterally unsubstituted (all groups

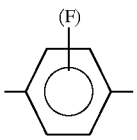

denote 1,4-phenylene) or 1, 2 or 3 1,4-phenylene groups may be substituted independently from each other by 1, 2 or 3 F atoms. Laterally fluorinated compounds are preferred.

Especially preferred are compounds according to formula III8-1 wherein $Y^1$ is $CH_2=CH—COO—$ and $V^2$ is $—O—$. The compounds according to formula III8-1 exhibit especially advantageous melting points.

Especially preferred are further compounds according to the following formula

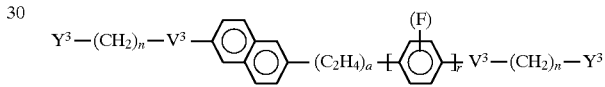

wherein
- $Y^3$ is independently from each other $CH_2=CW^3COO—$, $CH_2=CH—$ or $HSCH_2(CH_2)_m—COO—$,
- $V^3$ is independently from each other $—O—$, $—COO—$, $—OOC—$, $—S—$ or a single bond,
- $W^3$ is independently from each other H, Cl or $CH_3$,
- a is 0 or 1,
- n is independently from each other 2–12,
- r is 1 or 2,
- m is independently from each other 1–7, and

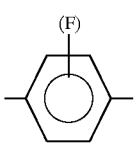

has the meaning indicated for III1-1.

Compounds of this type are partially covered by formula III11 (r=2). Particularly preferred are compounds of this type
wherein
- $Y^3$ is $CH_2=CW^3COO—$
- n is independently from each other 3–11 and in particular 4, 5, 6, 7 or 8,
- V3 is $—O—$ or a single bond, and
- r is 1.

The compounds of this specific subgroup are characterized by advantageous values of the melting point and the birefringence.

Especially preferred is further the following smaller group of reactive liquid crystalline compounds according to the following formula

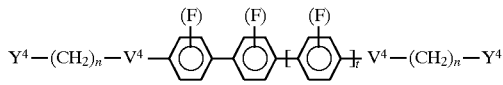

wherein $Y^4$ is independently from each other $CH_2=CW^4COO-$, $CH_2=CH-$ or $HSCH_2(CH_2)_mCOO-$, $V^4$ is independently from each other $-O-$, $-COO-$, $-OCO-$, $-S-$ or a single bond, $W^4$ is independently from each other H, $CH_3$ or Cl, m is independently from each other 1–7, n is independently from each other 1–12, t is 0, 1 or 2, and

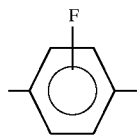

has the meaning indicated for III1-1. Compounds of this type are partly covered by formula III1.

The compounds according to this formula may be laterally unsubstituted (all groups

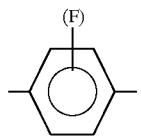

denote 1,4-phenylene) or 1, 2 or 3 1,4-phenylene groups may be substituted independently from each other by 1, 2 or 3 F atoms. Laterally fluorinated compounds are preferred.

Particularly preferred is the following rather small group of compounds:

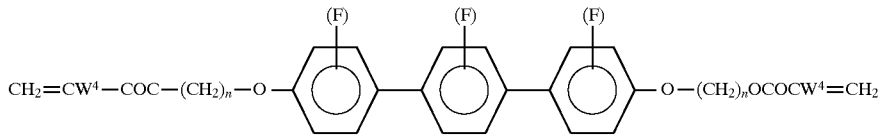

The compounds of this specific subgroup are characterized by advantageous values of the melting point and the birefringence.

Especially preferred is further the following smaller group of reactive liquid crystalline compounds according to the following formula

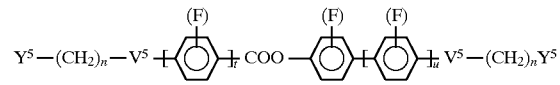

wherein $Y^5$ is independently from each other $CH_2=CW^5COO-$, $CH_2=CH-$ or $HSCH_2(CH_2)_mCOO$, $V^5$ is independently from each other $-O-$, $-COO-$, $-OCO-$, $-S-$ or a single bond, $W^5$ is independently from each other H, $CH_3$ or Cl, n is independently from each other 1–12, m is 1–7, t and u are independently from each other 0, 1 or 2 with the proviso that t+u=1, 2 or 3.

and

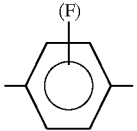

has the meaning indicated for III1-1.

The compounds according to formula III-1 may be laterally unsubstituted (all groups

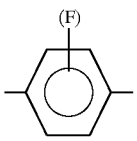

denote 1,4-phenylene) or 1, 2 or 3 1,4-phenylene groups may be substituted independently from each other by 1, 2 or 3 F atoms. Laterally fluorinated compounds are preferred.

Compounds of this type are partly covered by formula III1. Particularly preferred in the following rather small group of compounds:

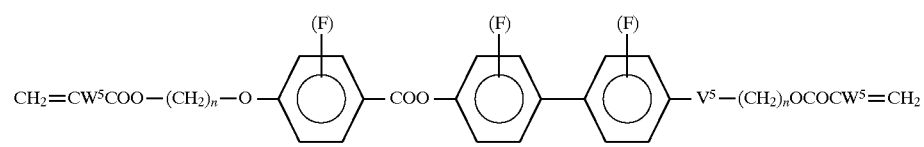

Especially preferred is further the following smaller group of compounds:

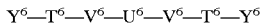

wherein
Y$^6$ is independently from each other CH$_2$=CW$^6$COO—, CH$_2$=CH— or HSCH$_2$(CH$_2$)$_m$COO—,
W$^6$ is independently from each other H, CH$_3$ or Cl
T$^6$ is independently from each other straight chain (CH$_2$)$_n$ or

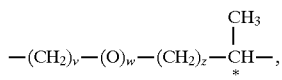

m is independently from each other 1–7,
n is independently from each other 1–12,
v is independently from each other 1–8,
w is independently from each other 0 or 1,
z is independently from each other 0–4,
V$^6$ is independently from each other —O—, —S—, —COO—, —OCO— or a single bond and, in particular, —O— or —S—
U$^6$ is

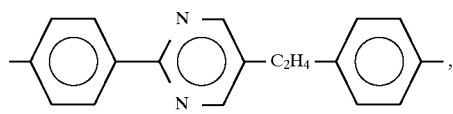

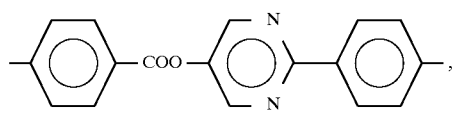

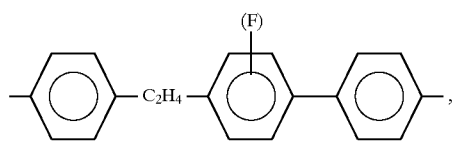

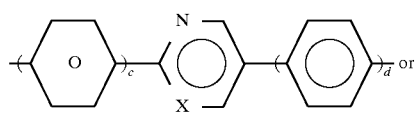

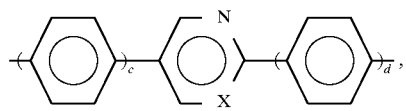

c and d are independently from each other 0, 1 or 2,
c+d is 1, 2 or 3,
X is N or CH, and

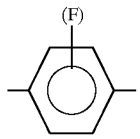

has the meaning indicated for III1-1.

The compounds of this specific subclass are characterized by advantageous values of the melting point and the birefringence. Compounds wherein T$^6$ is

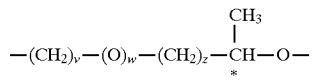

are optically active.

Especially preferred is further the following smaller group of reactive liquid crystalline compounds

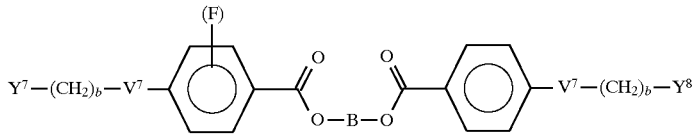

wherein

Y$^7$ is CH$_2$=CW$^7$COO—, CH$_2$CH—, HSCH$_2$(CH$_2$)$_m$COO—,

Y$^8$ has independently of Y$^7$ the meaning of Y$^7$ or is an alkyl group with 1–12 C atoms, which is optionally mono- or polysubstituted by F and/or Cl, and/or wherein one or two non-adjacent CH$_2$ groups may be replaced by —CH=CH—, —O—, —CO—, —COO—, —OCO— or —S—, V$^7$ is independently from each other —O—, —COO—, —OOC—, —S— or a single bond, W$^7$ is independently from each other H, Cl or CH$_3$, m is independently from each other 1–7, b is independently from each other 0–11, and B is

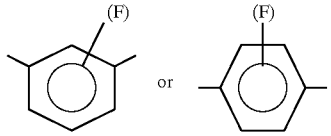

with the proviso that in case both Y$^7$ and Y$^8$ are CH$_2$=CW$^7$COO—,

B is

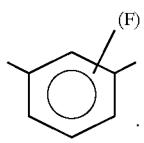

The meaning of

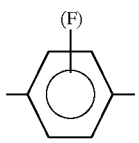

is the same as given above.

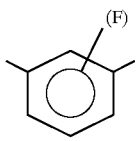

comprises all isomers of mono- and difluornated 1,3-phenylene.

The reactive liquid crystalline compounds according to formula I and, in particular, the preferred compounds according to formula III and according to the preferred subclasses can be prepared by methods which are known per se and which are described, for example, Houben-Weyl, Methoden der Organischen Chemie, Thieme-Verlag, Stuttgart. Some specific methods can be taken from the examples.

In the following and in the preceding, all percentages given are percentages by weight. Temperatures are given in degrees Celsius.

The following exapmles are intended to illustrate the invention without restricting it.

EXAMPLES

Example 1

The reactive liquid crystalline compounds (1)

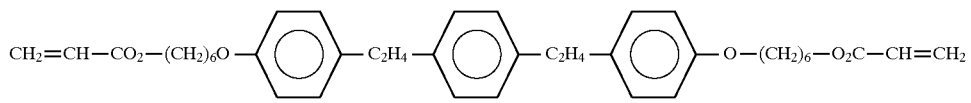

is prepared via the sequence of reaction steps shown in diagram 1. Pd(Ph), tetrakis triphenylphosphine palladium and Δ denotes heating.

In step 6 of diagram 1, 1 mol of the phenylether obtained in step 5 and 1.1 mol of acryloyl chloride are dissolved in 1 l of dichlormethane. 1.1 mol of triethylamine are added, and the mixture is stirred for 3 hours at room temperature. Aqueous work-up and column chromatography gives (1).

Example 2

The reactive liquid crystalline compound (2)

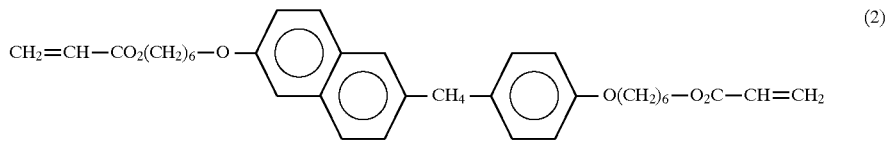

is prepared via the sequence of reaction steps shown in diagram 2. TEA is triethylamine, DCM is dichloromethane and rt is room temperature.

In step 4 is diagram 2, 2.2 mol of triethylamine is added dropwise to a mixture of 1 mol of the alcohol obtained in step 3, and 2.1 mol of acryloyl chloride in 2 l of dichloromethane. After 24 hours the reaction mixture is washed with water, and column chromatography gives (2).

The following compound are prepared via the sequence of reaction steps shown in diagram 2a.

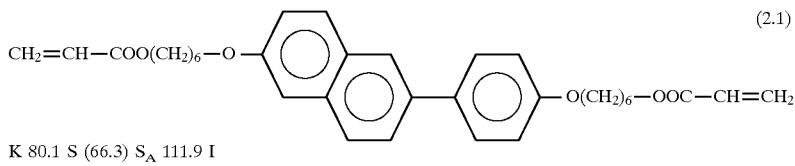

(2.1)

K 80.1 S (66.3) S$_A$ 111.9 I

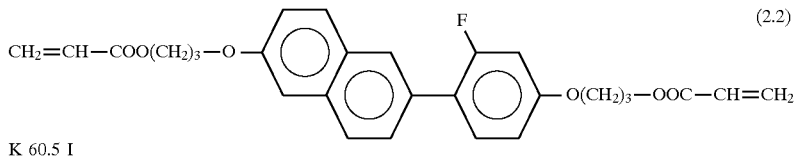

(2.2)

K 60.5 I

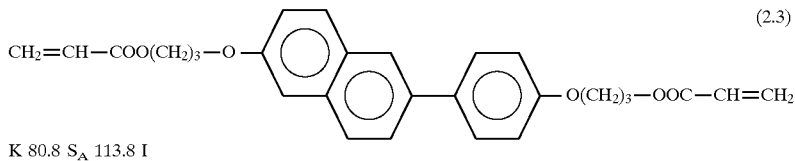

(2.3)

K 80.8 S$_A$ 113.8 I

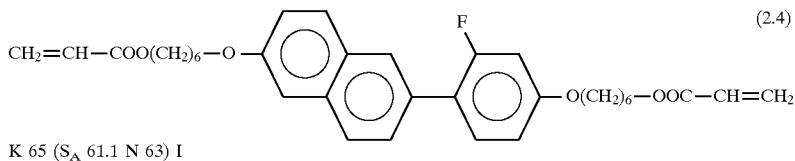

(2.4)

K 65 (S$_A$ 61.1 N 63) I

Example 3

The reactive liquid crystalline compound (3) is prepared via the sequence of reaction steps shown in diagram 3 and exhibits the following phase sequence: K 70 S$_A$ 140 I.

DME is dimethoxyethane.

In step 5 of diagram 3 2.2 mol of triethylamine is added dropwise to a solution of 1 mol of the hydroxyterphenyl obtained in step 4 of diagram 3, and 2.1 mol acryloyl chloride in 2 l dichloromethane. It is stirred for 4 hours at room temperature. Aqueous work-up and column chromatography gives (3).

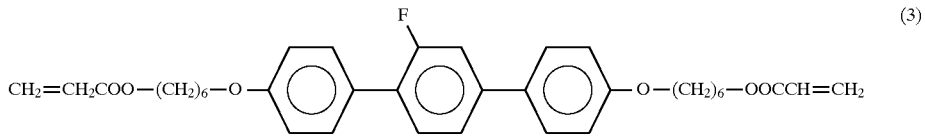

(3)

The following compounds are prepared analogously.

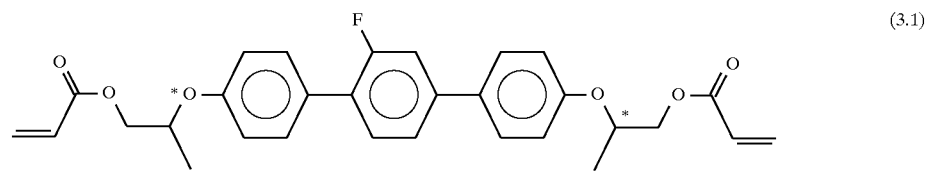

(3.1)

(3.1) exhibits the following phase sequence: K 82.3 I. The carbon atoms denoted by *, are chiral; (R)(–).

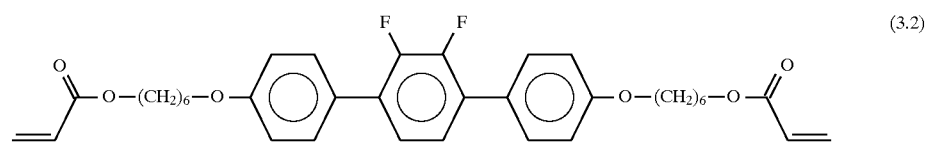

(3.2)

(3.2) exhibits the following phase sequence: K 76.9 S 122.7 I

-continued
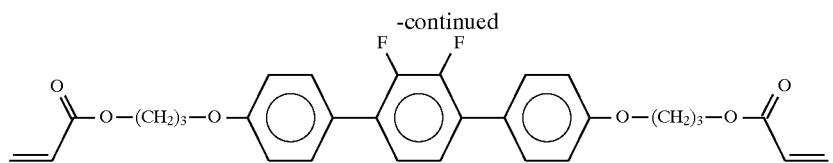
(3.3)
Melting point of (3.3): K 93 S.
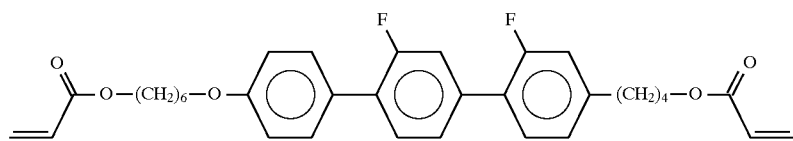
(3.4)
(3.4) exhibits the following phase sequence: K 62 N 81.9 I.
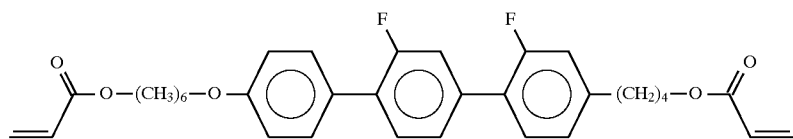
(3.5)
(3.5) exhibits the following phase sequence: K 36.2 S 54.6 N 79.6 I.
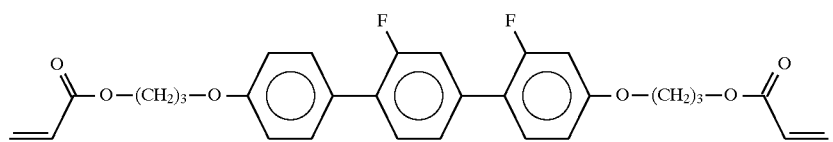
(3.6)
(3.6) exhibits the following phase sequence: K 94 N 106 I.
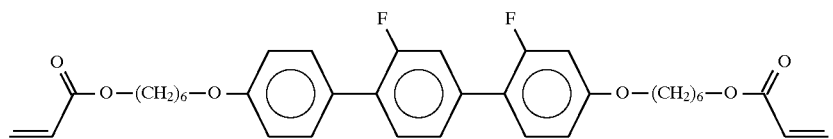
(3.7)
(3.7) exhibits the following phase sequence: K 75.3 S 96.9 N 104.9 I.
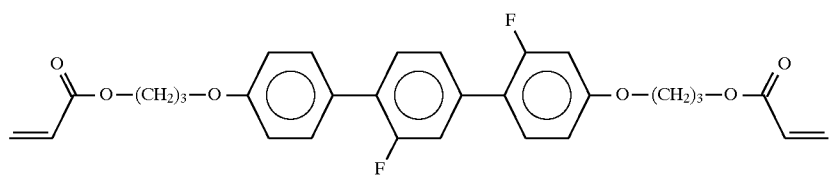
(3.8)
(3.8) exhibits the following phase sequence: K 99.3 N 102.6 I.
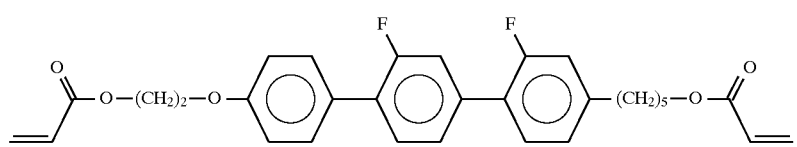
(3.9)
(3.9) exhibits the following phase sequence: K 67 I.
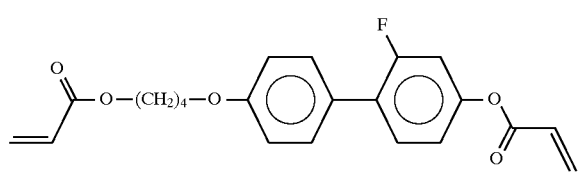
(3.10)
(3.10) exhibits the following phase sequence: K 45.6 I.

Example 4

The reactive liquid crystalline compound (4)

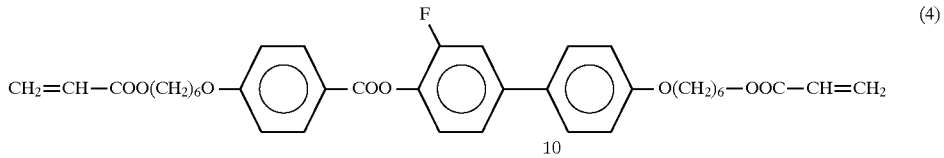
(4)

is prepared via the sequence of reaction steps shown in diagram 4.

In step 4 of diagram 4, 2.2 mol triethylamine is added dropwise to a solution of the ester obtained in step 3 of diagram 4, and 2.1 mol acryloyl chloride in 2 l dichloromethane. The reaction mixture is stirred at room temperature for 4 hours. Aqueous work-up and column chromatography gives (4).

The following compounds are prepared analogously.

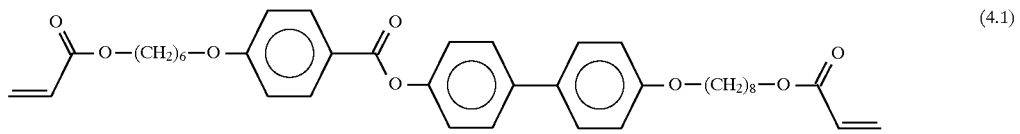
(4.1)

(4.1) exhibits the following phase sequence: K 87 $S_A$ 145 N 170 I.

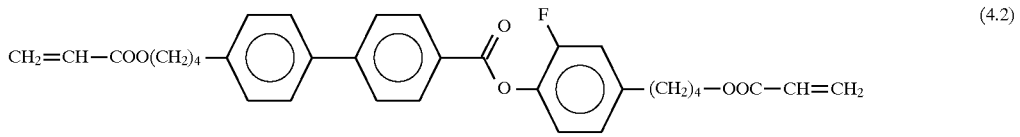
(4.2)

(4.2) exhibits the following phase sequence: K 44.4 $S_A$ 70.2 N 104.5 I.

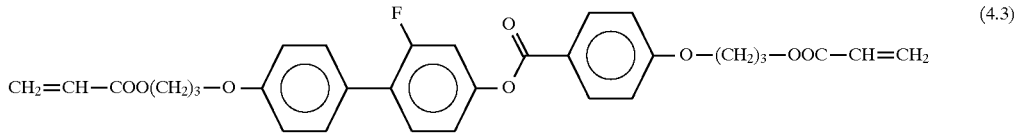
(4.3)

(4.3) exhibits the following phase sequence: K 68 N 133 I.

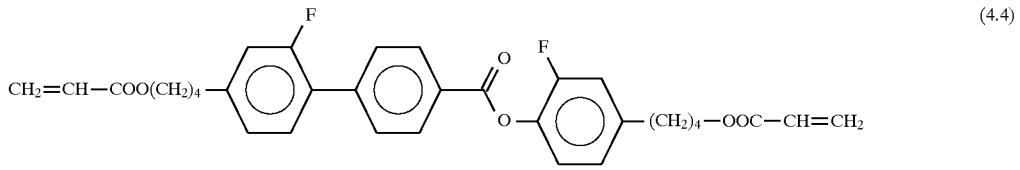
(4.4)

(4.4) exhibits the following phase sequence: K 45.7 N 75.4 I.

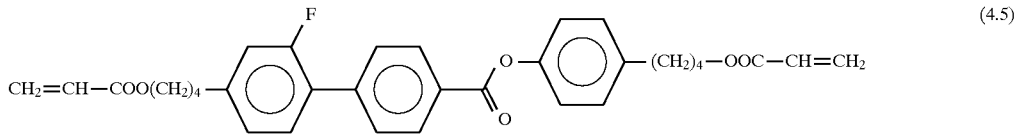
(4.5)

(4.5) exhibits the following phase sequence: K 49.9 N 89.7 I.

Example 5

The reactive liquid crystalline compound (5)

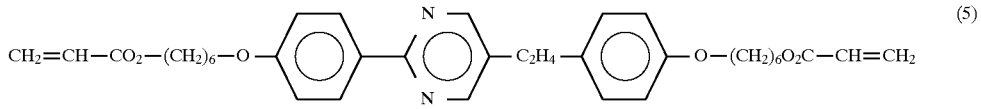

(5)

is prepared via the sequence of reaction steps shown in diagram 5.

In step 4, 2.2 mol of triethylamine is added dropwise to a solution of 1 mol of the substituted pyrimidine obtained in step 3 of diagram 5, and 2.1 mol of acryloyl chloride in 2 l dichloromethane. The reaction mixture is stirred at room temperature for 4 hours. Aqeous work-up and column chromatographic gives (5).

Example 6

The reactive liquid crystalline compound (6)

is prepared via the sequence of reaction steps shown in diagram 7, and exhibits the following phase sequence: K 39 S 58 S' 85 I (the symmetry of the smectic phases was not determined)

In step 4, 2.2 mol of triethylamine is added dropwise to a solution of 1 mol of the ethylene linked compound obtained in step 3 of diagram 4, and 2.1 mol of acryloyl chloride in 2 l dichloromethane. The reaction mixture is stirred for 4 hours at room temperature. Aqueous work-up and column chromatography gives (7).

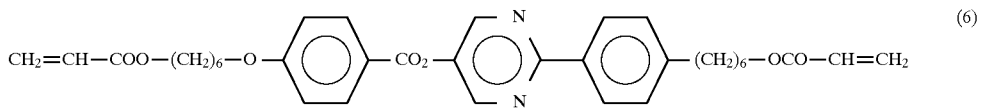

(6)

is prepared via the sequence of reaction steps shown in diagram 6.

BuLi is buytyllithium and B(OMe)$_3$ is trimethylborate.

In step 4, 2.2 mol of triethylamine is added dropwise to a solution of 1 mol of the substituted pyrimidine obtained in step 3 of diagram 6, and 2.1 mol of acryloyl chloride in 2 l dichloromethane, and the reaction mixture is stirred at room temperature for 4 hours. Aqueous work-up and column chromatography gives (6).

Example 7

The reactive liquid crystalline compound (7)

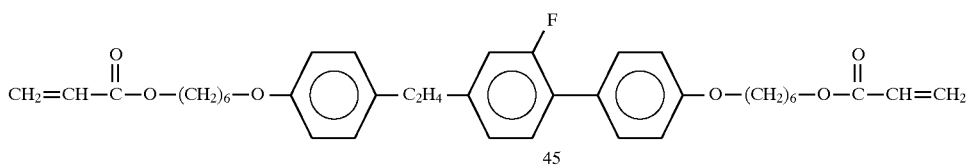

(7)

The following compounds are prepared analogously.

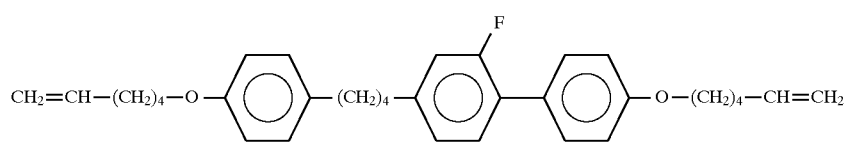

(7.1)

(7.1) exhibits the following phase sequence: K 58 S 80 S' 107 I (the symmetry of the smectic phases was not determined).

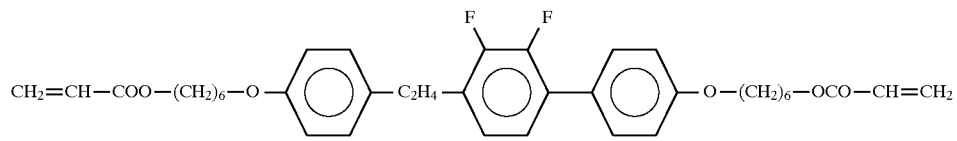

(7.2)

(7.2) exhibits the following phase sequence: K 53 S$_A$ 79.4 I.

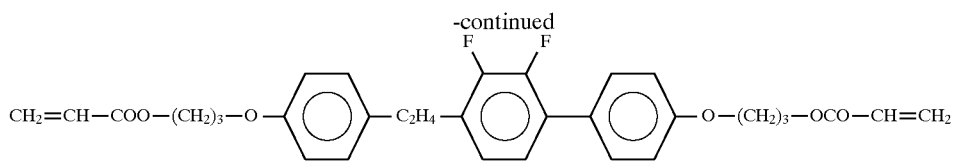
(7.3)

(7.3) exhibits the following phase sequence: K 55 S 57 N 62 I.

Example 8

The optically active reactive liquid crystalline compound (8)

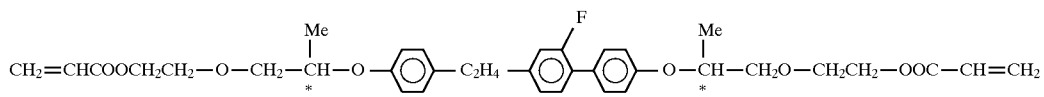

is prepared via the sequence of reaction steps shown in diagram 8.

THF is tetrahydrofuran and Br—CH$_2$—CH$_2$—THP is 2-bromo-1-(tetrahydropyranyl)-ethanol which can be prepared according to the method described in A. Hoppmann, Tetrahedron, 34 (1978), 1723.

In step 5, 2.2 mol of triethylamine is added dropwise to a solution of 1 mol of the diol obtained in step 4 of diagram 8, and 2.1 mol of acryloyl chloride in 2 l dichloromethane. The reaction mixture is stirred at room temperature for 4 hours. Aqueous work-up and column chromatography gives (8).

Example 9

The reactive liquid crystalline compound (9)

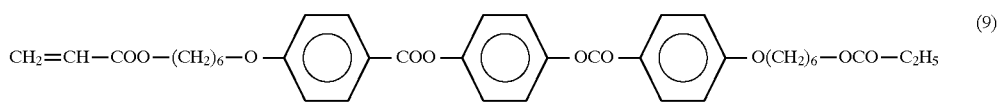
(9)

is prepared via the sequence of reaction steps shown in diagram 9.

Et$_3$N is (CH$_3$CH$_2$)$_3$ N.
Compound (9) exhibits the following phase sequence:
K 112 N 150 I.

Example 10

The reactive liquid crystalline compound (10)

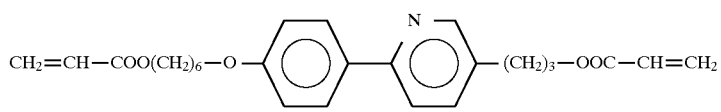
(10)

is prepared via the sequence of reaction steps shown in diagram 10.

Compound (10) exhibits the following phase sequence:
K 58 (S 39) I.

Example 11

The reactive liquid crystalline compound (11)

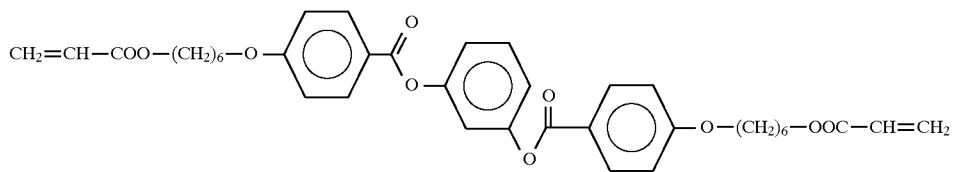
is prepared via the sequence of reaction steps shown in diagram 11.
Compound (11) exhibits the following phase sequence: K 48.7 I
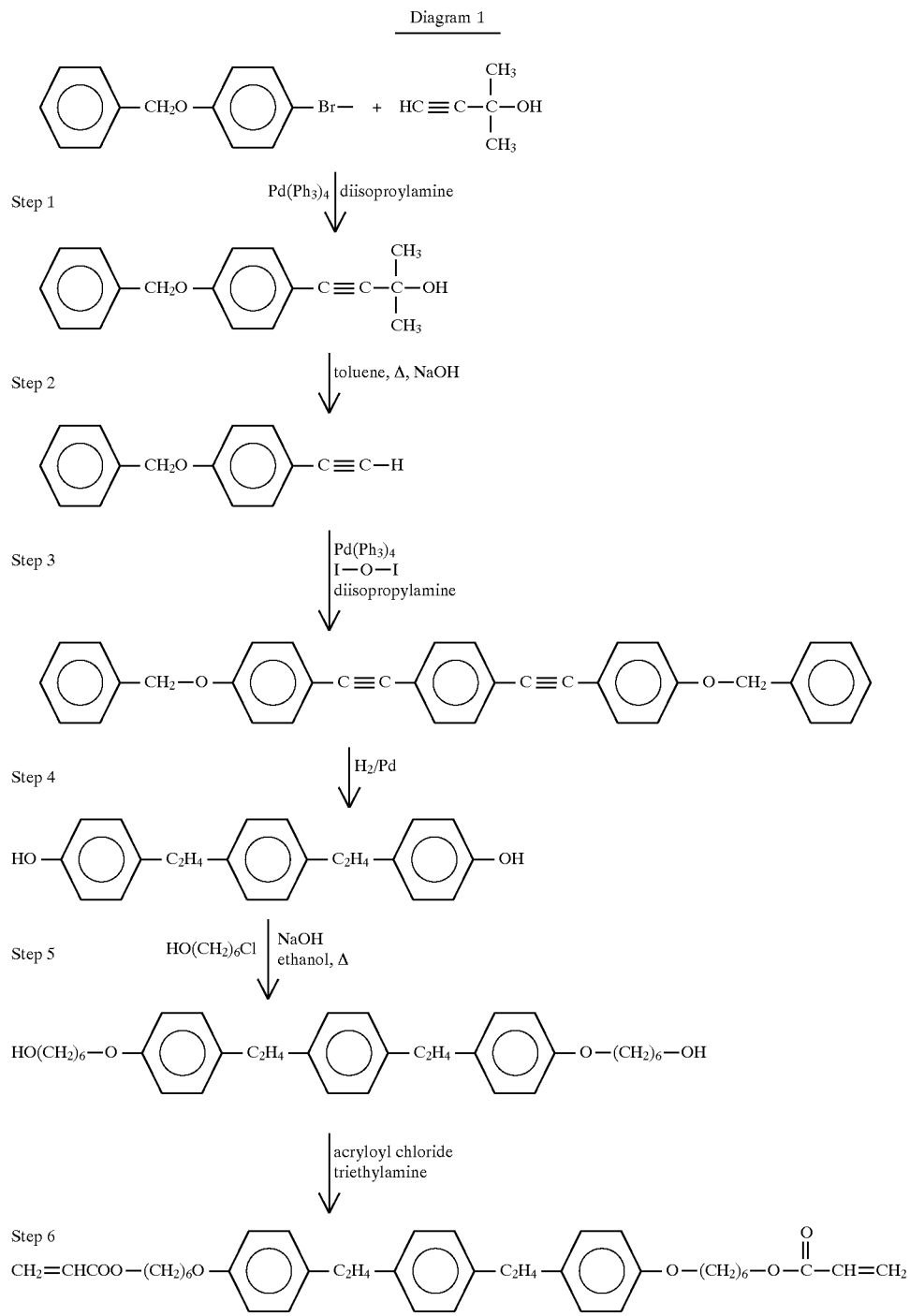

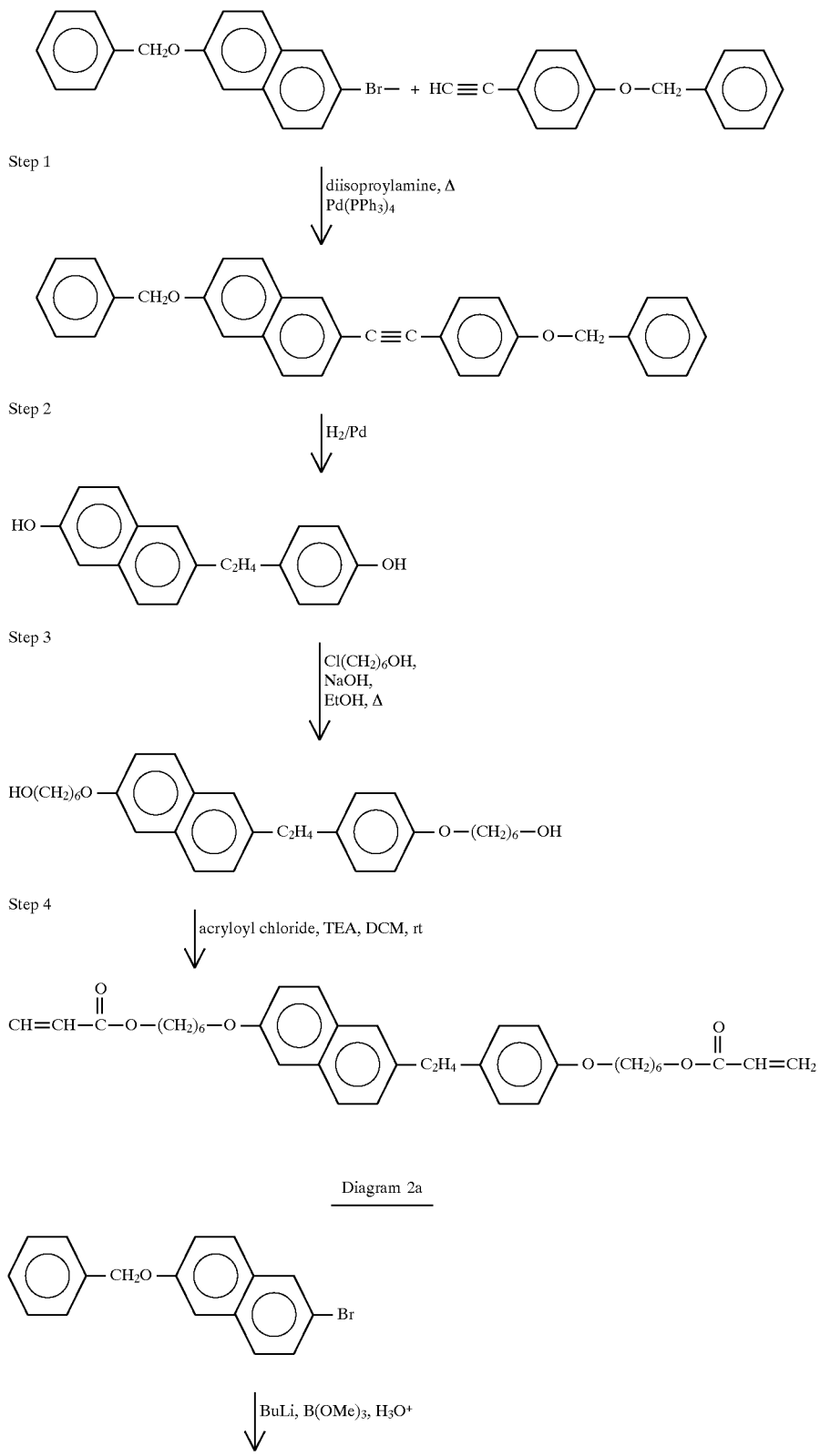

-continued
Diagram 2a
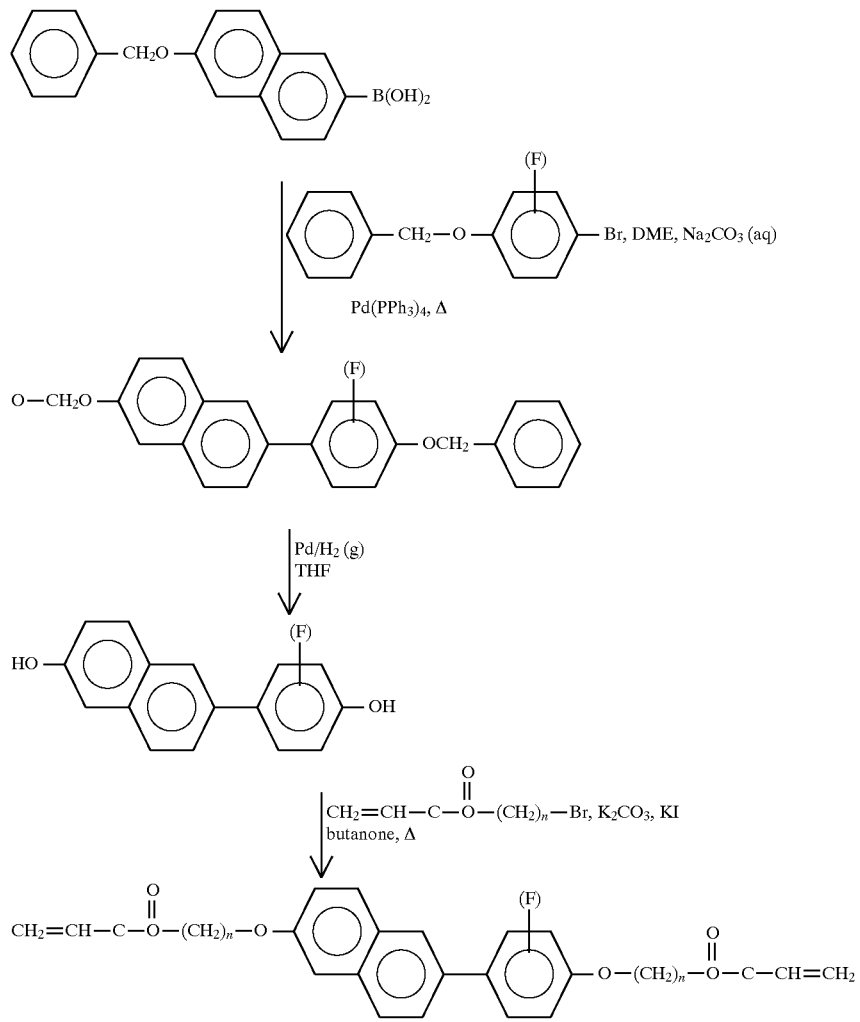
Diagram 3
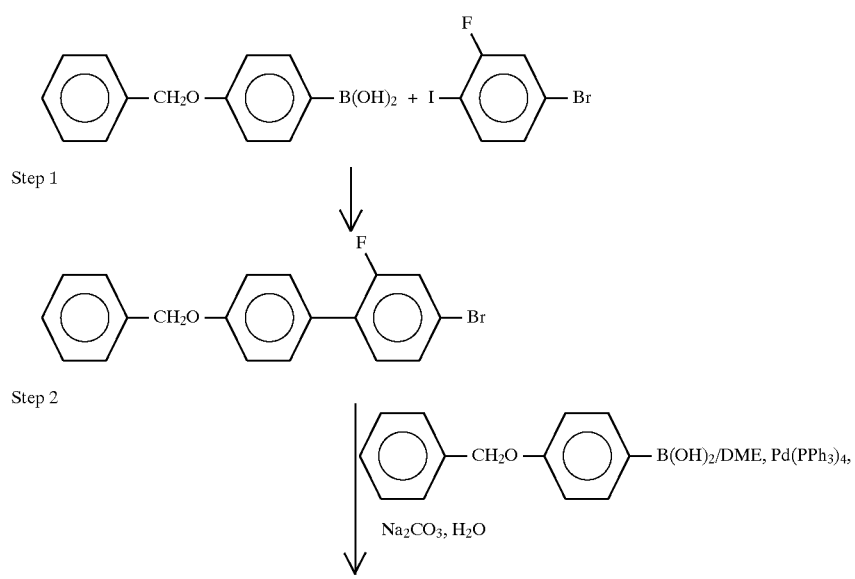
Step 1
Step 2

-continued
Diagram 3
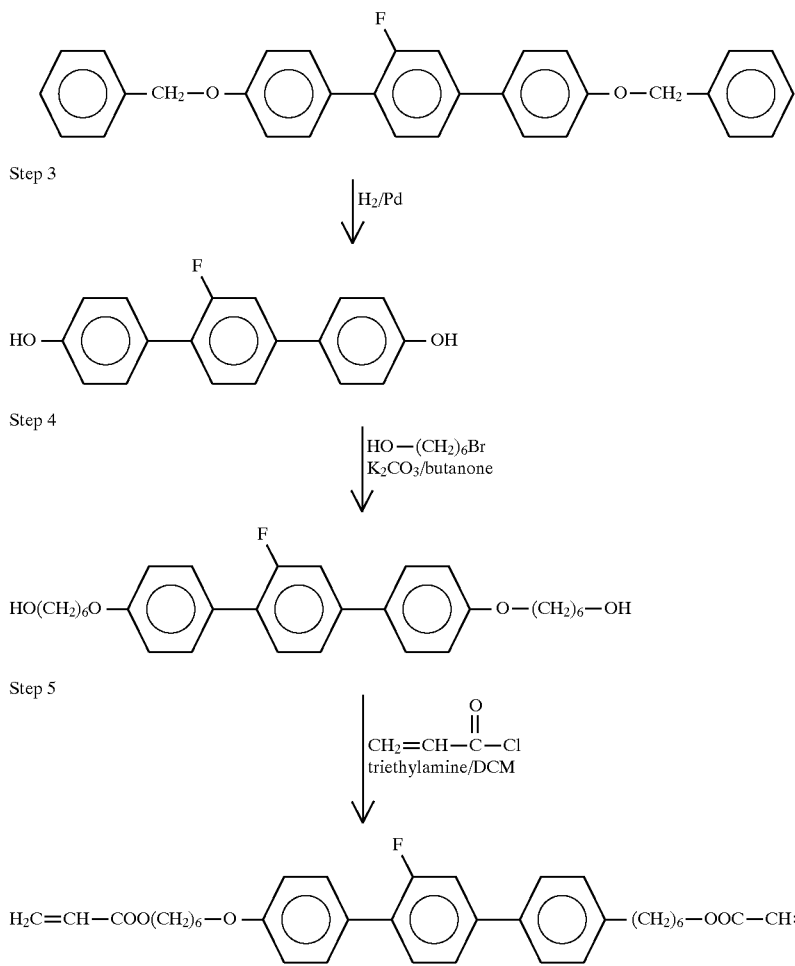
Step 3
H₂/Pd
Step 4
HO—(CH₂)₆Br
K₂CO₃/butanone
Step 5
CH₂=CH—C(=O)—Cl
triethylamine/DCM
Diagram 4
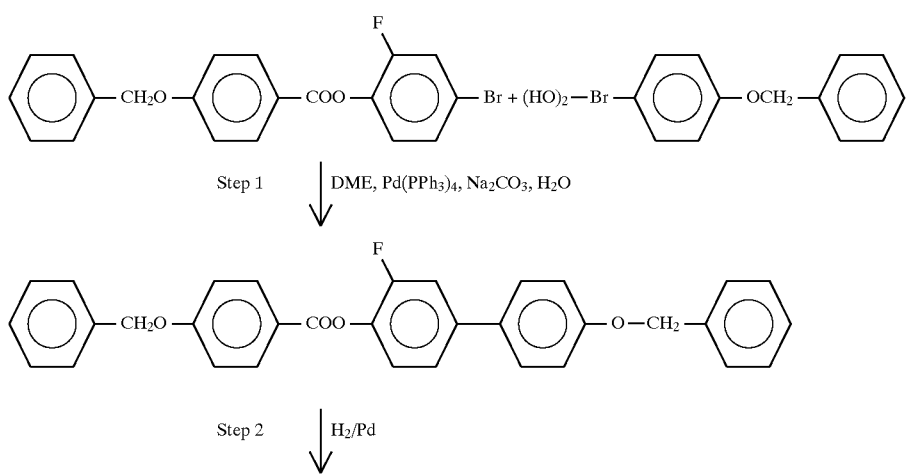
Step 1  DME, Pd(PPh₃)₄, Na₂CO₃, H₂O
Step 2  H₂/Pd -continued
Diagram 4
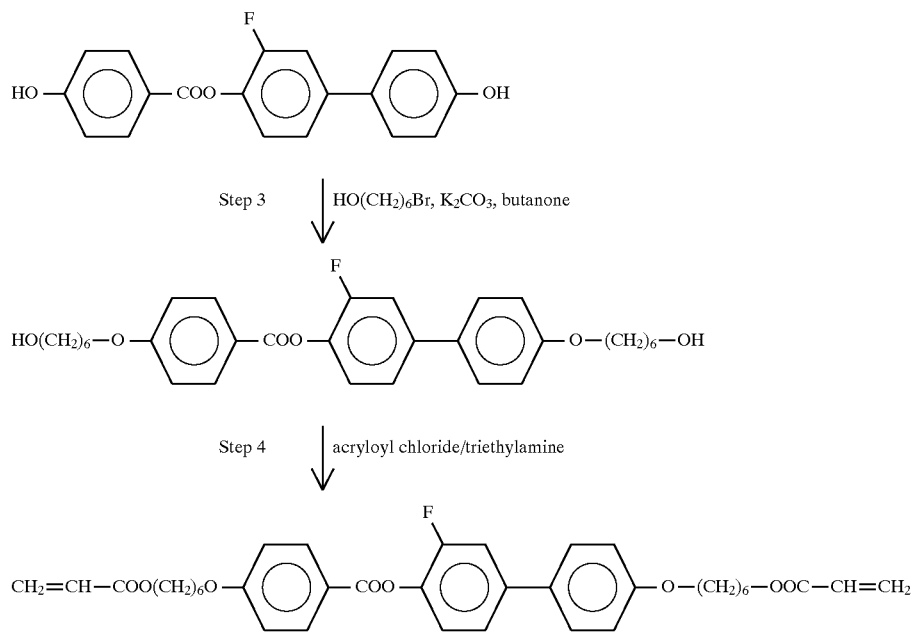
Diagram 5
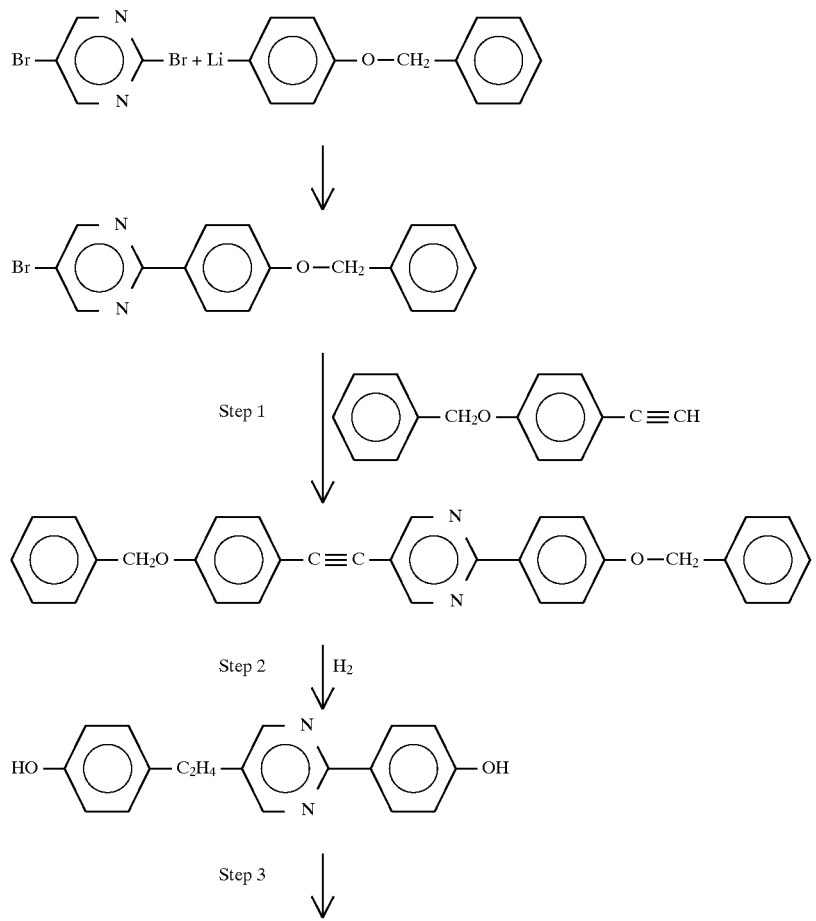

-continued
Diagram 5
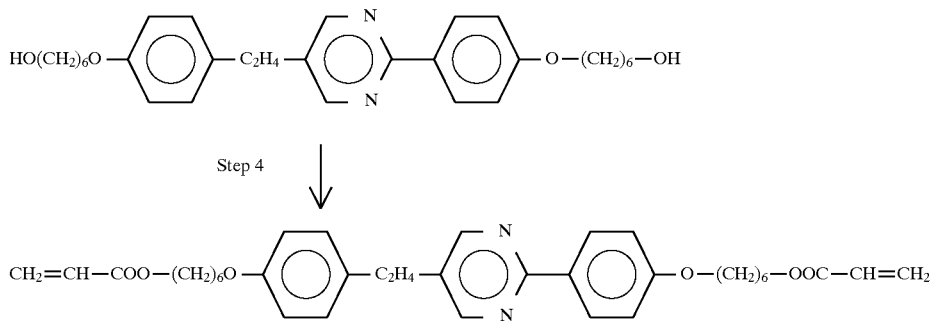
Diagram 6
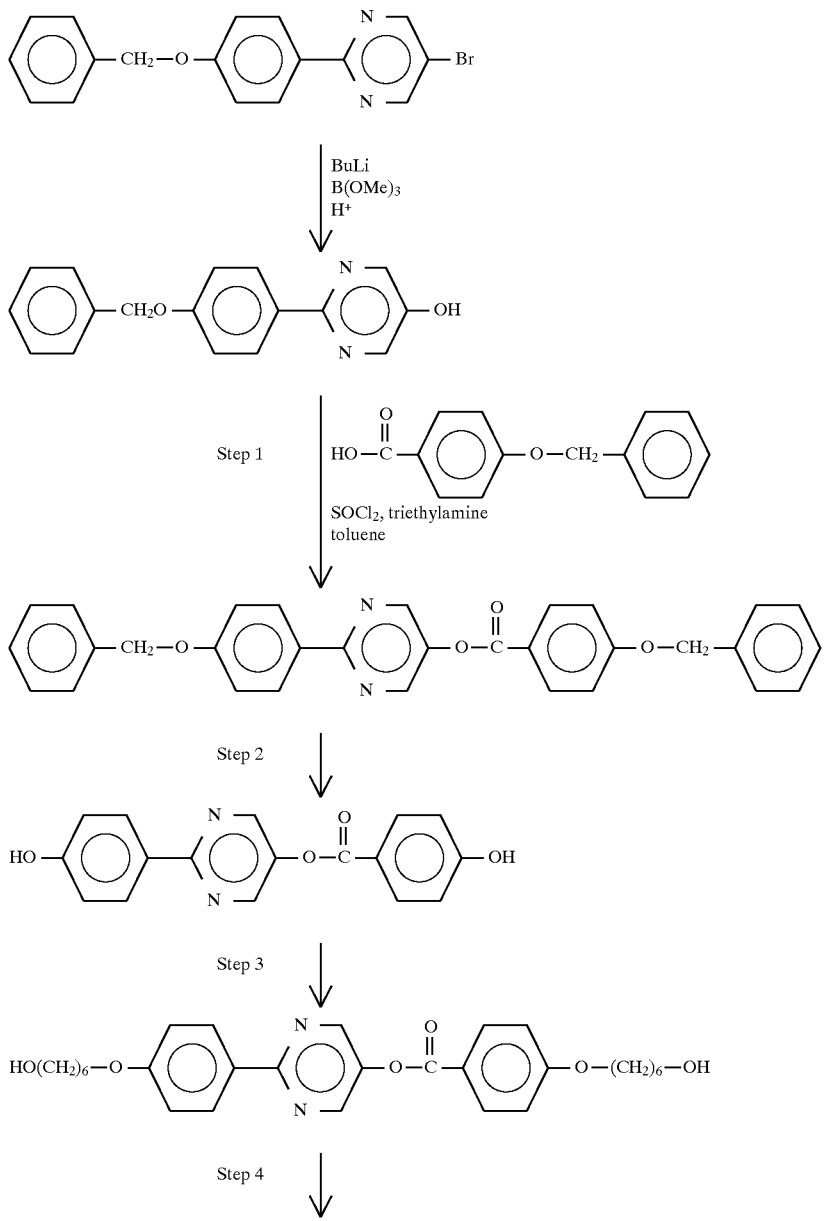

-continued
Diagram 6
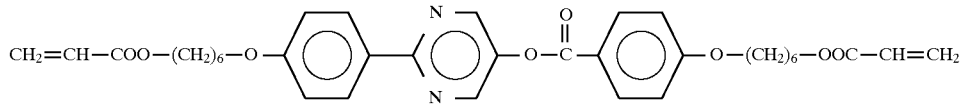
Diagram 7
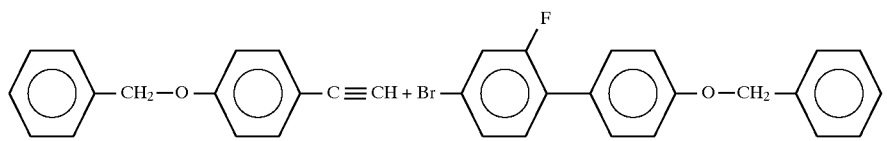
Step 1 | Pd(PPh₃)₄, diisopropylamine/Δ
Step 2 | H₂/Pd
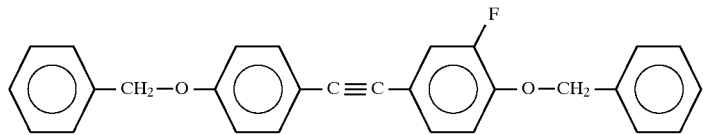
Step 3 | HO(CH₂)₆—Br/K₂CO₃
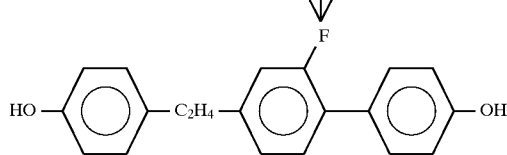
Step 4 | acryloyl chloride/triethylamine
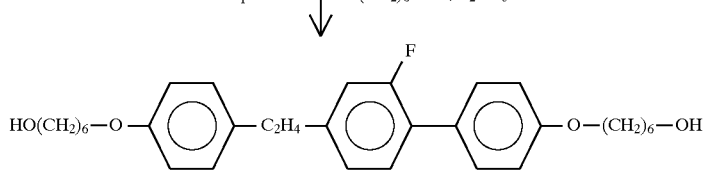
Diagram 8
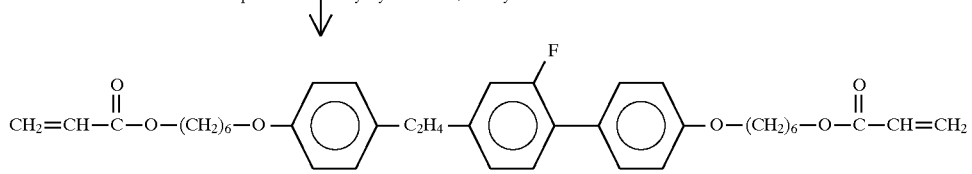
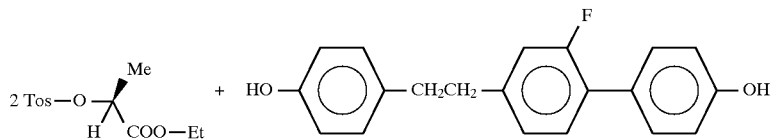
Step 1

-continued
Diagram 8
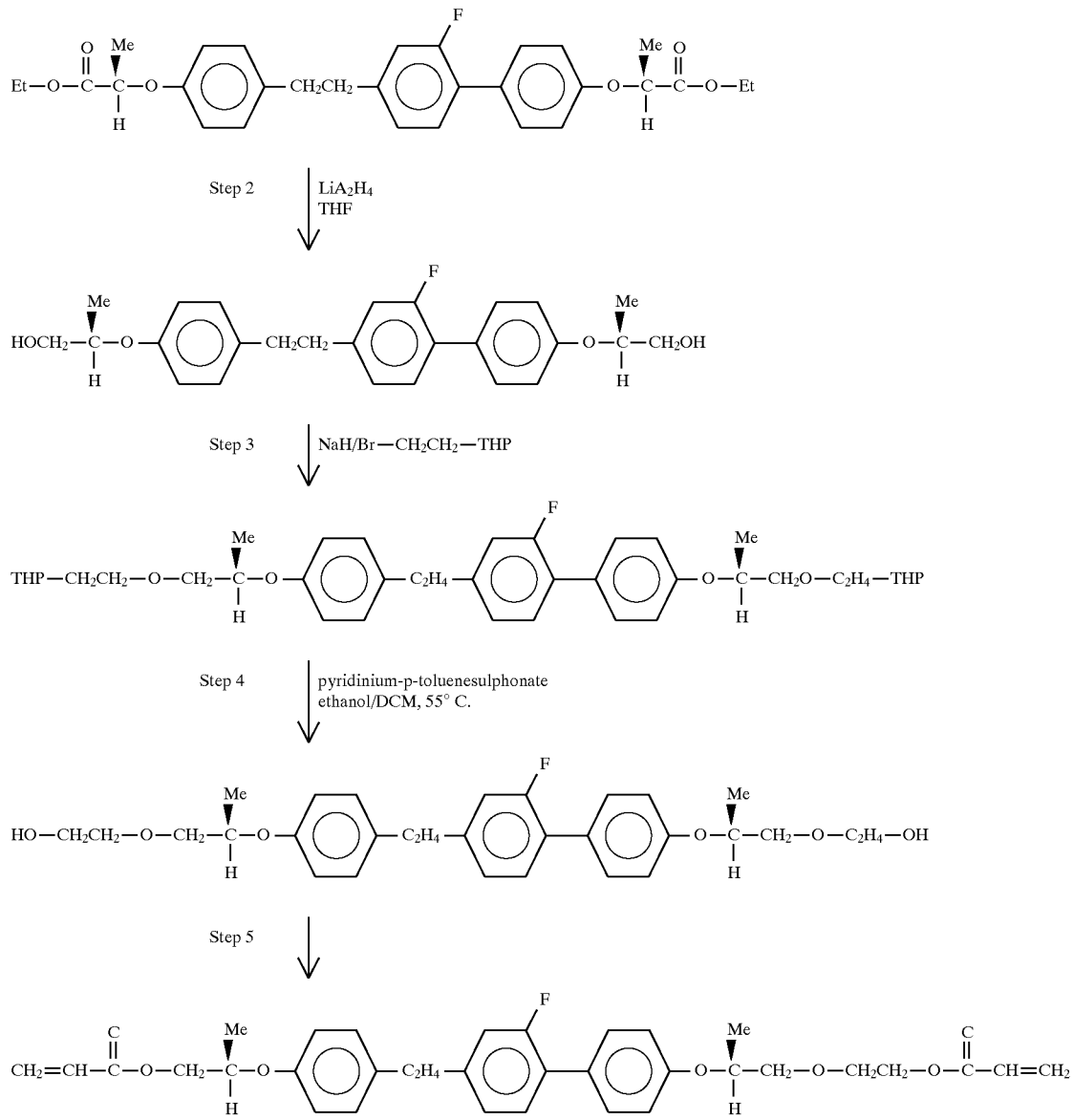
Diagram 9
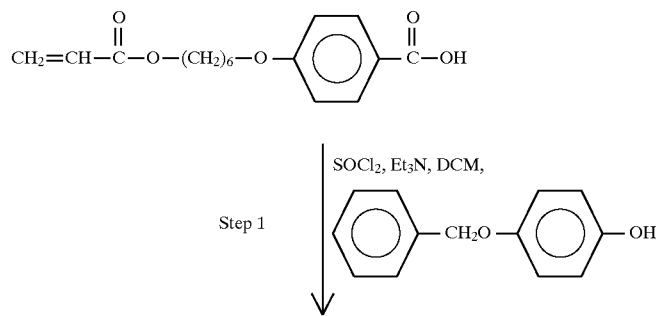

-continued
Diagram 9
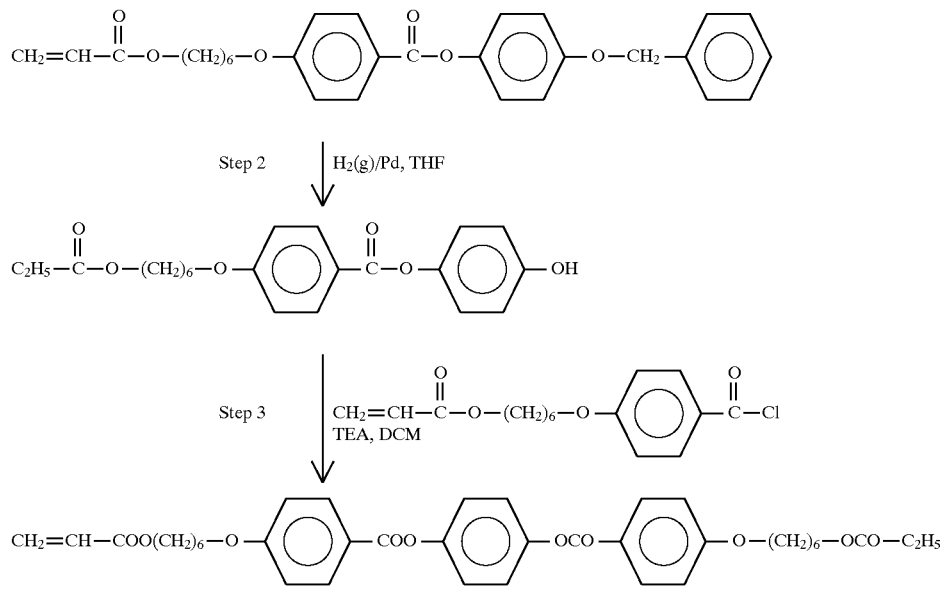
Diagram 10
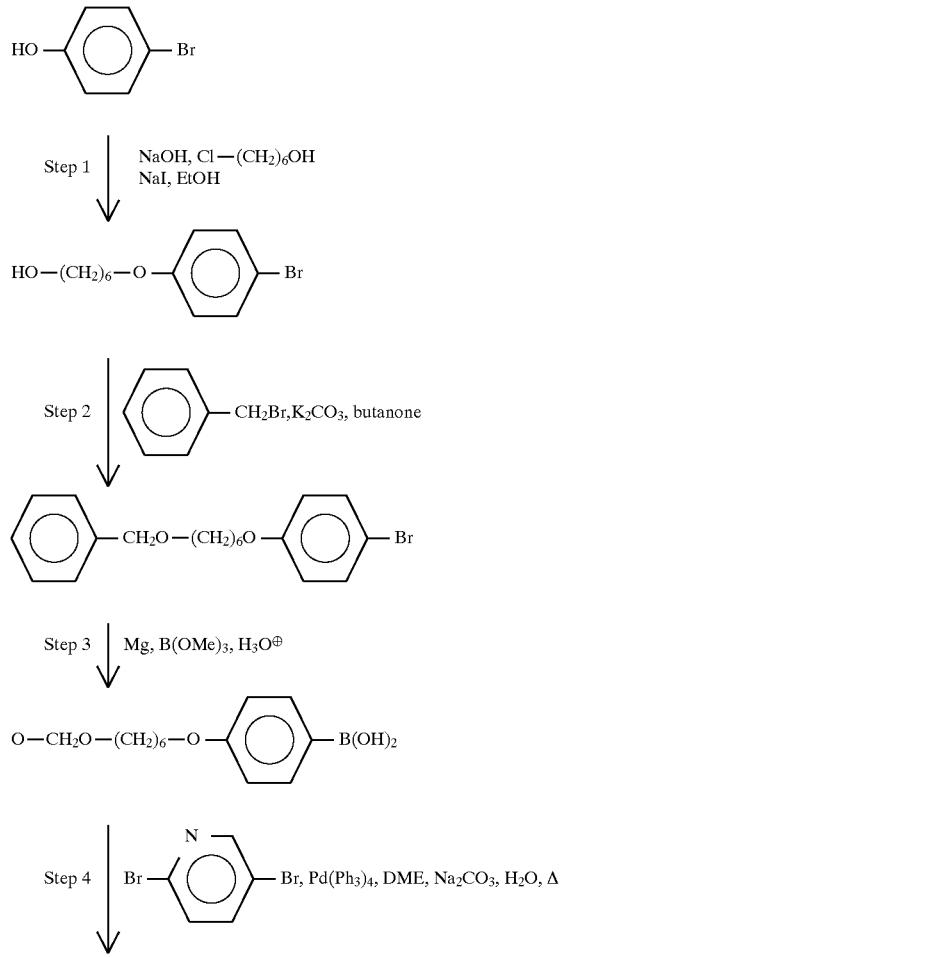

-continued
Diagram 10

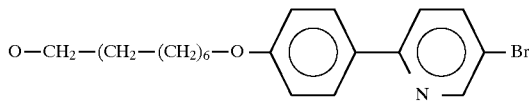

Step 5 | HC≡C—CH₂OH

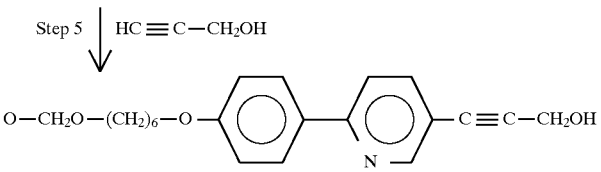

Step 6 | H₂(g)/Pd, THF

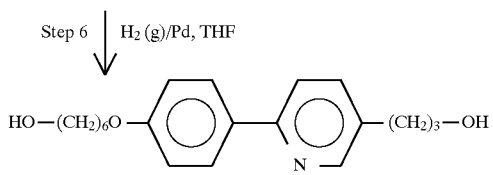

Step 7 | CH₂=CH—C(=O)—Cl, Et₃N, DCM

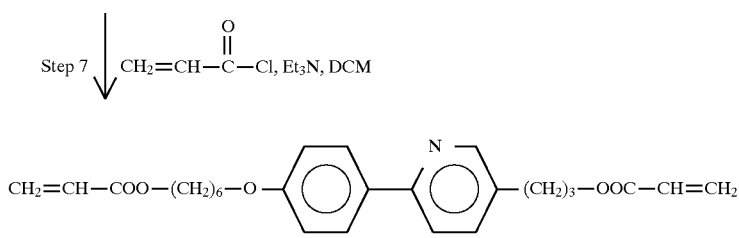

Diagram 11

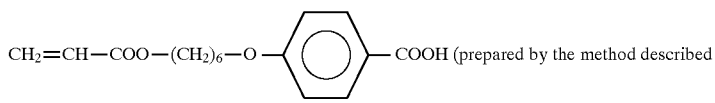

in D.J. Broer, J. Boven, G.N. Moll, G. Challa; Makromol. Chem. (1982) 183 2311)

1) SOCl₂
2) TEA, DCM, (resorcinol structure with two OH)

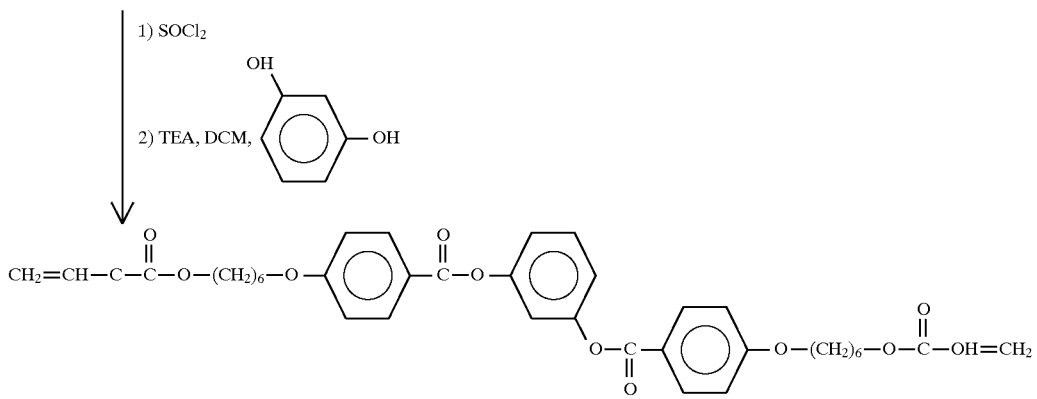

We claim:

1. An electrooptical system comprising:
   two electrode layers between which is contained a PDLC film, said PDLC film comprising a liquid crystal mixture forming microdroplets in an optically isotropic, transparent polymer matrix;
   wherein said liquid crystal mixture exhibits refractive indices and one of the refractive indices of said liquid crystal mixture is matched to a refractive index of said polymer matrix;
   wherein said system exhibits an electrically switchable transparency essentially independent of the polarization of the incident light;
   wherein said PDLC film is made from a precursor and said precursor of said PDLC film comprises said liquid crystal mixture and one or more monomers, oligomers, prepolymers or combination thereof, and a photoinitiator, and is photoradically curable; and said liquid crystal mixture comprises one or more compounds of formula I

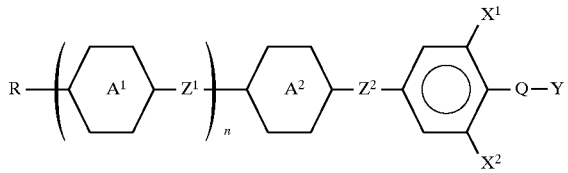

wherein $Z^1$ and $Z^2$, independently of one another, are each a single bond, —$CH_2CH_2$—, —COO—, —OCO— or —C≡C—,

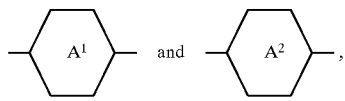

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

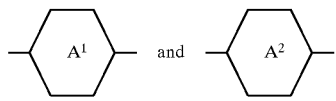

can also be pyrimidine-2,5-diyl, pyridine-2,5-diyl or trans-1,3-dioxane-2,5-diyl, $X^1$ and $X^2$, independently from one another, are each H or F, Q is —$CF_2$—, —$OCF_2$, —$C_2F_4$—, —$OC_2F_4$— or a single bond, Y is —H, —F, —Cl or —CN, n is 0, 1 or 2, and R is alkyl having up to 13 C atoms, in which one or two non-adjacent $CH_2$ groups can also be replaced by —O—, —CH=CH— or a combination thereof, wherein said liquid crystal mixture further contains one or more reactive liquid crystalline compounds of formula II

R'—G'—R"  II wherein at least one of the terminal groups R' and R" is a reactive group exhibiting one reaction site selection from HOW'$_2$C—, HSW'$_2$C—, HW'N—, a carboxyl group,

and O=C—N—, or is a polymerizable reactive group exhibiting two or more reactive sites selected from,

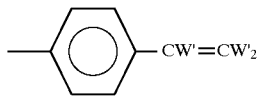

W'$_2$C=CW'—, and

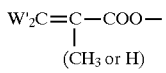

wherein W' is in each case independently, H or an alkyl group with 1–5 C atoms, and the other of terminal groups R' and R" is, independently from the first terminal group, one of said reactive groups or is an alkyl radical with up to 15 C atoms which is unsubstituted or mono- or polysubstituted by halogen, it being also possible for one or more $CH_2$ groups in these radicals to be replaced, in each case independently of one another, by —O—, —S—, —CO—, —OCO—, —CO—O— or —O—CO—O— in such a manner that O atoms are not linked directly to one another, G' is a rod-like diyl group of the formula

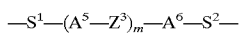

wherein $S^1$ and $S^2$, independently from each other, are alkylene groups with 0–20 C atoms which can be linear or branched, it also being possible for one or more $CH_2$ groups to be replaced, in each case independently from each other, by —O—, —CO—, —S— or —NW'— with the proviso that O atoms are not linked directly to one another, $A^5$ and $A^6$ are, independently from each other, a) a cyclohexylene group, wherein one or two non-adjacent $CH_2$ groups may be replaced by O or S atoms, b) an unsubstituted 1,4-phenylene group wherein one to three CH groups may be replaced by —N— or a 1,4-phenylene group which is mono- or polysubstituted by F, Cl and/or $CH_3$, c) a bicyclo(2,2,2)octylene group, a naphthalene-2,6-diyl group, a decahydronaphthalene-2,6-diyl group or 1,2,3,4-tetrahydronaphthalene group, $Z^3$ is, independently from each other, —CO—O—, —O—CO—, —$CH_2CH_2$—, —$CH_2O$—, —$OCH_2$—, —C≡C— or a single bond, and m is 1, 2, 3 or 4, wherein the amount of said reactive liquid crystalline compounds is not more than 5 wt. % of the mass of the precursor of the PDLC film.

2. An electrooptical system according to claim 1, wherein the amount of said reactive liquid crystalline compound or compounds is 0.01–5 wt. % with respect to the mass of said liquid crystalline mixture.

3. An electrooptical system according to claim 1, wherein said liquid crystal mixture is based on SFM compounds and said system is addressed by an active matrix.

4. An electrooptical system according to claim 1, wherein said liquid crystal mixture is based on carbonitriles and said liquid crystal mixture contains at least 6 compounds.

5. An electrooptical system according to claim 1, wherein said liquid crystal mixture is based on carbonitriles and the ratio of 3- and 4-ring compounds to 2-ring compounds is not less than 0.18.

6. An electrooptical system according to claim 1, wherein said liquid crystal mixture contains at least one reactive liquid crystalline compound exhibiting two reactive groups.

7. An electrooptical system according to claim 1, wherein said liquid crystal mixture contains at least two different reactive liquid crystalline compounds, at least one of which exhibits two reactive groups.

8. An electrooptical system according to claim 2, wherein the amount of said reactive liquid crystalline compound or compounds is less than 2.5 wt. % with respect to the mass of the precursor of said PDLC film.

9. An electrooptical system according to claim 1, wherein said one or more reactive liquid crystalline compounds is one or more compounds of the formula

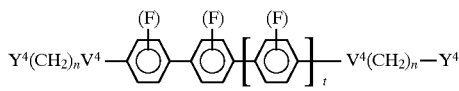

wherein $Y^4$ is, independently from each other, $CH_2{=}CW^4COO{-}$, $CH_2{=}CH{-}$ or $HSCH_2(CH_2)_mCOO{-}$, $V^4$ is, independently from each other, $-O-$, $-COO-$, $-OCO-$, $-S-$ or a single bond, $W^4$ is, independently from each other, H, $CH_3$ or Cl, m is, independently from each other, 1–7, n is, independently from each other, 1–12, t is 0, 1 or 2, and

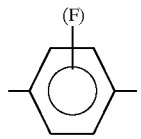

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene.

10. An electrooptical system according to claim 1, wherein said system contains no polarizers.

11. An electrooptical system according to claim 1, wherein said system contains no orientation layers.

12. An electrooptical system according to claim 1, wherein said system has a thickness of 3–50 μm.

13. An electrooptical system according to claim 12, wherein said system has a thickness of 3–25 μm.

14. An electrooptical system according to claim 1, wherein said system exhibits a switching time τ at 0° C. of 10–47 ms.

15. An electrooptical system according to claim 1, wherein said one or more reactive liquid crystalline compounds exhibits a non-reactive terminal group selected from F, Cl, $CF_3$, $OCF_3$, $OCHF_2$, alkyl or alkoxy.

16. An electrooptical system according to claim 1, wherein said liquid crystalline mixture contains at least one difunctional reactive liquid crystalline compound and at least one monofunctional liquid crystalline compound.

17. An electrooptical system according to claim 1, wherein the amount of said reactive liquid crystalline compounds is 0.1–2 wt. % based on the mass of said precursor of said PDLC film.

18. An electrooptical system according to claim 1, wherein the amount of said reactive liquid crystalline compounds is 0.1–5 wt. % based on the mass of said precursor of said PDLC film.

19. An electrooptical system according to claim 18, wherein the amount of said reactive liquid crystalline compounds is 0.1–2.5 wt. % based on the mass of said precursor of said PDLC film.

20. An electrooptical system according to claim 19, wherein the amount of said reactive liquid crystalline compounds is 0.1–1 wt. % based on the mass of said precursor of said PDLC film.

21. An electrooptical system according to claim 1, wherein Y in formula I is H, F or Cl.

22. An electrooptical system according to claim 1, wherein, in formula I, $X^1$ is H or F and $X^2$ is F.

23. An electrooptical system according to claim 1, wherein said system exhibits a switching time τ at 20° C. of 10–31 ms.

24. An electrooptical system comprising:

two electrode layers between which is contained in PDLC film, said PDLC film comprising a liquid crystal mixture forming microdroplets in an optically isotropic, transparent polymer matrix, wherein said liquid crystal mixture exhibits refractive indices and one of the refractive indices of said liquid crystal mixture is matched to a refractive index of said polymer matrix;

wherein said system exhibits an electrically switchable transparency essentially independent of the polarization of the incident light;

wherein said PDLC film is made from a precursor and said precursor of said PDLC film comprises said liquid crystal mixture and one or more monomers, oligomers, prepolymers or combinations thereof, and a photoinitiator, and is photoradically curable; and said liquid crystal mixture comprises one or more compounds of formula I

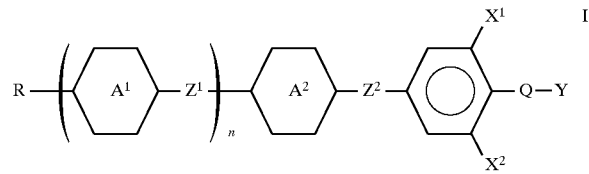

wherein $Z^1$ and $Z^2$, independently of one another, are each a single bond, $-CH_2CH_2-$, $-COO-$, $-OCO-$ or $-C{\equiv}C-$,

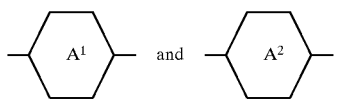

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

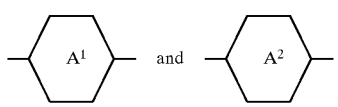

can also be pyrimidine-2,5-diyl, pyridine-2,5-diyl or trans-1,3-dioxane-2,5-diyl, $X^1$ and $X^2$m, independently from one another, are each H or F, Q is —CF$_2$—, —OCF$_2$, —C$_2$F$_4$—, —OC$_2$F$_4$— or a single bond, Y is —H, —F, —Cl or —CN, n is 0, 1 or 2, and R is alkyl having up to 13 C atoms, in which one or two non-adjacent CH$_2$ groups can also be replaced by —O—, —CH=CH— or a combination thereof, wherein said liquid crystal mixture further contains one or more reactive liquid crystalline compounds of formula III $$R^1\text{—P—X—}Z^3\text{—Z—}A^4\text{—}R^2 \qquad \text{III}$$

wherein $R^1$ is CH=CW—COO—,

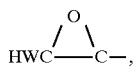

ClHN—, (alkyl)HN— wherein alkyl contains 1–5 C atoms, CH$_2$=CH— or HS—CH$_2$—(CH$_2$)$_m$—COO—;

W is H, Cl or alkyl with 1–5 C atoms;

m is 1–7;

P is alkylene with up to 12 C atoms wherein one or more non-adjacent CH$_2$ groups can be replaced by —O—;

X is —O—, —S—, —COO—, —OCO— or a single bond;

$R^2$ is an alkyl radical with up to 15 C atoms which is unsubstituted, mono- or polysubstituted by halogen, wherein one or more CH$_2$ groups can be replaced, in each case independently of one another, by —O—, —S—, —CO—, —OCO—, —CO—O— or —O—CO—O— in such a manner that oxygen atoms are not linked directly to one another, —CN, —Cl or —F, or $R^2$ has one of the meanings given for $R^1$—P—X—;

$A^3$ is 1,4-phenylene or naphthalene-2,6-diyl, in each case being unsubstituted or substituted with 1 to 4 halogen atoms;

$A^4$ is

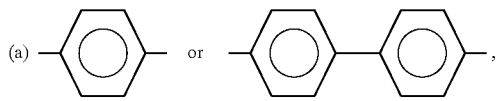

or

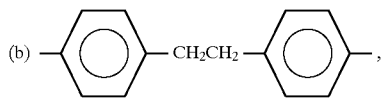

wherein in each case 1,4-phenylene can be substituted by CN or halogen, and one of the 1,4-phenylene groups in (a) or (b) can also be replaced by a 1,4-phenylene radical in which one or two CH groups are replaced by N; and Z is —CO—O—, —O—CO—, —CH$_2$CH$_2$— or a single bond, wherein the amount of said reactive liquid crystalline compounds is not more than 5 wt. % of the mass of the precursor of the PDLC film.

25. An electrooptical system according to claim 24, wherein said one or more compounds of formula III is one or more compounds of III1-III20

$R^1$—P—X—Phe'—Z—Phe"—$R^2$      III1

$R^1$—P—X—Phe'—Z—Pyd—Phe"—$R^2$      III2

$R^1$—P—X—Phe'—Z—Pyr—Phe"—$R^2$      III3

$R^1$—P—X—Phe'—Z—Phe"—Pyd—$R^2$      III4

$R^1$—P—X—Phe'—Z—Phe"—Pyr—$R^2$      III5

$R^1$—P—X—Phe'—Z—Phe"—CH$_2$CH$_2$—Phe"—$R^2$      III6

$R^1$—P—X—Phe'—Z—Pyd—CH$_2$CH$_2$—Phe"—$R^2$      III7

$R^1$—P—X—Phe'—Z—Pyr—CH$_2$CH$_2$—Phe"—$R^2$      III8

$R^1$—P—X—Phe'—Z—Phe"—CH$_2$CH$_2$—Pyd—$R^2$      III9

$R^1$—P—X—Phe'—Z—Phe"—CH$_2$CH$_2$—Pyr—$R^2$      III10

$R^1$—P—X—Nap'—Z—Phe"—Phe"—$R^2$      III11

$R^1$—P—X—Nap'—Z—Pyd—Phe"—$R^2$      III12

$R^1$—P—X—Nap'—Z—Pyr—Phe"—$R^2$      III13

$R^1$—P—X—Nap'—Z—Phe"—Pyd—$R^2$      III14

$R^1$—P—X—Nap'—Z—Phe"—Pyr—$R^2$      III15

$R^1$—P—X—Nap'—Z—Phe"—CH$_2$CH$_2$—Phe"—$R^2$      III16

$R^1$—P—X—Nap'—Z—Pyd—CH$_2$CH$_2$—Phe"—$R^2$      III17

$R^1$—P—X—Nap'—Z—Pyr—CH$_2$CH$_2$—Phe"—$R^2$      III18

$R^1$—P—X—Nap'—Z—Phe"—CH$_2$CH$_2$—Pyd—$R^2$      III19

$R^1$—P—X—Nap'—Z—Phe"—CH$_2$CH$_2$—Pyr—$R^2$      III20 wherein

Phe' is a 1,4-phenylene group

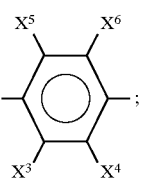

$X^3$–$X^6$ are, independently from each other, H or halogen;

Phe" is a 1,4-phenylene group, which is unsubstituted or mono- or polysubstituted by CN or halogen;

Nap' is a naphthalene-2,6-diyl group

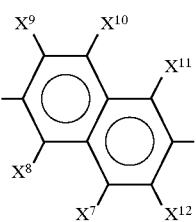

which is unsubstituted or wherein up to 4 of $X^4$–$X^{12}$ are independently from each other halogen, while the other denote H;

$R^1$ is $CH_2=CW-COO-$,

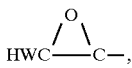

ClHN—, (alkyl)HN— wherein alkyl contains 1–5 C atoms, $CH_2=CH-$ or $HS-CH_2-(CH_2)_m-COO-$;

W is H, Cl or alkyl with 1–5 C atoms;

m is 1–7;

$R^2$ is an alkyl radical with up to 15 C atoms which is unsubstituted, mono- or polysubstituted by halogen, wherein one or more $CH_2$ groups can be replaced, in each case independently of one another, by —O—, —S—, —CO—, —OCO—, —CO—O— or —O—CO—O— in such a manner that oxygen atoms are not linked directly to one another, —CN, —Cl or —F, or $R^2$ has one of the meanings given for $R^1$—P—X—; and Z is —CO—O—, —O—CO—, —$CH_2CH_2$— or a single bond.

26. An electrooptical system according to claim 24, wherein said one or more compounds according to formula III are of formula

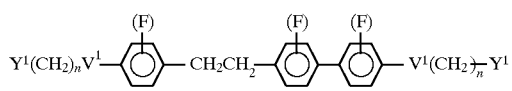

wherein $Y^1$ is, independently from each other, $CH_2=CW^1COO-$, $CH_2=CH-$ or $HS-CH_2-(CH_2)_mCOO-$, $V^1$ is, independently from each other, —O—, —COO—, —OOC—, —S— or a single bond, $W^1$ is independently from each other, H, Cl or $CH_3$, n is, independently from each other, 2–12, m is, independently from each other 1–7, and

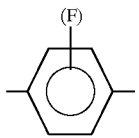

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene.

27. An electrooptical system according to claim 24, wherein said one or more compounds according to formula III are of formula

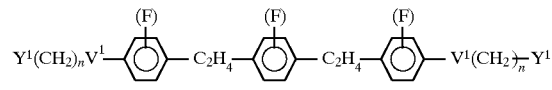

wherein $Y^2$ is, independently from each other, $CH_2=CHCOO-$, $CH_2=C(CH_3)-COO-$ or $CH_2=CH-$, $V^2$ is, independently from each other, —O— or a single bond, n is, independently from each other 2–12, and

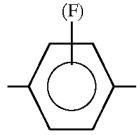

is, independently from each other, 1,4-phenylene, 2-fluoro-1,4-phenylene or 2,3,6-trifluoro-1,4-phenylene.

28. An electrooptical system according to claim 24, wherein said one or more compounds according to formula III are of formula

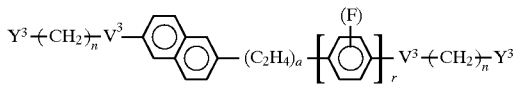

wherein $Y^3$ is, independently from each other, $CH_2=CW^3COO-$, $CH_2=CH-$ or $HSCH_2(CH_2)_m-COO-$, $V^3$ is, independently from each other, —O—, —COO—, —OOC—, —S— or a single bond, $W^3$ is, independently from each other, H, Cl or $CH_3$, a is 0 or 1, n is, independently from each other, 2–12, r is 1 or 2, m is, independently from each other, 1–7 and

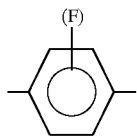

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene.

29. An electrooptical system according to claim 24, wherein said one or more compounds according to formula III are of formula

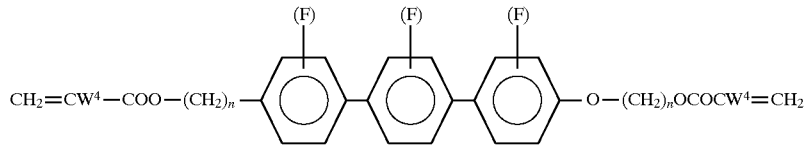

wherein

W⁴ is, independently from each other, H, CH₃ or Cl, n is, independently from each other, 1–12, and

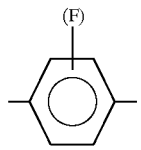

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene.

30. An electrooptical system according to claim 24, wherein said one or more compounds according to formula III are of formula

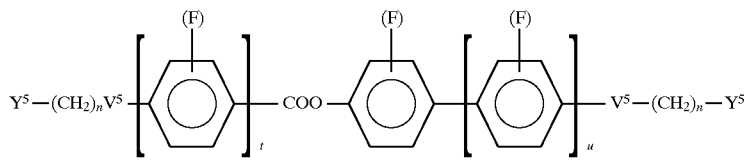

wherein $Y^5$ is, independently from each other, $CH_2=CW^5COO—$, $CH_2=CH—$ or $HSCH_2(CH_2)_mCOO$, $V^5$ is, independently from each other, —O—, —COO—, —OCO—, —S— or a single bond, $W^5$ is, independently from each other, H, CH₃ or Cl, n is, independently from each other, 1–12, m is 1–7, t and u are, independently from each other 0, 1, or 2 with the proviso that t+u=1, 2 or 3, and

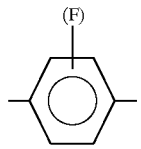

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene.

31. An electrooptical system according to claim 24, wherein said one or more compounds according to formula III are of formula

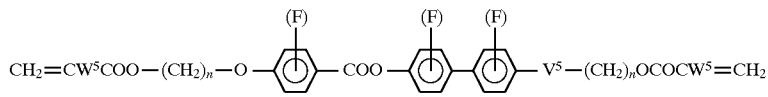

wherein $V^5$ is, independently from each other, —O—, —COO—, —OCO—, —S— or a single bond, $W^5$ is, independently from each other, H, CH₃ or Cl, n is, independently from each other, 1–12, and

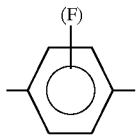

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene.

32. An electrooptical system comprising:

two electrode layers between which is contained a PDLC film, said PDLC film comprising a liquid crystal mixture forming microdroplets in an optically isotropic transparent polymer matrix;

wherein said liquid crystal mixture exhibits refractive indices and one of the refractive indices of said liquid crystal mixture is matched to a refractive index of said polymer matrix;

wherein said system exhibits an electrically switchable transparency essentially independent of the polarization of the incident light;

wherein said PDLC film is made from a precursor and said precursor of said PDLC film comprises said liquid crystal mixture and one or more monomers, oligomers, prepolymers or combinations thereof, and a photoinitiator, and is photoradically curable; and said liquid crystal mixture comprises one or more compounds of formula I

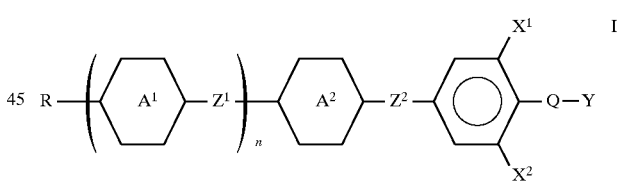

wherein $Z^1$ and $Z^2$, independently of one another, are each a single bond, $—CH_2CH_2—$, $—COO—$, $—OCO—$ or $—C\equiv C—$,

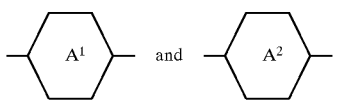

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

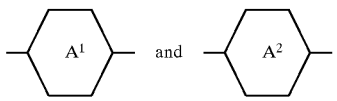

can also be pyrimidine-2,5-diyl, pyridine-2,5-diyl or trans-1,3-dioxane-2,5-diyl, $X^1$ and $X^2$, independently from one another, are each H or F, Q is —$CF_2$—, —$OCF_2$, —$C_2F_4$—, —$OC_2F_4$— or a single bond, Y is —H, —F, —Cl or —CN, n is 0, 1 or 2, and R is alkyl having up to 13 C atoms, in which one or two non-adjacent $CH_2$ groups can also be replaced by —O—, —CH=CH— or a combination thereof, wherein said liquid crystal mixture further contains one or more reactive liquid crystalline compounds of formula

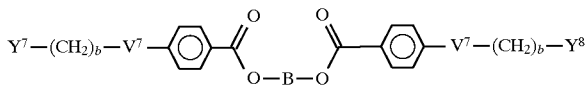

wherein $Y^7$ is $CH_2$=$CW^7COO$—, $CH_2$=CH—, $HSCH_2(CH_2)_mCOO$—, $Y^8$, independently of $Y^7$, is $Y^7$ or an alkyl group with 1–12 C atoms, which is optionally mono- or polysubstituted by F and/or Cl, and/or wherein one or two non-adjacent $CH_2$ groups may be replaced by —CH=CH—, —O—, —CO—, —COO—, —OCO— or —S—, $V^7$ is, independently from each other, —O—, —COO—, —OOC—, —S— or a single bond, $W^7$ is, independently from each other, H, Cl or $CH_3$, m is, independently from each other 1–7, b is, independently from each other 0–11, and B is

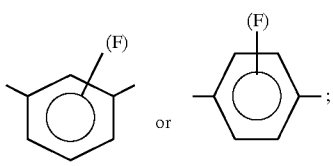

with the proviso that in case both $Y^7$ and $Y^8$ are $CH_2$=$CW^7COO$—, B is

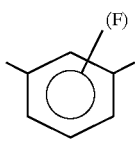

wherein the amount of said reactive liquid crystalline compounds is not more than 5 wt. % of the mass of the precursor of the PDLC film.

33. An electrooptical system comprising:

two electrode layers between which is contained a PDLC film, said PDLC film comprising a liquid crystal mixture forming microdroplets in an optically isotropic, transparent polymer matrix;

wherein said liquid crystal mixture exhibits refractive indices and one of the refractive indices of said liquid crystal mixture is matched to a refractive index of said polymer matrix;

wherein said system exhibits an electrically switchable transparency essentially independent of the polarization of the incident light;

wherein said PDLC film is made from a precursor and said precursor of said PDLC film comprises said liquid crystal mixture and one or more monomers, oligomers, prepolymers or combinations thereof, and a photoinitiator, and is photoradically curable; and said liquid crystal mixture comprises one or more compounds of formula I

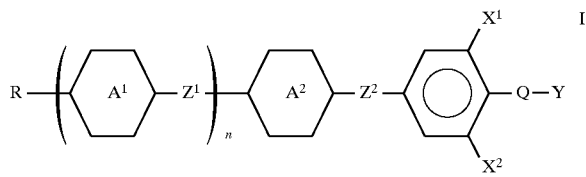

wherein $Z^1$ and $Z^2$, independently of one another, are each a single bond, —$CH_2CH_2$—, —COO—, —OCO— or —C≡C—,

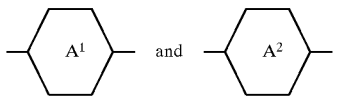

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

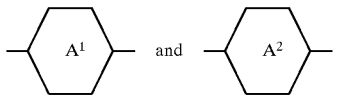

can also be pyrimidine-2,5-diyl, pyridine-2,5-diyl or trans-1,3-dioxane-2,5-diyl $X^1$ and $X^2$, independently from one another, are each H or F, Q is —$CF_2$—, —$OCF_2$, —$C_2F_4$—, —$OC_2F_4$— or a single bond, Y is —H, —F, —Cl, or —CN, n is 0, 1 or 2, and R is alkyl having up to 13 C atoms, in which one or two non-adjacent $CH_2$ groups can also be replaced by —O—, —CH=CH— or a combination thereof, wherein said liquid crystal mixture further contains one or more reactive liquid crystalline compounds of formula II

wherein one of the terminal groups R' and R" is a reactive group exhibiting one reaction site selected from $HOW'_2C$—, HSW'$_2$C—, HW'N—, a carboxyl group,

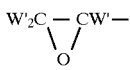

and O=C—N—, or is a polymerizable reactive group exhibiting two or more reactive sites selected from

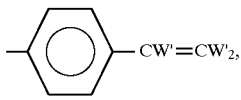

W'$_2$C=CW'—, and

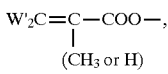

wherein W' is in each case, independently, H or an alkyl group with 1–5 C atoms, and the other of terminal groups R' and R" is, independently from the first terminal group, one of said reactive groups or is an alkyl radical with up to 15 C atoms which is unsubstituted or mono- or polysubstituted by halogen, it being also possible for one or more CH$_2$ groups in these radicals to be replaced, in each case independently of one another, by —O—, —S—, —CO—, —OCO—, —CO—O— or —O—CO—O— in such a manner that O atoms are not linked directly to one another, G' is a rod-like diyl group of the formula $$-S^1-(A^5-Z^3)_m-A^6-S^2-$$

wherein

S$^1$ and S$^2$, independently from each other, are alkylene groups with 0–20 C atoms which can be linear or branched, it also being possible for one or more CH$_2$ groups to be replaced, in each case independently from each other, by —O—, —CO—, —S— or —NW'— with the proviso that O atoms are not linked directly to one another, A$^5$ and A$^6$ are, independently from each other, a) a cyclohexylene group, wherein one or two non-adjacent CH$_2$ groups may be replaced by O or S atoms,

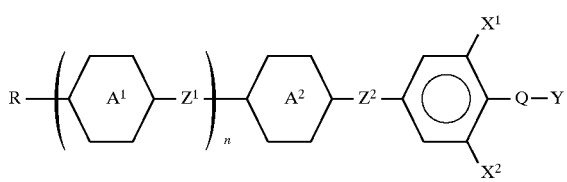

wherein

Z$^1$ and Z$^2$, independently of one another, are each a single bond, —CH$_2$CH$_2$—, —COO—, —OCO— or —C≡C—,

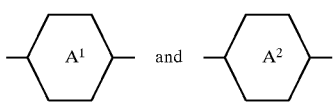

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

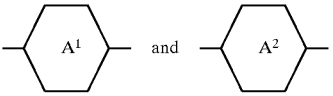

can also be pyrimidine-2,5-diyl, pyridine, 2,5-diyl or trans-1,3-dioxane-2,5-diyl, X$^1$ and X$^2$, independently from one another, are each H or F, Q is —CF$_2$—, —OCF$_2$—, —C$_2$F$_4$—, —OC$_2$F$_4$— or a single bond, Y is —H, —F, —Cl or —CN, n is 0, 1 or 2, and R is alkyl having up to 13 C atoms, in which one or two non-adjacent CH$_2$ groups can also be replaced by —O—, —CH=CH— or a combination thereof, wherein said liquid crystal mixture further contains one or more reactive liquid crystalline compounds of formula II $$R'-G'-R''\qquad\qquad\text{II}$$

wherein one of the terminal groups R' and R" is a reactive group exhibiting one reaction site selected from HOW'C—, HSW'$_2$C—, HW'N—, a carboxyl group,

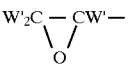

and O=C—N— or is a polymerizable reactive group exhibiting two or more reactive sites selected from

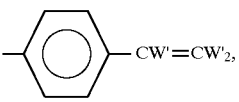

W'$_2$C=CW'—, and

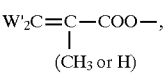

wherein W' is in each case, independently, H or an alkyl group with 1–5 C atoms, and b) an unsubstituted 1,4-phenylene group wherein one to three CH groups may be replaced by —N— or a 1,4-phenylene group which is mono- or polysubstituted by F, Cl and/or CH$_3$, c) a bicyclo(2,2,2)octylene group, a naphthalene-2,6-diyl group, a decahydronaphthalene-2,6-diyl group or 1,2,3,4-tetrahydronaphthalene group, Z$^3$ is, independently from each other, —CO—O—, —O—CO—, —CH$_2$CH$_2$—, —CH$_2$O—, —OCH$_2$—, —C≡C— or a single bond, and m is 1, 2, 3 or 4; and wherein said reactive liquid crystalline compounds form an internal structure within said microdroplets, and wherein the amount of said reactive liquid crystalline compounds is not more than 5 wt. % of the mass of the precursor of the PDLC film.

34. An electrooptical system according to claim 33, wherein said one or more reactive liquid crystalline compounds is a compound of formula II exhibiting only one reactive group with one reaction site, and said reactive group is coupled to the polymeric matrix with the rest of the molecule being positioned within the microdroplet.

35. An electrooptical system according to claim 33, wherein said liquid crystalline mixture includes a compound of formula II exhibiting two reactive groups R' and R".

36. An electrooptical system according to claim 35, wherein said liquid crystalline mixture include a compound of formula II exhibiting one reactive group R'.

37. An electrooptical system comprising:

two electrode layers between which is contained a PDLC film, said PDLC film comprising a liquid crystal mixture forming microdroplets in an optically isotropic, transparent polymer matrix;

wherein said liquid crystal mixture exhibits refractive indices and one of the refractive indices of said liquid crystal mixture is matched to a refractive index of said polymer matrix;

wherein said system exhibits an electrically switchable transparency essentially independent of the polarization of the incident light;

wherein said PDLC film is made from a precursor and said precursor of said PDLC film comprises said liquid crystal mixture and one or more non-liquid crystalline monomers, non-liquid crystalline oligomers, non-liquid crystalline prepolymers or combinations thereof, and a photoinitiator, and is photoradically curable; and said liquid crystal mixture comprises one or more compounds of formula I the other of terminal groups R' and R" is, independently from the first terminal group, one of said reactive groups or is an alkyl radical with up to 15 C atoms which is unsubstituted or mono- or polysubstituted by halogen, it being also possible for one or more CH$_2$ groups in these radicals to be replaced, in each case independently of one another, by —O—, —S—, —CO—, —OCO—, —CO—O— or —O—CO—O— in such a manner that O atoms are not linked directly to one another, G' is a rod-like diyl group of the formula $$S^1—(A^5—Z^3)_m—A^6—S^2—$$

wherein

S$^1$ and S$^2$, independently from each other, are alkylene groups with 0–20 C atoms which can be linear or branched, it also being possible for one or more CH$_2$ groups to be replaced, in each case independently from each other, by —O—, —CO—, —S— or —NW'— with the proviso that O atoms are not linked directly to one another, A$^5$ and A$^6$ are, independently from each other,
a) a cyclohexylene group, wherein one or two non-adjacent CH$_2$ groups may be replaced by O or S atoms,
b) an unsubstituted 1,4-phenylene group wherein one to three CH groups may be replaced by —N— or a 1,4-phenylene group which is mono- or polysubstituted by F, Cl and/or CH$_3$,
c) a bicyclo(2,2,2)octylene group, a naphthalene-2,6-diyl group, a decahydronaphthalene-2,6-diyl group or 1,2,3,4-tetrahydronaphthalene group, Z$^3$ is, independently from each other, —CO—O—, —O—CO—, —CH$_2$CH$_2$—, —CH$_2$O—, —OCH$_2$—, —C≡C— or a single bond, and m is 1, 2, 3 or 4, wherein the amount of said reactive liquid crystalline compounds is not more than 5 wt. % of the mass of the precursor of the PDLC film.

38. An electrooptical system comprising:

two electrode layers between which is contained a PDLC film, said PDLC film comprising a liquid crystal mixture forming microdroplets in an optically isotropic, transparent polymer matrix;

wherein said liquid crystal mixture exhibits refractive indices and one of the refractive indices of said liquid crystal mixture is matched to a refractive index of said polymer matrix;

wherein said system exhibits an electrically switchable transparency essentially independent of the polarization of the incident light;

wherein said PDLC film is made from a precursor and said precursor of said PDLC film comprises said liquid crystal mixture and one or more monomers, oligomers, prepolymers or combinations thereof, and a photoinitiator, and is photoradically curable; and said liquid crystal mixture comprises one or more compounds of formula I

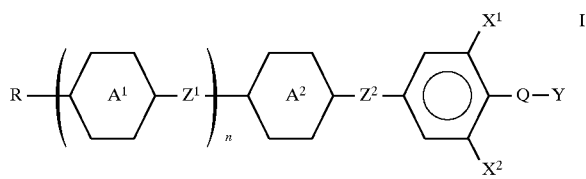

wherein

Z$^1$ and Z$^2$, independently of one another, are each a single bond, —CH$_2$CH$_2$—, —COO—, —OCO— or —C≡C—,

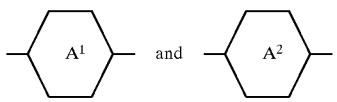

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

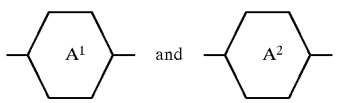

can also be pyrimidine-2,5-diyl, pyridine-2,5-diyl or trans-1,3-dioxane-2,5-diyl, X$^1$ and X$^2$, independently from one another, are each H or F, Q is —CF$_2$—, —OCF$_2$, —C$_2$F$_4$— or a single bond, Y is —H, —F, —Cl or —CN, n is 0, 1 or 2, and R is alkyl having up to 13 C atoms, in which one or two non-adjacent CH$_2$ groups can also be replaced by —O—, —CH=CH— or a combination thereof, wherein said liquid crystal mixture further contains one or more reactive liquid crystalline compounds of:

(a) the formula

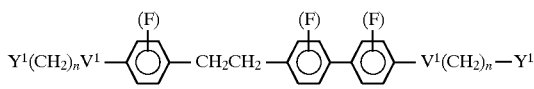

wherein
Y$^1$ is, independently from each other, CH$_2$=CW$^1$COO—, CH$_2$=CH— or HS—CH$_2$—(CH$_2$)$_m$COO—,
V$^1$ is, independently from each other, —O—, —COO—, —OOC—, —S— or a single bond,
W$^1$ is, independently from each other, H, Cl or CH$_3$,
n is, independently from each other, 2–12,
m is, independently from each other 1–7, and

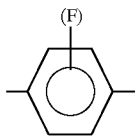

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene;

(b) the formula

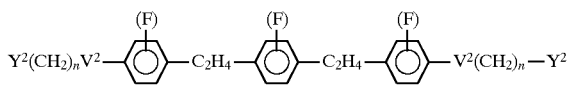

wherein
Y$^2$ is, independently from each other, CH$_2$=CHCOO—, CH$_2$=C(CH$_3$)—COO— or CH$_2$=CH—,
V$^2$ is, independently from each other, —O— or a single bond,
n is, independently from each other 2–12, and

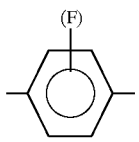

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene;

(c) the formula

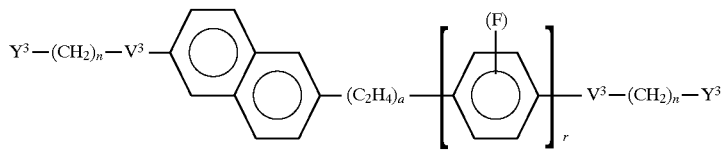

wherein
Y$^3$ is, independently from each other, CH$_2$=CW$^3$COO—, CH$_2$=CH— or HSCH$_2$(CH$_2$)$_m$—COO—,
V$^3$ is, independently from each other, —O—, —COO—, —OOC—, —S— or a single bond,
W$^3$ is, independently from each other, H, Cl or CH$_3$,
a is 0 or 1,
n is 1 or 2,
m is, independently from each other, 1–7, and

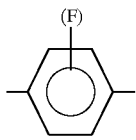

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene;

(d) the formula

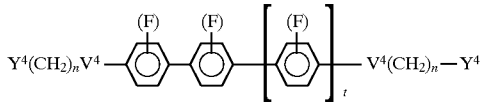

wherein
Y$^4$ is, independently from each other, CH$_2$=CW$^4$COO—, CH$_2$=CH— or HSCH$_2$(CH$_2$)$_m$COO—,
V$^4$ is, independently from each other, —O—, —COO—, —OCO—, —S— or a single bond,
W$^4$ is, independently from each other, H, CH$_3$ or Cl,
m is, independently from each other, 1–7,
n is, independently from each other, 1–12,
t is 0, 1 or 2, and

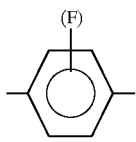

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene;

(e) the formula

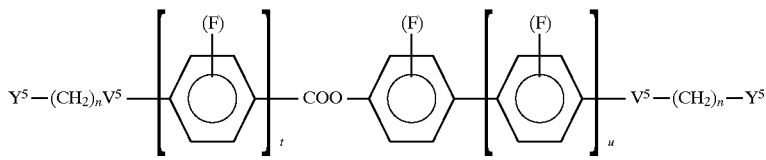

wherein

Y⁵ is, independently from each other, $CH_2=CW^5COO-$, $CH_2=CH-$ or $HSCH_2(CH_2)_m COO$, V⁵ is, independently from each other, —O—, —COO—, —OCO—, —S— or a single bond, W⁵ is, independently from each other, 1–12, m is 1–7, t and u are, independently from each other 0, 1, or 2 with the proviso that t+u=1, 2 or 3, and

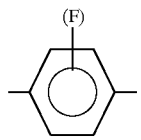

is, independently from each other, 1,4-phenylene, 2-fluoro-1,4-phenylene, 3-fluoro-1,4-phenylene, 2,6-difluoro-1,4-phenylene or 2,3,6-trifluoro-1,4-phenylene; or (f) the formula

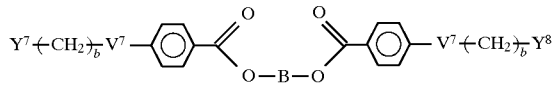

wherein

Y⁷ is $CH_2=CW^7COO-$, $CH_2=CH-$, $HSCH_2(CH_2)_m COO-$,

Y⁸, independently of Y⁷, is Y⁷ or an alkyl group with 1–12 C atoms, which is optionally mono- or polysubstituted by F and/or Cl, and/or wherein one or two non-adjacent $CH_2$ groups may be replaced by —CH=CH—, —O—, —CO—, —COO—, —OCO— or —S—, V⁷ is, independently from each other, —O—, —COO—, —OOC—, —S— or a single bond, W⁷ is, independently from each other, H, Cl or $CH_3$, m is, independently from each other 1–7, b is, independently from each other 0–11, and B is

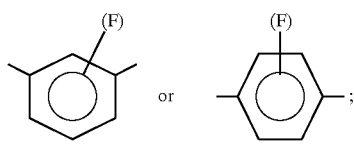

with the proviso that in case both Y⁷ and Y⁸ are $CH_2=CW^7COO-$, B is

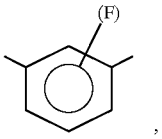

wherein the amount of said reactive liquid crystalline compounds is not more than 5 wt. % of the mass of the precursor of the PDLC film.

39. An electrooptical system comprising:

two electrode layers between which is contained a PDLC film, said PDLC film comprising a liquid crystal mixture forming microdroplets in an optically isotropic, transparent polymer matrix;

wherein said liquid crystal mixture is based on SFM compounds and exhibits refractive indices and one of the refractive indices of said liquid crystal mixture is matched to a refractive index of said polymer matrix;

wherein said system is addressed by an active matrix and exhibits an electrically switchable transparency essentially independent of the polarization of the incident light;

wherein said PDLC film is made from a precursor and said precursor of said PDLC film comprises said liquid crystal mixture and one or more monomers, oligomers, prepolymers or combinations thereof, and a photoinitiator, and is photoradically curable; and said liquid crystal mixture comprises one or more compounds of formula I

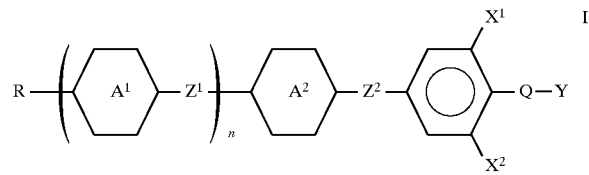

wherein $Z^1$ and $Z^2$, independently of one another, are each a single bond, —$CH_2CH_2$—, —COO—, —OCO— or —C≡C—,

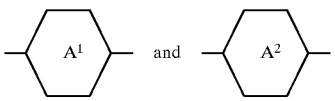

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

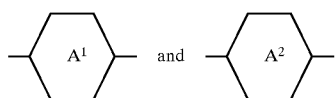

can also be pyrimidine-2,5-diyl, pyridine-2,5-diyl or trans-1,3-dioxane-2,5-diyl, $X^1$ and $X^2$, independently from one another, are each H or F, Q is —$CF_2$—, —$OCF_2$, —$C_2F_4$—, —$OC_2F_4$— or a single bond, Y is —H, —F, —Cl or —CN, n is 0, 1 or 2, and R is alkyl having up to 13 C atoms, in which one or two non-adjacent $CH_2$ groups can also be replaced by —O—, —CH=CH— or a combination thereof, wherein said liquid crystal mixture further contains one or more reactive liquid crystalline compounds of formula II

   II wherein one of the terminal groups R' and R" is a reactive group exhibiting one reaction site selected from HOW'$_2$C—, HSW'$_2$C—, HW'N—, a carboxyl group,

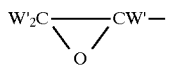

and O=C—N—, or is a polymerizable reactive group exhibiting two or more reactive sites selected from

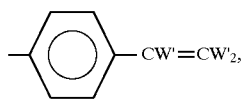

W'$_2$C=CW'—, and

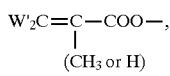

wherein W' is in each case, independently, H or an alkyl group with 1–5 C atoms, and the other of terminal groups R' and R" is, independently from the first terminal group, one of said reactive groups or is an alkyl radical with up to 15 C atoms which is unsubstituted or mono- or polysubstituted by halogen, it being also possible for one or more $CH_2$ groups in these radicals to be replaced, in each case independently of one another, by —O—, —S—, —CO—, —OCO—, —CO—O— or —O—CO—O— in such a manner that O atoms are not linked directly to one another, G' is a rod-like diyl group of the formula

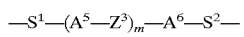

wherein $S^1$ and $S^2$, independently from each other, are alkylene groups with 0–20 C atoms which can be linear or branched, it also being possible for one or more $CH_2$ groups to be replaced, in each case independently from each other, by —O—, —CO—, —S— or —NW'— with the proviso that O atoms are not linked directly to one another, $A^5$ and $A^6$ are, independently from each other,
a) a cyclohexylene group, wherein one or two non-adjacent $CH_2$ groups may be replaced by O or S atoms,
b) an unsubstituted 1,4-phenylene group wherein one to three CH groups may be replaced by —N— or a 1,4-phenylene group which is mono- or polysubstituted by F, Cl and/or $CH_3$,
c) a bicyclo(2,2,2)octylene group, a naphthalene-2,6-diyl group, a decahydronaphthalene-2,6-diyl group or 1,2,3,4-tetrahydronaphthalene group, $Z^3$ is, independently from each other, —CO—O—, —O—CO—, —$CH_2CH_2$—, —$CH_2O$—, —$OCH_2$—, —C≡C— or a single bond, and m is 1, 2, 3 or 4, wherein the amount of said reactive liquid crystalline compounds is not more than 5 wt. % of the mass of the precursor of the PDLC film.

40. An electrooptical system comprising:

two electrode layers between which is contained a PDLC film, said PDLC film comprising a liquid crystal mixture forming microdroplets in an optically isotropic, transparent polymer matrix;

wherein said liquid crystal mixture exhibits refractive indices and one of the refractive indices of said liquid crystal mixture is matched to a refractive index of said polymer matrix;

wherein said system exhibits an electrically switchable transparency essentially independent of the polarization of the incident light;

wherein said PDLC film is made from a precursor and said precursor of said PDLC film comprises said liquid crystal mixture and one or more monomers, oligomers, prepolymers or combinations thereof, and a photoinitiator, and is photoradically curable; and said liquid crystal mixture comprises one or more compounds of formula I

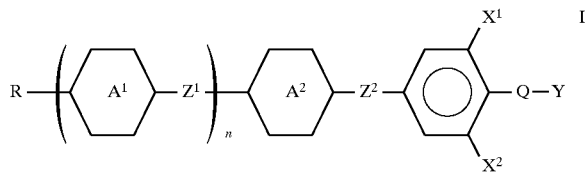

wherein $Z^1$ and $Z^2$, independently of one another, are each a single bond, —$CH_2CH_2$—, —COO—, —OCO— or —C≡C—,

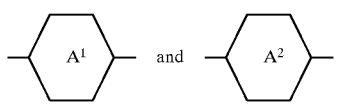

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

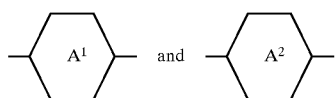

can also be pyrimidine-2,5-diyl, pyridine-2,5-diyl or trans-1,3-dioxane-2,5-diyl, $X^1$ and $X^2$, independently from one another, are each H or F, Q is —$CF_2$—, —$OCF_2$, —$C_2F_4$—, —$OC_2F_4$— or a single bond, Y is —H, —F, —Cl or —CN, n is 0, 1 or 2, and R is alkyl having up to 13 C atoms, in which one or two non-adjacent $CH_2$ groups can also be replaced by —O—, —CH≡CH— or a combination thereof, wherein said liquid crystal mixture further contains one or more reactive liquid crystalline compounds of formulae III2–III20

| | |
|---|---|
| $R^1$—P—X—Phe'—Z—Pyd—Phe"—$R^2$ | III2 |
| $R^1$—P—X—Phe'—Z—Pyr—Phe"—$R^2$ | III3 |
| $R^1$—P—X—Phe'—Z—Phe"—Pyd—$R^2$ | III4 |
| $R^1$—P—X—Phe'—Z—Phe"—Pyr—$R^2$ | III5 |
| $R^1$—P—X—Phe'—Z—Phe"—$CH_2CH_2$—Phe"—$R^2$ | III6 |
| $R^1$—P—X—Phe'—Z—Pyd—$CH_2CH_2$—Phe"—$R^2$ | III7 |
| $R^1$—P—X—Phe'—Z—Pyr—$CH_2CH_2$—Phe"—$R^2$ | III8 |
| $R^1$—P—X—Phe'—Z—Phe"—$CH_2CH_2$—Pyd—$R^2$ | III9 |
| $R^1$—P—X—Phe'—Z—Phe"—$CH_2CH_2$—Pyr—$R^2$ | III10 |
| $R^1$—P—X—Nap'—Z—Phe"—Phe"—$R^2$ | III11 |
| $R^1$—P—X—Nap'—Z—Pyd—Phe"—$R^2$ | III12 |
| $R^1$—P—X—Nap'—Z—Pyr—Phe"—$R^2$ | III13 |
| $R^1$—P—X—Nap'—Z—Phe"—Pyd—$R^2$ | III14 |
| $R^1$—P—X—Nap'—Z—Phe"—Pyr—$R^2$ | III15 |
| $R^1$—P—X—Nap'—Z—Phe"—$CH_2CH_2$—Phe"—$R^2$ | III16 |
| $R^1$—P—X—Nap'—Z—Pyd—$CH_2CH_2$—Phe"—$R^2$ | III17 |
| $R^1$—P—X—Nap'—Z—Pyr—$CH_2CH_2$—Phe"—$R^2$ | III18 |
| $R^1$—P—X—Nap'—Z—Phe"—$CH_2CH_2$—Pyd—$R^2$ | III19 |
| $R^1$—P—X—Nap'—Z—Phe"—$CH_2CH_2$—Pyr—$R^2$ | III20 | wherein

P is alkylene with up to 12 C atoms wherein one or more non-adjacent $CH_2$ groups can be replaced by —O—;

X is —O—, —S—, —COO—, —OCO— or a single bond;

Phe' is a 1,4-phenylene group

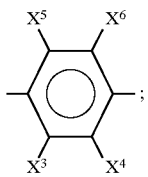

$X^3$–$X^6$ are, independently from each other, H or halogen;

Phe" is a 1,4-phenylene group, which is unsubstituted or mono- or polysubstituted by CN or halogen;

Nap' is a naphthalene-2,6-diyl group

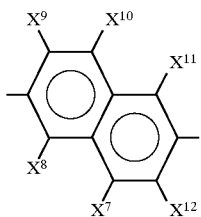

which is unsubstituted or wherein up to 4 of $X^4$–$X^{12}$ are independently from each other halogen, while the other denote H;

$R^1$ is $CH_2$=CW—COO—,

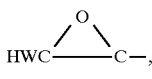

ClHN—, (alkyl)HN— wherein alkyl contains 1–5 C atoms, $CH_2$=CH— or HS—$CH_2$—$(CH_2)_m$—COO—;

W is H, Cl or alkyl with 1–5 C atoms;

m is 1–7;

$R^2$ is an alkyl radical with up to 15 C atoms which is unsubstituted, mono- or polysubstituted by halogen, wherein one or more $CH_2$ groups can be replaced, in each case independently of one another, by —O—, —S—, —CO—, —CO—O— or —O—CO—O— in such a manner that oxygen atoms are not linked directly to one another, —CN, —Cl or —F, or $R^2$ has one of the meanings given for $R^1$—P—X—; and Z is —CO—O—, —O—CO—, —$CH_2CH_2$— or a single bond, wherein the amount of said reactive liquid crystalline compounds is not more than 5 wt. % of the mass of the precursor of the PDLC film.

41. An electrooptical system comprising:

two electrode layers between which is contained a PDLC film, said PDLC film comprising a liquid crystal mixture forming microdroplets in an optically isotropic, transparent polymer matrix;

wherein said liquid crystal mixture exhibits refractive indices and one of the refractive indices of said liquid crystal mixture is matched to a refractive index of said polymer matrix;

wherein said system exhibits an electrically switchable transparency essentially independent of the polarization of the incident light;

wherein said PDLC film is made from a precursor and said precursor of said PDLC film comprises said liquid crystal mixture and one or more monomers, oligomers, prepolymers or combinations thereof, and a photoinitiator, and is photoradically curable; and said liquid crystal mixture comprises one or more compounds of formula I

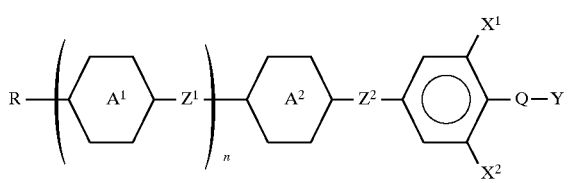 I wherein

Z$^1$ and Z$^2$, independently of one another, are each a single bond, —CH$_2$CH$_2$—, —COO—, —OCO— or —C≡C—,

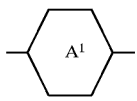

and

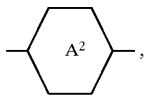

independently of one another, are each trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

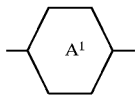

and

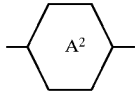

can also be pyrimidine-2,5-diyl, pyridine-2,5-diyl or trans-1,3-dioxane-2,5-diyl.

X$^1$ and X$^2$, independently from one another, are each H or F,

Q is —CF$_2$—, —OCF$_2$, —C$_2$F$_4$—, —OC$_2$F$_4$— or a single bond,

Y is —H, —F, —Cl or —CN, n is 0, 1 or 2, and

R is alkyl having up to 13 C atoms, in which one or two non-adjacent CH$_2$ groups can also be replaced by —O—, —CH=CH— or a combination thereof, wherein said liquid crystal mixture further contains 0.1–5 wt. % based on the mass of the precursor of the PDLC film of one or more reactive liquid crystalline compounds of formula II

 II wherein one of the terminal groups R' and R" is a reactive group exhibiting one reaction site selected from HOW'$_2$C—, HSW'$_2$C—, HW'N—, a carboxyl group,

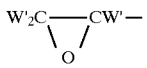

and O=C—N—, or is a polymerizable reactive group exhibiting two or more reactive sites selected from

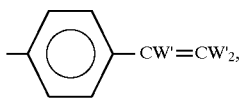

W'$_2$C=CW'—, and

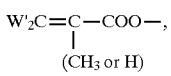

wherein W' is in each case, independently, H or an alkyl group with 1–5 C atoms, and the other of terminal groups R' and R" is, independently from the first terminal group, one of said reactive groups, or is an alkyl radically with up to 15 C atoms which is unsubstituted or mono- or polysubstituted by halogen, it being also possible for one or more CH$_2$ groups in these radicals to be replaced, in each case independently of one another, by —O—, —S—, —CO—, —OCO—, —CO—O— or —O—CO—O— in such a manner that O atoms are not linked directly to one another, G' is a rod-like diyl group of the formula

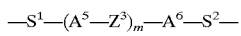

wherein

S$^1$ and S$^2$, independently from each other, are alkylene groups with 0–20 C atoms which can be linear or branched, it also being possible for one or more CH$_2$ groups to be replaced, in each case independently from each other, by —O—, —CO—, —S— or —NW'— with the proviso that O atoms are not linked directly to one another, A$^5$ and A$^6$ are, independently from each other, a) a cyclohexylene group, wherein one or two non-adjacent CH$_2$ groups may be replaced by O or S atoms, b) an unsubstituted 1,4-phenylene group wherein one to three CH groups may be replaced by —N— or a 1,4-phenylene group which is mono- or polysubstituted by F, Cl and/or CH$_3$, c) a bicyclo(2,2,2)octylene group, a naphthalene-2,6-diyl group, a decahydronaphthalene-2,6-diyl group or 1,2,3,4-tetrahydronaphthalene group, Z$^3$ is independently from each other, —CO—O—, —O—CO—, —CH$_2$CH$_2$—, —CH$_2$O—, —OCH$_2$—, —C≡C— or a single bond, and m is 1, 2, 3 or 4.

* * * * *